(12) United States Patent
Nagata et al.

(10) Patent No.: US 8,319,832 B2
(45) Date of Patent: Nov. 27, 2012

(54) INPUT APPARATUS AND IMAGING APPARATUS

(75) Inventors: Takashi Nagata, Nagoya (JP); Kenichi Wakiyama, Kariya (JP); Kazunobu Nakanishi, Anjo (JP); Shinsuke Hisatsugu, Kariya (JP)

(73) Assignee: DENSO CORPORATION, Kariya (JP)

( * ) Notice: Subject to any disclaimer, the term of this patent is extended or adjusted under 35 U.S.C. 154(b) by 907 days.

(21) Appl. No.: 12/320,154

(22) Filed: Jan. 21, 2009

(65) Prior Publication Data

US 2009/0195659 A1 Aug. 6, 2009

(30) Foreign Application Priority Data

| Jan. 31, 2008 | (JP) | 2008-20955 |
| Mar. 31, 2008 | (JP) | 2008-92919 |
| Aug. 5, 2008 | (JP) | 2008-202145 |
| Sep. 3, 2008 | (JP) | 2008-226327 |

(51) Int. Cl.
  *H04N 7/14* (2006.01)
  *H04N 5/225* (2006.01)
  *G06F 3/042* (2006.01)

(52) U.S. Cl. ......... 348/114; 348/207; 348/373; 345/175

(58) Field of Classification Search .......... None
See application file for complete search history.

(56) References Cited

U.S. PATENT DOCUMENTS

| 5,818,357 A | 10/1998 | Motoyama et al. |
| 6,057,540 A | 5/2000 | Gordon et al. |
| 7,018,158 B2 | 3/2006 | Amamiya et al. |
| 2001/0026268 A1* | 10/2001 | Ito .................. 345/175 |
| 2001/0050661 A1* | 12/2001 | Noda et al. ........... 345/32 |
| 2002/0005989 A1* | 1/2002 | Bhagavatula ........ 359/577 |
| 2003/0081722 A1* | 5/2003 | Kandaka et al. ...... 378/70 |
| 2005/0110890 A1* | 5/2005 | Sasaki et al. ......... 348/345 |
| 2005/0122418 A1* | 6/2005 | Okita et al. .......... 348/340 |
| 2005/0207671 A1* | 9/2005 | Saito ................. 382/275 |
| 2006/0066760 A1* | 3/2006 | Cho et al. ............ 348/744 |
| 2006/0214450 A1 | 9/2006 | Sakakibara |
| 2007/0230929 A1 | 10/2007 | Niwa et al. |
| 2008/0018911 A1* | 1/2008 | Igaki et al. .......... 356/622 |

(Continued)

FOREIGN PATENT DOCUMENTS

JP A-10-269012 10/1998

(Continued)

OTHER PUBLICATIONS

Office Action dated Sep. 7, 2010 in corresponding JP application No. 2008-202145.

(Continued)

*Primary Examiner* — Joseph Ustaris
*Assistant Examiner* — Frederick Bailey
(74) *Attorney, Agent, or Firm* — Posz Law Group, PLC

(57) ABSTRACT

An input section includes a palm rest and a hand detection sensor on the top surface of a housing. The input section also includes, for example, an analog resistive touch panel above the housing to the front. A palm rest is used as a base for placing a palm for manipulating the touch panel and has a flat surface slightly forward with reference to a horizontal level. The touch panel tilts below the surface of the palm rest. The touch panel is given a tilt angle so that the fingertip or the finger cushion naturally touches the surface (panel surface) of the touch panel when the palm is placed on the palm rest.

4 Claims, 30 Drawing Sheets

U.S. PATENT DOCUMENTS

| | | |
|---|---|---|
| 2009/0002342 A1 | 1/2009 | Terada et al. |
| 2009/0080048 A1* | 3/2009 | Tsao .......................... 359/211 |

FOREIGN PATENT DOCUMENTS

| | | |
|---|---|---|
| JP | A-11-208385 | 8/1999 |
| JP | A-2000-006687 | 1/2000 |
| JP | A-2000-066784 | 3/2000 |
| JP | A-2000-106069 | 4/2000 |
| JP | A-2003-158737 | 5/2003 |
| JP | A-2003-280814 | 10/2003 |
| JP | A-2003-346162 | 12/2003 |
| JP | A-2004-050916 | 2/2004 |
| JP | A-2004-127840 | 4/2004 |
| JP | A-2004-227885 | 8/2004 |
| JP | A-2005-145305 | 6/2005 |
| JP | A-2006-195864 | 7/2006 |
| JP | A-2007-156950 | 6/2007 |
| JP | A-2007-198574 | 8/2007 |
| JP | A-2007-223416 | 9/2007 |
| JP | A-2007-276615 | 10/2007 |
| JP | A-2007-286696 | 11/2007 |
| JP | A-2008-191261 | 8/2008 |

OTHER PUBLICATIONS

Office Action mailed Feb. 16, 2010 from Japan Patent Office in corresponding JP Application No. 2008-020955 (and English translation).

Office Action mailed Mar. 12, 2010 from Japan Patent Office in corresponding JP application No. 2008-092919 (and English translation).

OA mailed on May 7, 2010 in the corresponding JP application No. 2008-202145.

OA dated Jun. 17, 2010 issued in the corresponding JP application No. 2008-226327.

* cited by examiner

OUTSIDE LIGHT: HIGH

LIT — UNLIT = DIFFERENCE

OUTSIDE LIGHT: LOW

LIT — UNLIT = DIFFERENCE

TILT FORWARD

61

63(65)

73  71

71  73

INPUT APPARATUS AND IMAGING APPARATUS

CROSS REFERENCE TO RELATED APPLICATION

This application is based on and incorporates herein by reference Japanese Patent Application No. 2008-20955 filed on Jan. 31, 2008, No. 2008-92919 filed on Mar. 31, 2008, No. 2008-202145 filed on Aug. 5, 2008, and No. 2008-226327 filed on Sep. 3, 2008.

FIELD OF THE INVENTION

The present invention relates to an input apparatus capable of manual input using a touch panel and a related imaging apparatus, for example.

BACKGROUND OF THE INVENTION

Patent Document 1: JP-2007-156950A
Patent Document 2: JP-2007-272596A (US2007/0230929)
Patent Document 3: JP-2000-6687A
Patent Document 4: JP-2007-198574A
Patent Document 5: JP-2000-106069A
Patent Document 6: JP-2003-346162A A remote controller has been long known as an apparatus for operating onboard apparatuses such as a car navigation system. The remote controller may be inconvenient in such points that a user gropes for the remote controller, holds it in his or her hand, and presses buttons. To solve this problem, various technologies are proposed.

For example, Patent Documents 1 through 6 disclose prompter-based remote controlling apparatuses using a touch panel and a camera. The technologies provide an armrest with a touch panel and provide a monitor at a dash panel, for example, or at an easily viewable position away from the touch panel. The camera is placed over or below the touch panel and captures manual operations on the touch panel. The camera captures a driver's finger shape image on the touch panel. The captured image is displayed at, for example, an instrument panel of the vehicle, that is, a position where the driver can easily view with minimal movement of the line of sight. In other words, the technologies superimpose the captured finger image as is or processed on a graphical user interface image (such as an operation menu) displayed on a monitor.

The following describes a first problem about the above-mentioned prompter-based remote controlling apparatus.

According to the technologies described in Patent Documents 1 and 2, an operator differently feels forces for turning on switches. This is because a contact area on the touch panel depends on an angle of the operator's finger. The distance between a fingertip and a touch position varies because operators vary angles of their fingers that press the touch panel.

The prompter-based remote controlling apparatus may cause an unintended or inadvertent input operation such as an input error due to variations in touch inputs by an operator.

The following describes a second problem about the above-mentioned prompter-based remote controlling apparatus.

A conventional prompter-based input apparatus features a small number of operations or operation frequency compared to steering wheel or accelerator pedal operations. However, the conventional input apparatus consumes much electric current because a video camera is always powered or a touch panel is always ready for operations. The current is supplied from a battery or an alternator of the vehicle. This may increase electricity generated or degrade the regeneration efficiency for hybrid cars.

The following describes a third problem about the above-mentioned prompter-based remote controlling apparatus.

The above-mentioned input apparatus provides a remote operation section within reach of the operator independently of a display apparatus for displaying an operation screen (main screen). Further, the input apparatus captures and extracts a hand that operates the remote operation section. The input apparatus reflects the acquired hand image and movement on the operation screen (main screen) of the display apparatus. The input apparatus controls the display as if the operator directly touched the operation screen. When the input apparatus is provided for a vehicle, the remote operation section is placed within reach of a user sitting on the seat so as to improve operability of the input apparatus. The remote operation section is often provided with a touch-based or contact-based operation panel including a touch operation surface.

When the operation panel is provided in a vehicle compartment, it is highly likely that various operation sections are placed around the operation panel. The operation section may represent a press operation section such as a push switch or a seesaw switch that detects a specified pressure displacement. In such case, the user may extend his or her hand to the operation panel for touch operation but may inadvertently touch the press operation section to cause an operational error. Pressing or touching the press operation section just signifies whether or not an operation knob deflects. The operation concerns the same direction and is more likely to cause an operational error than the case of placing the other operation sections.

The following describes a fourth problem about the above-mentioned prompter-based remote controlling apparatus.

Patent Document 2 discloses the mechanism of the prompter-based input apparatus as follows. The apparatus allows an operator to touch an operation surface for input. The operation surface uses a transparent sheet. A lighting section and an imaging section are provided opposite to the operator with reference to the operation surface. The lighting section lights the operator's hand or finger that touches the operation surface. The imaging section captures an image of the hand or finger and analyzes the image to determine the content of the operator's input.

For example, Patent Document 6 discloses the hand image recognition system available for prompter-based input apparatuses. The system generates a hand area extraction image and a hand area fine-line image from an image captured by the camera. The system recognizes an input instruction by extracting apparent features such as a finger diameter from the hand area extraction image and extracting a hand direction and a finger coordinate from the hand area fine-line image.

When the camera and the LED are placed along the same axis as conventionally practiced, the captured image may include an image of the light source of the lighting section. This may degrade the accuracy of image analysis for recognizing an operation content.

SUMMARY OF THE INVENTION

A first object of the present invention is to provide an input apparatus capable of preventing an input error and ensuring more accurate input.

To achieve the first object, according to an example of the present invention, an input apparatus is provided as follows. A finger input section is configured to detect a finger-input position. A palm rest section is configured to place a palm when the finger input section is operated. Herein, the palm rest section is adjacent to the finger input section, and the finger input section includes a surface tilting downward with reference to a forward extension of a surface of the palm rest section.

To achieve the first object, according to another example of the present invention, an input apparatus is provided as follows. A finger input section is configured to detect a finger-input position. An armrest section is configured to place an arm when operating the finger input section. Herein, the finger input section includes a surface tilting downward with reference to a forward extension of a surface of the armrest section.

A second object of the present invention is to provide an input apparatus of decreasing a consumption current.

To achieve the second object, according to an example of the present invention, an input apparatus is provided as follows. An operation section is provided within a vehicle. A shape acquisition unit is configured to acquire finger shape information about an occupant operating the operation section. A finger shape recognition unit is configured to recognize a finger shape based on finger shape information acquired by the shape acquisition unit. A superimposed image generation unit is configured to generate a superimposed image corresponding to a finger shape that is recognized by the finger shape recognition unit and is superimposed on a background image corresponding to an operation screen of a device provided in the vehicle. A display unit is configured to display a superimposed image generated by the superimposed image generation unit. A control unit is configured to manage the operation section, the shape acquisition unit, the finger shape recognition unit, the superimposed image generation unit, and the display unit. Herein, the control unit includes a timer unit for measuring a time elapsed during absence of a finger of the occupant to be touched on the operation section. When a time value measured by the timer unit becomes greater than or equal to a predetermined threshold value, the control unit is further configured to restrict or stop an operation of at least one of the operation section, the shape acquisition unit, the finger shape recognition unit, and the superimposed image generation unit to thereby reduce a consumed electric current.

A third object of the present invention is to provide an input apparatus capable of preventing an operational error for a press operation section provided near a touch operation surface.

To achieve the third object, according to an example of the present invention, an input apparatus is provided as follows. A touch operation section is configured to include an operation panel whose main surface is a touch operation surface exposed in a vehicle compartment. A touching hand detection unit is configured to detect a hand approaching the operation panel so as to touch the touch operation surface. A press operation section is configured to be near the touch operation surface. A press disabling unit is configured to disable a press operation on the press operation section when a hand approaching the touch operation surface is detected.

A fourth object of the present invention is to provide an imaging apparatus capable of preventing a light source from being included and provide an input apparatus using the same wherein the imaging apparatus or the input apparatus contains the light source and an imaging section inside and captures an object outside the apparatus through a transmissive surface that transmits light from the light source.

To achieve the fourth object, according to an example of the present invention, an imaging apparatus is provided as follows. A housing is configured to include at least one transmissive surface that transmits at least light of a specific wavelength. A lighting section is configured to b contained in the housing and radiate light to a capture object outside the housing. An imaging section is configured to be inside the housing and capture an image of the capture object illuminated by the lighting section. Herein, the lighting section configures an optical path of light radiated from the lighting section so that light, which is radiated from the lighting section and reflects on the transmissive surface, is prevented from entering the imaging section.

To achieve the fourth object, according to another example of the present invention, an input apparatus is provided as follows. The imaging apparatus according to the above example is included. Herein the transmissive surface is used as an input surface for accepting an input operation from an operator, and the capture object is equivalent to an operator hand for input operation. An analysis section is configured to analyze an image captured by the imaging apparatus to thereby analyze an operation content.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

First Embodiment

The first embodiment of the present invention will be described.

First Example a) The following describes a configuration of a car navigation system that uses the input apparatus according to the example.

Figure 1:
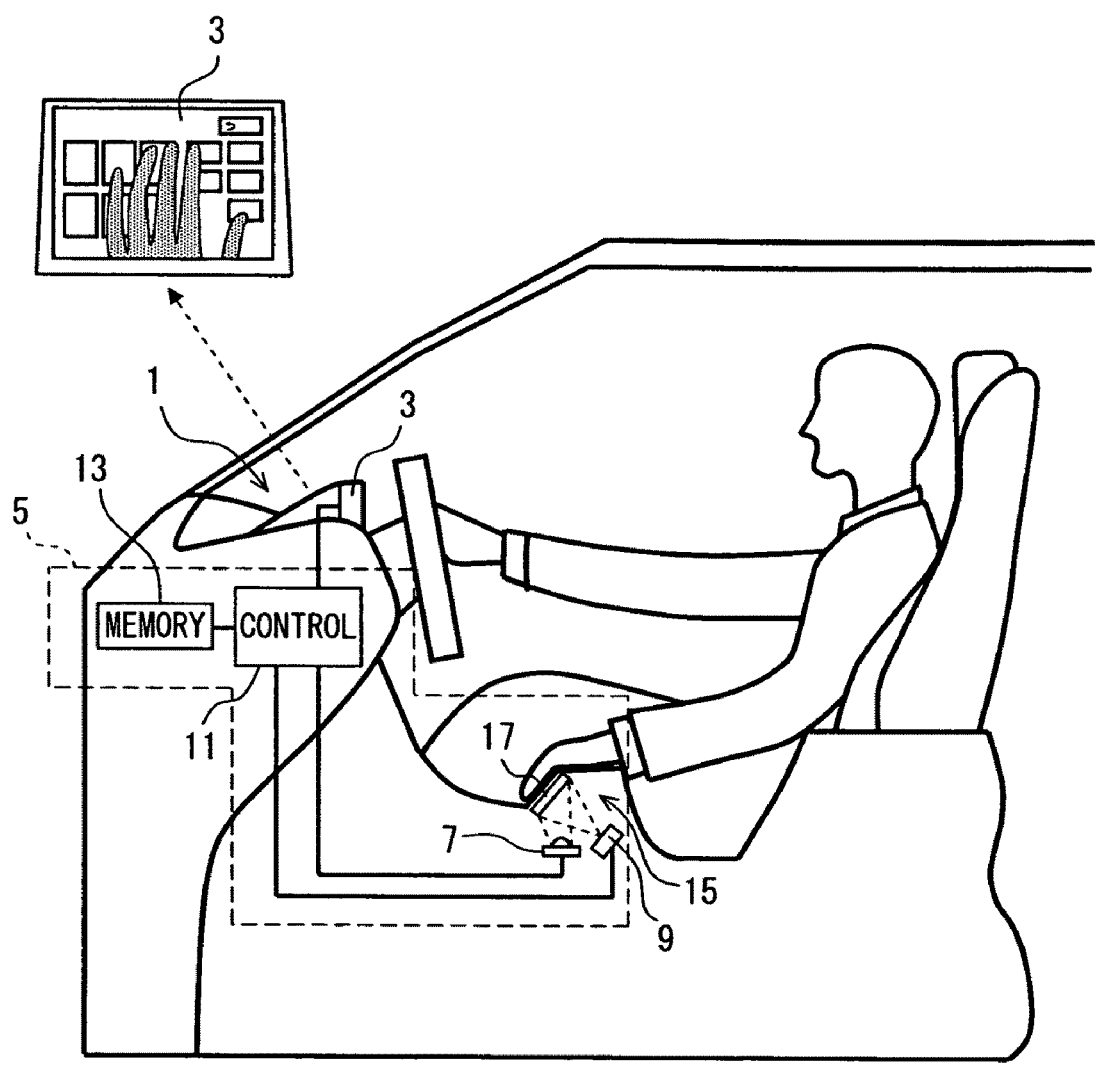
FIG. 1 is an explanatory diagram showing a configuration of the onboard input apparatus according to a first example of a first embodiment of the present invention.

As shown in FIG. 1, a car navigation system 1 is installed in a vehicle compartment and includes a display apparatus 3 and an input apparatus 5.

The display apparatus 3 displays navigation information on a map and displays a menu image or a menu screen for manual input. The display apparatus 3 uses a liquid crystal panel and is installed in the vehicle compartment at a front position viewable from a driver.

The input apparatus 5 performs processes corresponding to manual actions of the driver who operates the car navigation system 1. The input apparatus 5 includes a lighting section 7, an imaging section 9, a control section 11, an image memory 13, and an input section 15. The lighting section 7 radiates light. The imaging section 9 captures a hand and fingers. The control section 11 provides various controls. The image memory 13 stores captured images. The input section 15 is used to place a palm and enable input by a finger.

The lighting section 7 can radiate infrared or near-infrared. The lighting section 7 uses an infrared LED that directly radiates infrared ray. In addition, the lighting section 7 may be configured to attach an infrared ray transmission filter to an illuminator such as an incandescent lamp, Nernst glower lamp, glow bulb, arc-discharge tube, and tungsten lamp.

Figure 2:
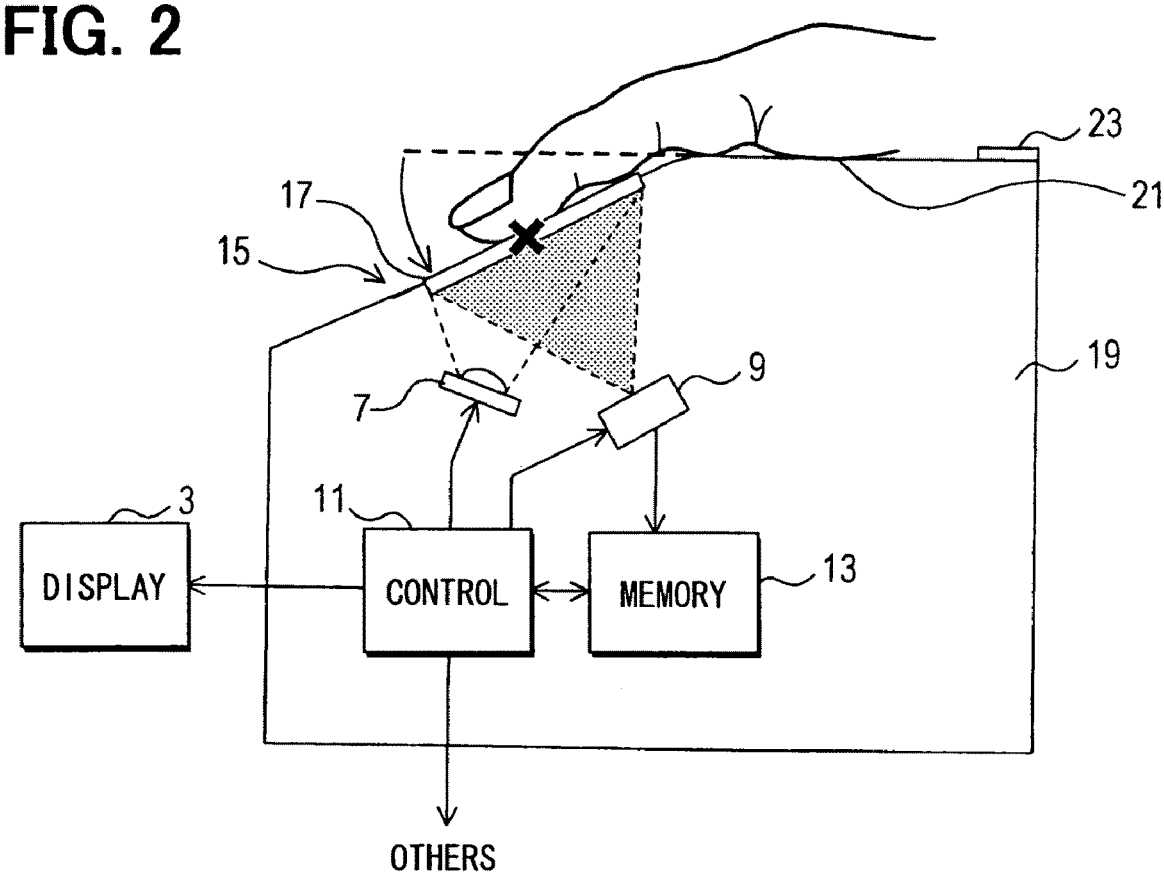
FIG. 2 is a block diagram showing a configuration of the input apparatus.

As shown in FIG. 2, the lighting section 7 is provided inside a housing 19 of the input section 15 so that radiated infrared ray is applied to the lower side (reverse side) of a touch panel 17.

The imaging section 9 represents a camera that can capture an infrared image. Specifically, the imaging section 9 includes an imaging element, a reflecting mirror, a lens, and a wavelength conversion element. The imaging element captures a visible image. The reflecting mirror reflects infrared light. The lens converges infrared light. The wavelength conversion element uses a nonlinear optical material that converts infrared light into visible light.

The imaging section 9 is given a focus at a position moved towards the driver's fingertip on the touch panel 17. The imaging section 9 is arranged so as to image the touch panel 17 from the side (i.e., reverse side) opposite to the surface where outside light is applied to the driver's finger. In detail, the imaging section 9 is provided inside the housing 19 below the touch panel 17.

When the lighting section 7 turns on, the imaging section 9 acquires a lit image. When the lighting section 7 turns off, the imaging section 9 acquires an unlit image. The image memory 13 stores lit and unlit images.

Figure 3:
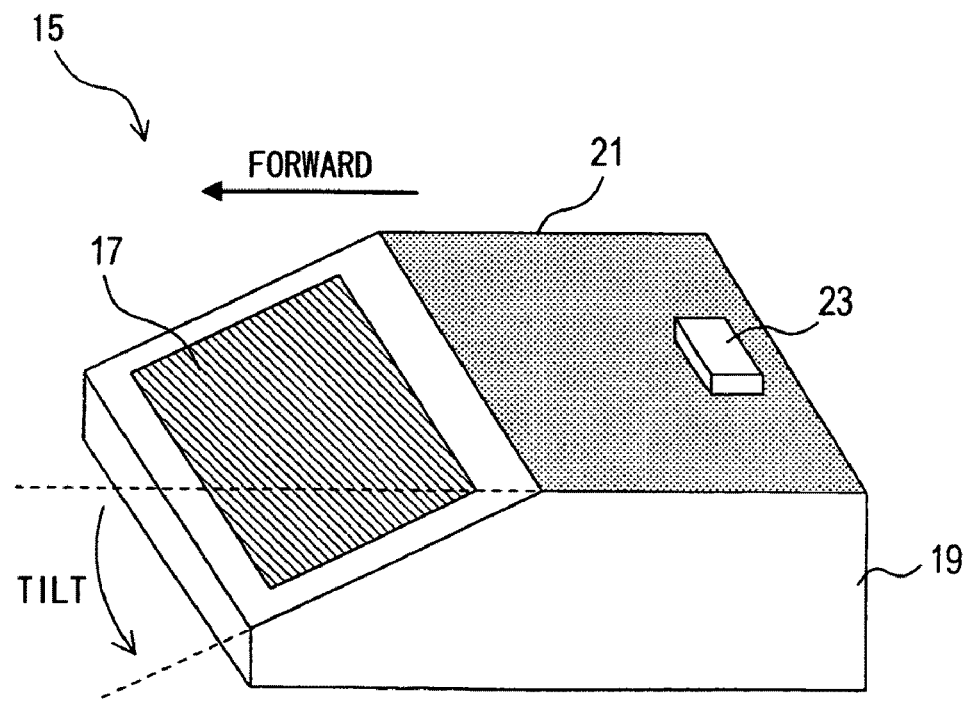
FIG. 3 is a perspective view showing an input section.

As shown in FIG. 3, the input section 15 is provided with a palm rest 21 and a hand detection sensor 23 on the top surface of the housing 19. The input section 15 is also provided with the touch panel 17 as a finger input section on the top of a front part of the housing 19.

The palm is placed on the palm rest 21 when the touch panel 17 is operated. As shown in FIG. 2, the palm rest 21 forms a flat surface while the touch panel 17 is slightly tilted downward (e.g., 30 degrees) from the horizontal level.

The hand detection sensor 23 detects whether or not the driver's hand or palm is placed on the palm rest 21 for operation. Specifically, the hand detection sensor 23 uses a micro switch or a pressure-sensitive sheet.

For example, the touch panel 17 uses the analog resistive touch technology. The driver presses the surface of the touch panel 17 with his or her finger to perform operations on the car navigation system 1 such as entering a destination or a display scale value. The touch panel 17 is a flat plate made of a material capable of transmitting infrared ray such as an acrylic plate.

In this example, the touch panel 17 tilts downward 30 degrees, for example, from the surface of the palm rest 21. The touch panel 17 is given a tilt angle of 30 degrees, for example, so that the fingertip or the finger cushion naturally touches the surface (panel surface) of the touch panel 17 when the palm is placed on the palm rest 21.

The touch panel 17 is provided with an XY coordinate so as to be capable of identifying a touched position. Similarly, a corresponding XY coordinate is provided for a display screen (e.g., a menu screen for displaying a menu image) of the display apparatus 3.

When the coordinate (1, 1) is touched on the touch panel 17, for example, the display apparatus 3 can also perform an associated process at the coordinate (1, 1) such as displaying a mark.

The control section 11 is equivalent to an electronic controller including an unshown CPU, ROM, and input/output device. As will be described later, the control section 11 is supplied with a touch signal indicative of an input coordinate from the touch panel 17 and an image signal from the imaging section 9. Based on the signals, the control section 11 performs processes of displaying an image on the display apparatus 3 and controlling the other devices.

The other devices include an air conditioner, audio system, and vein recognition apparatus, for example.

b) The following describes a technique for characteristic processes performed by the control section 11.

(1) Extracting a Finger Image

For example, the method described in JP-2007-272596A is used to extract a finger image.

The hand detection sensor 23 turns on when the driver touches the touch panel 17 with his or her finger. At this time, the control section 11 performs a process to extract a finger image based on a difference between the lit image and the unlit image. The imaging section 9 acquires the lit image when the lighting section 7 turns on. The imaging section 9 acquires the unlit image when the lighting section 7 turns off.

More specifically, the control section 11 turns on the lighting section 7. The control section 11 allows the imaging section 9 to acquire the lit image. The control section 11 stores the acquired lit image in the image memory 13. The control section 11 then turns off the lighting section 7. The control section 11 allows the imaging section 9 to acquire the unlit image. The control section 11 stores the unlit image in the image memory 13. The control section 11 extracts the driver's finger based on a difference image between the lit image and the unlit image stored in the image memory 13.

Figure 4A:
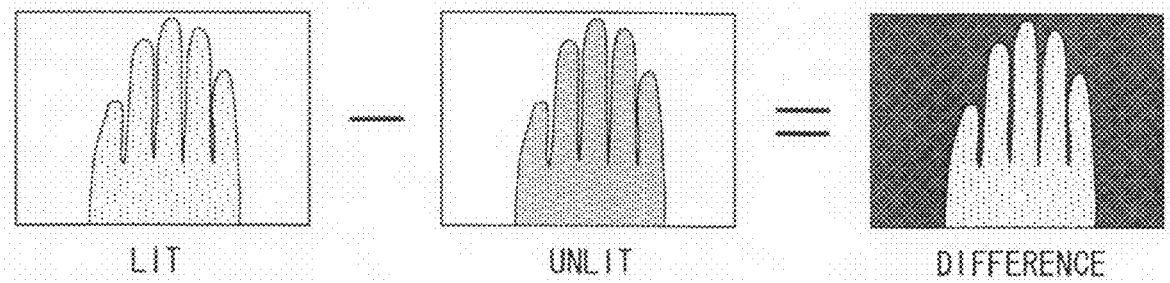
FIG. 4A is an explanatory diagram showing a method of extracting a finger image.
Figure 4B:
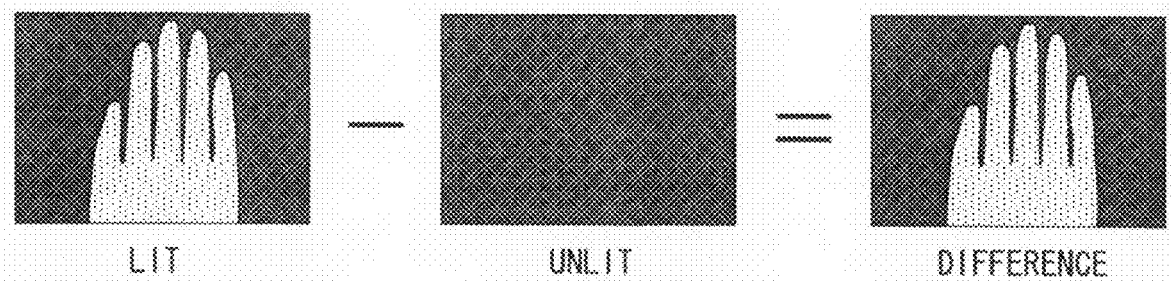
FIG. 4B is another explanatory diagram showing a method of extracting a finger image.

With reference to FIGS. 4A and 4B, the following describes the principle of extracting the driver's finger based on the lit image and the unlit image.

When the outside light illuminance is high as shown in FIG. 4A, the lit image scarcely shows the driver's fingers. On the other hand, the unlit image shows the fingers as a highly contrasted shade. A difference between both yields a finger image (difference image). When the outside light illuminance is low as shown in FIG. 4B, the lit image clearly shows the fingers. The unlit image shows no finger shade. A difference between both yields a finger image (difference image).

(2) Detecting a Fingertip Position

The finger image extracted by the above-mentioned technique is used to define a fingertip position as an intersection between a specified distance from the finger end to the base and the center of the finger width.

The fingertip position indicates the center of the finger cushion from the fingertip to the top joint. The fingertip position corresponds to the most swelled portion of the finger cushion and is considered to be highly likely to press the touch panel 17.

Figure 5:
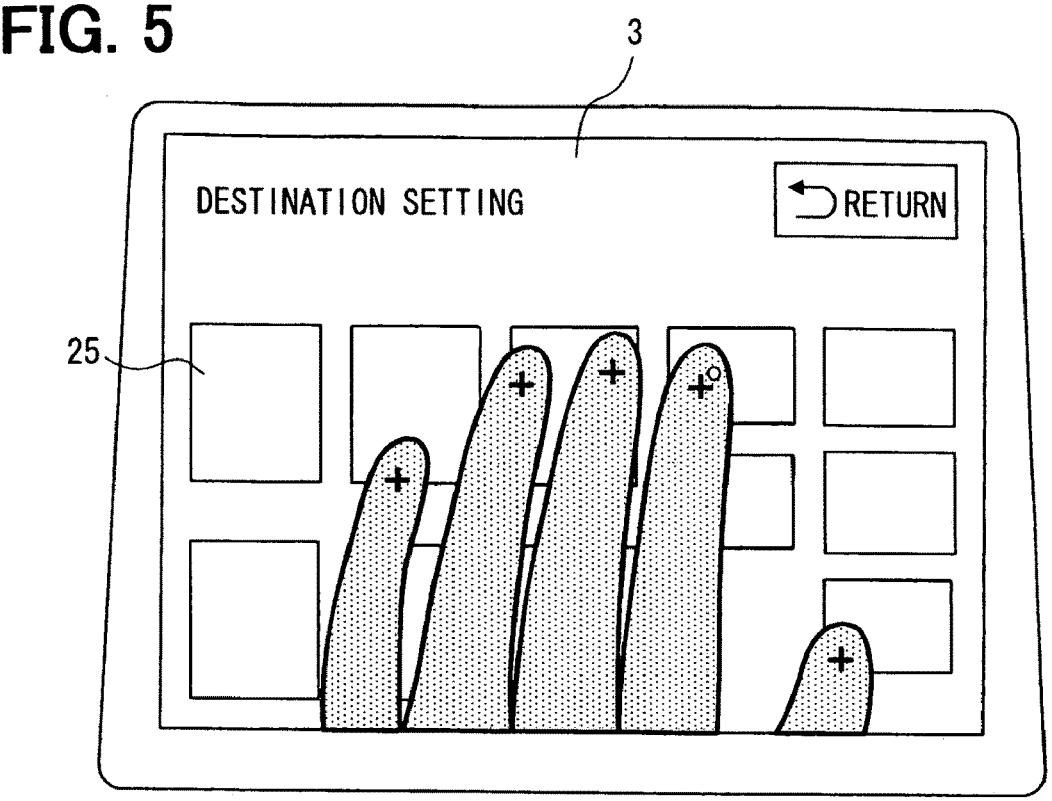
FIG. 5 is an explanatory diagram showing a finger image superimposed on an operation menu screen.

As shown in FIG. 5, the display apparatus 3 displays a finger image as a semi-transmissive modeled finger image whose outline is emphasized. The fingertip position is superimposed on the finger image and is marked with a cross. The display apparatus 3 helps an occupant easily understand which part of the finger is to be used for an operation button 25.

(3) Input and Correction Using the Touch Panel 17

The pen-based input uses a point at the pen tip for input and ensures highly accurate input to the touch panel 17. The finger-based input uses a plane such as a finger cushion for input and causes variations in a detection coordinate on the touch panel 17.

The coordinate detected on the touch panel 17 is approximated to the fingertip position detected from the image. An input to the touch panel 17 is assumed to be input to a coordinate on the image corresponding to the fingertip position, not the coordinate on the touch panel 17.

Even when the fingertip position is defined as indicated by the cross, an actual touch position may differ as indicated by a circle. Even when the input coordinate indicated by the circle is detected on the touch panel 17, the input coordinate is approximated to the fingertip position coordinate indicated by the cross. For example, the approximation technique uses the fingertip position of a finger image corresponding to the touch position. Various equivalent methods are available (see JP-2007-77330A).

c) The following describes the process of the control section 11 with reference to a flow chart.

Figure 6:
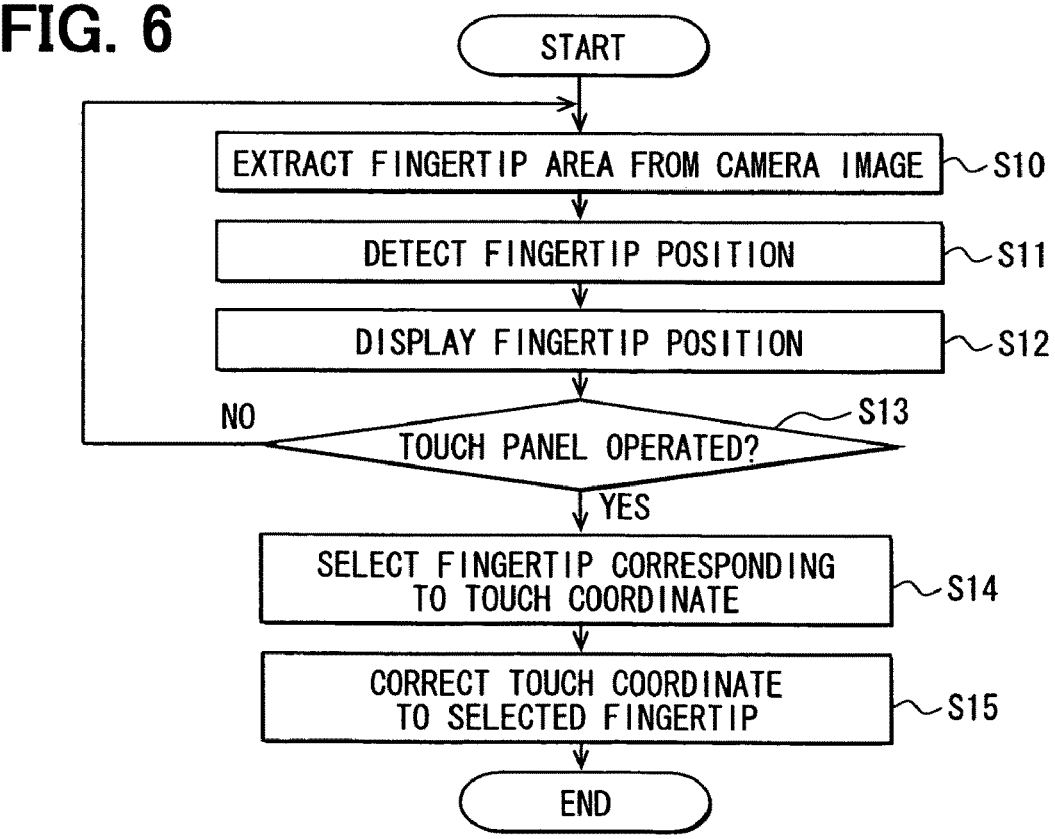
FIG. 6 is a flow chart showing a process of the input apparatus according to the first example.

At S10 of the flow chart in FIG. 6, the control section 11 uses camera images (lit image and unlit image) acquired by driving the lighting section 7 and the imaging section 9. The control section 11 then extracts a fingertip area indicating the fingertip according to the above-mentioned technique of using a difference image.

At S11, the control section 11 detects a fingertip position from the extracted finger area.

At S12, the control section 11 displays the fingertip position on a menu image, for example, as shown in FIG. 5. In addition, the control section 11 superimposes a semi-transparent fingertip image on the menu image.

At S13, the control section 11 checks for an input signal (touch signal) from the touch panel 17 to determine whether or not the touch panel 17 is operated. When the determination is affirmative, the control section 11 proceeds to S14. When the determination is negative, the control section 11 returns to S10.

At S14, the control section 11 acquires a touch coordinate indicating the touch position of the touch panel 14 and selects a fingertip corresponding to the touch coordinate based on the finger image.

At S15, the control section 11 corrects the touch coordinate to the fingertip position for the selected finger. The control section 11 assumes that the selected fingertip position is touched and therefore the operation button 25 is operated, not that the touch coordinate is touched. The control section 11 performs an operation corresponding to the operation button 25.

d) According to the example, the input section 15 is provided with the palm rest 21 and the touch panel 17. The touch panel 17 is provided so as to tilt downward from the surface of the palm rest 21. When the palm is placed on the palm rest 21, a fingertip cushion can naturally contact with the surface of the touch panel 17.

It is possible to always ensure a constant contact area (i.e., a constant size of the contact area) of the driver's fingertip in contact with the touch panel 17, causing little variation in a force the driver feels when activating the touch panel 17.

According to the prior art, a driver's finger forms different angles to press the touch panel, causing variations in the distance between the fingertip and the touch position. By contrast, the present example configures the touch panel 17 so as to naturally bend fingertips, causing little variations in that distance.

The prompter-based remote controlling apparatus easily causes an unintended or inadvertent input operation such as an input error due to variations in touch inputs by drivers. The present example prevents such input error and makes more accurate input possible.

In addition, the example provides surface input using the finger cushion and makes it possible to disperse a pressure applied to the touch panel 17. Even tracing the touch panel 17 minimizes occurrence of an unintended input. It is possible to finely position fingers.

The example uses the touch panel 17 according to the analog resistive touch technology. Also from this point of view, even tracing the touch panel 17 minimizes occurrence of an unintended input. It is possible to finely position fingers.

While a palm is placed on the fixed palm rest 21 according to the example, the palm rest may be slidable in the front-back direction. The operability further improves.

The hand detection sensor 23 may be omitted because the image process can detect a fingertip.

The following describes effects of the above-mentioned example with reference to drawings for comparative examples.

Figure 13A:
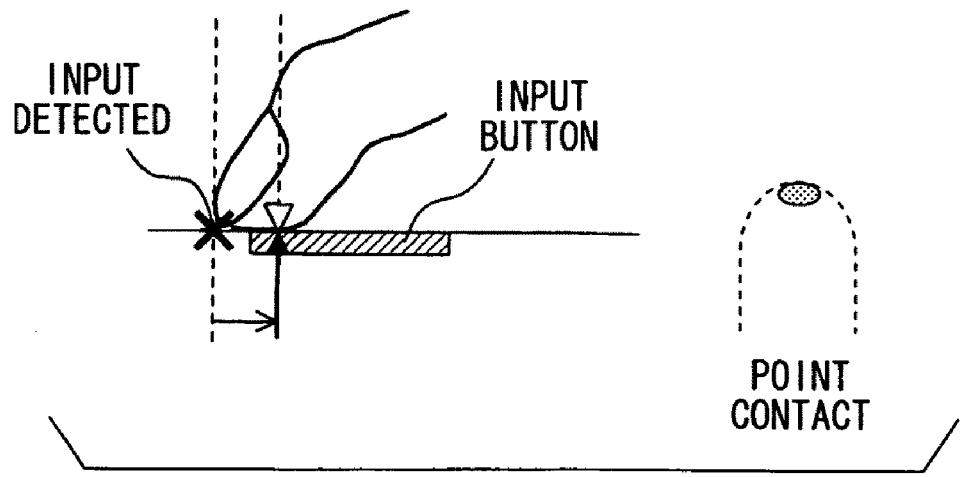
FIG. 13A is an explanatory diagram of a comparative example.
Figure 13B:
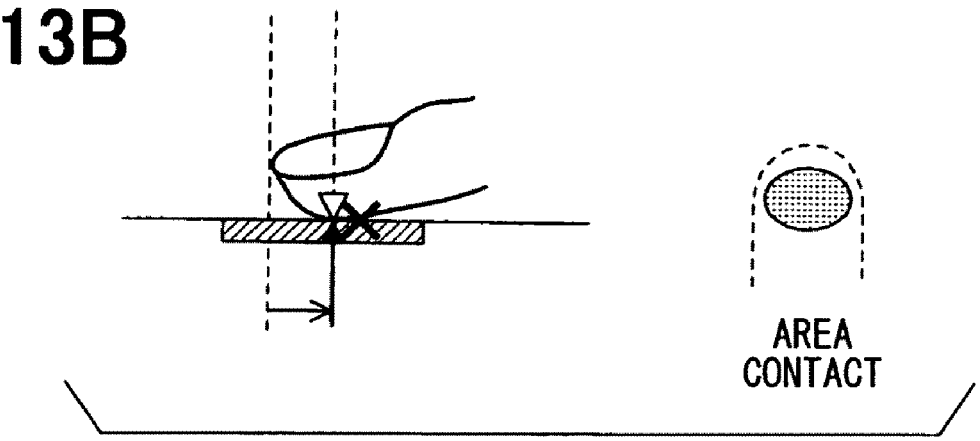
FIG. 13B is an explanatory diagram of another comparative example.
Figure 13C:
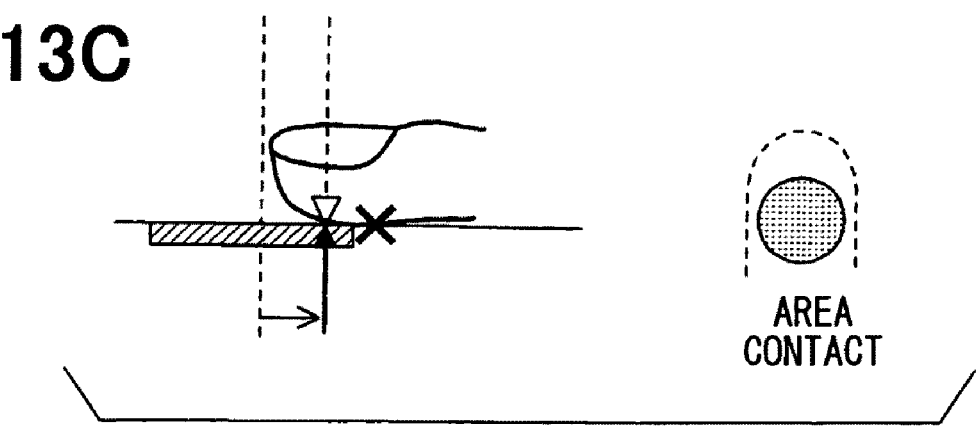
FIG. 13C is an explanatory diagram of still another comparative example.

For example, an apparatus in FIG. 13A uses a fingertip image on the touch panel to recognize the position to operate an input button on the monitor. When the tip of a nail presses the touch panel, the apparatus may cause variations between the actual touch position (indicated by a cross in FIG. 13A) and the fingertip position (indicated by an inverted triangle in FIG. 13A) acquired from the image. The fingertip position is equivalent to an operation position settled at a specified distance from the fingertip toward an operator. When the finger cushion presses the touch panel as shown in FIGS. 13B and 13C, finger angles may cause variations between the actual touch position and the fingertip position acquired from the image.

The above-mentioned prompter-based remote controlling apparatus may cause an unintended or inadvertent input operation such as an input error due to variations in touch inputs by an operator.

The structure described in the above-mentioned example can alleviate these problems.

Second Example

The following describes the second example. The same description as the first example will be omitted for simplicity.

Figure 7A:
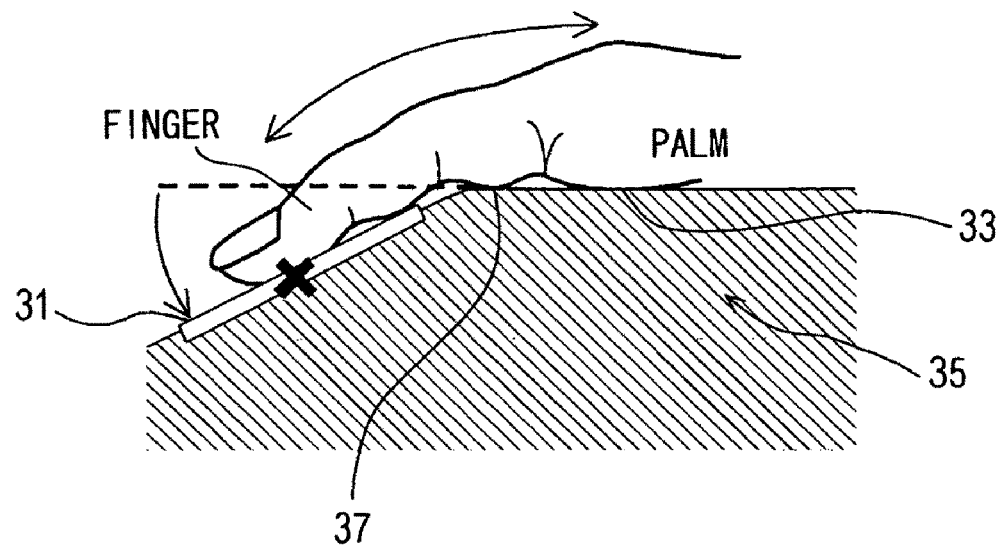
FIG. 7A is an explanatory diagram showing the input apparatus according to a second example of the first embodiment.

As shown in FIG. 7A, an input apparatus according to the example includes a touch panel 31 and an input section 35 having a palm rest 33 similarly to the first example.

In the example, the palm rest 33 is horizontal. There is an intermediate section 37 between the palm rest 33 and the touch panel 31. The top surface of the intermediate section 37 is smoothly curved.

The second example also provides the same effect as the first example.

The top surface of the intermediate section 37 may form an obtuse angle or may be multifaceted.

Figure 7B:
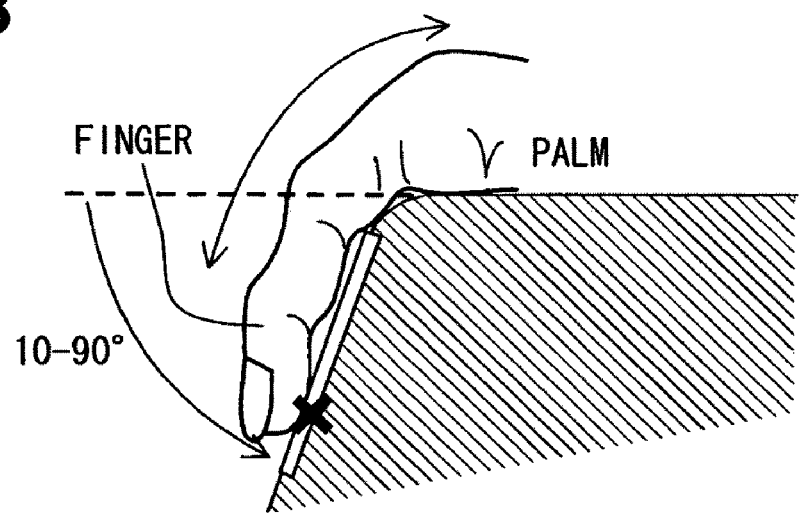
FIG. 7B is another explanatory diagram showing the input apparatus according to a modification of the second example.

As shown in FIG. 7B, a tilt angle is formed between the touch panel 31 and the flat surface of the palm rest 33. The tilt angle is selectable in the range between 10 and 90 degrees. The tilt angle is also applicable to the other examples.

Third Example

The following describes the third example. The same description as the first example will be omitted for simplicity.

Figure 8:
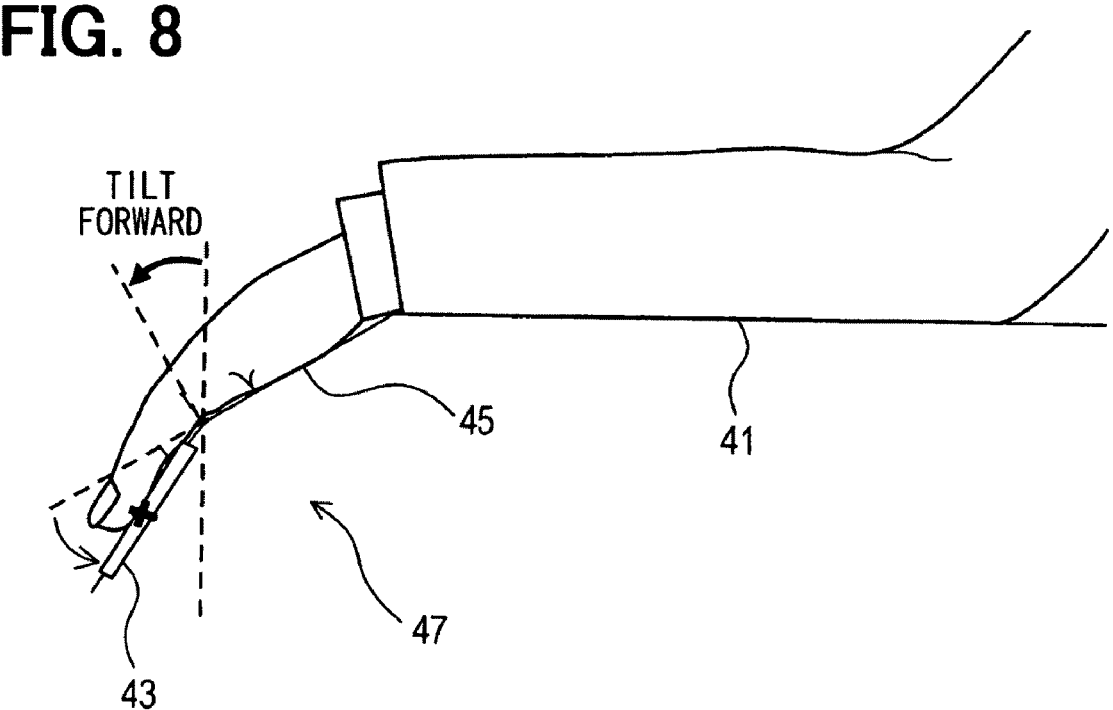
FIG. 8 is an explanatory diagram showing the input apparatus according to a third example of the first embodiment.

As shown in FIG. 8, an input apparatus according to the example includes an input section 47 connected to the front (the left of the drawing) of a horizontally extending armrest 41. The input section 47 includes a touch panel 43 and a palm rest 45.

Compared to the first example, the input section 47 largely tilts forward. The palm rest 45 tilts forward from the front end of the armrest 41 at a large tilt angle (e.g., 30 degrees) against the top surface of the armrest 41. The touch panel 43 tilts forward from the front end of the palm rest 45 at a tilt angle (e.g., 30 degrees) similarly to the first example against the top surface of the palm rest 45.

The third example provides the same effect as the first example. In particular, the third example connects the input section 47 to the front of the armrest 41. The hand position can be stabilized.

Fourth Example

The following describes the fourth example. The same description as the first example will be omitted for simplicity.

Figure 9:
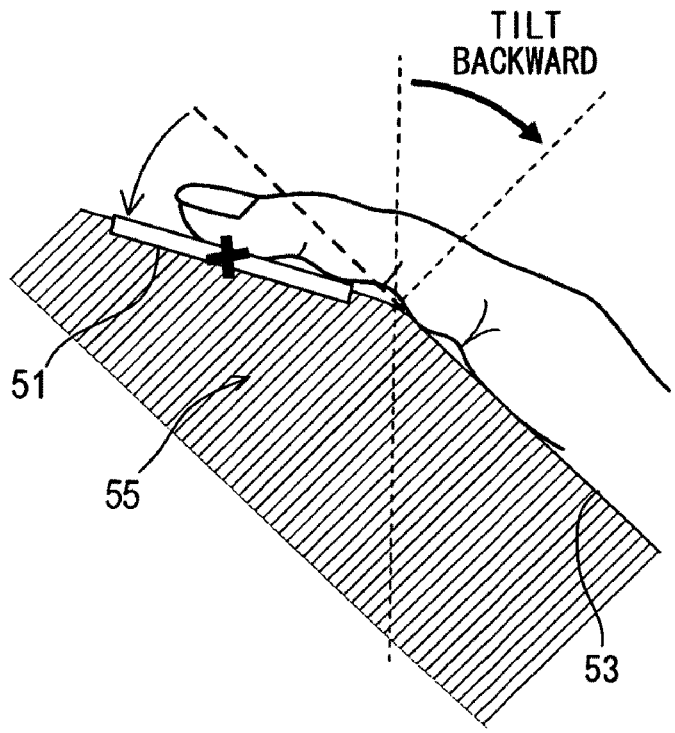
FIG. 9 is an explanatory diagram showing the input apparatus according to a fourth example of the first embodiment.

As shown in FIG. 9, an input apparatus according to the example includes an input section 55 inside the door. The input section 55 includes a touch panel 51 and a palm rest 53 similar to the first example.

The example assumes that a driver's seat is distant from a door and the driver horizontally moves his or her hand from the steering wheel to the door for operating the input section 55. In consideration for this, the angle of the input section 55 is configured so as to naturally position his or her palm or fingertip.

Compared to the first example, the input section 55 according to the fourth example tilts backward as a whole. The palm rest 53 tilts backward 40 degrees, for example, with reference to the horizontal surface. Similarly to the first example, the touch panel 51 tilts forward 30 degrees with reference to the palm rest 53.

The second example also provides the same effect as the first example.

Fifth Example

The following describes the fifth example. The same description as the third example will be omitted for simplicity.

Figure 10:
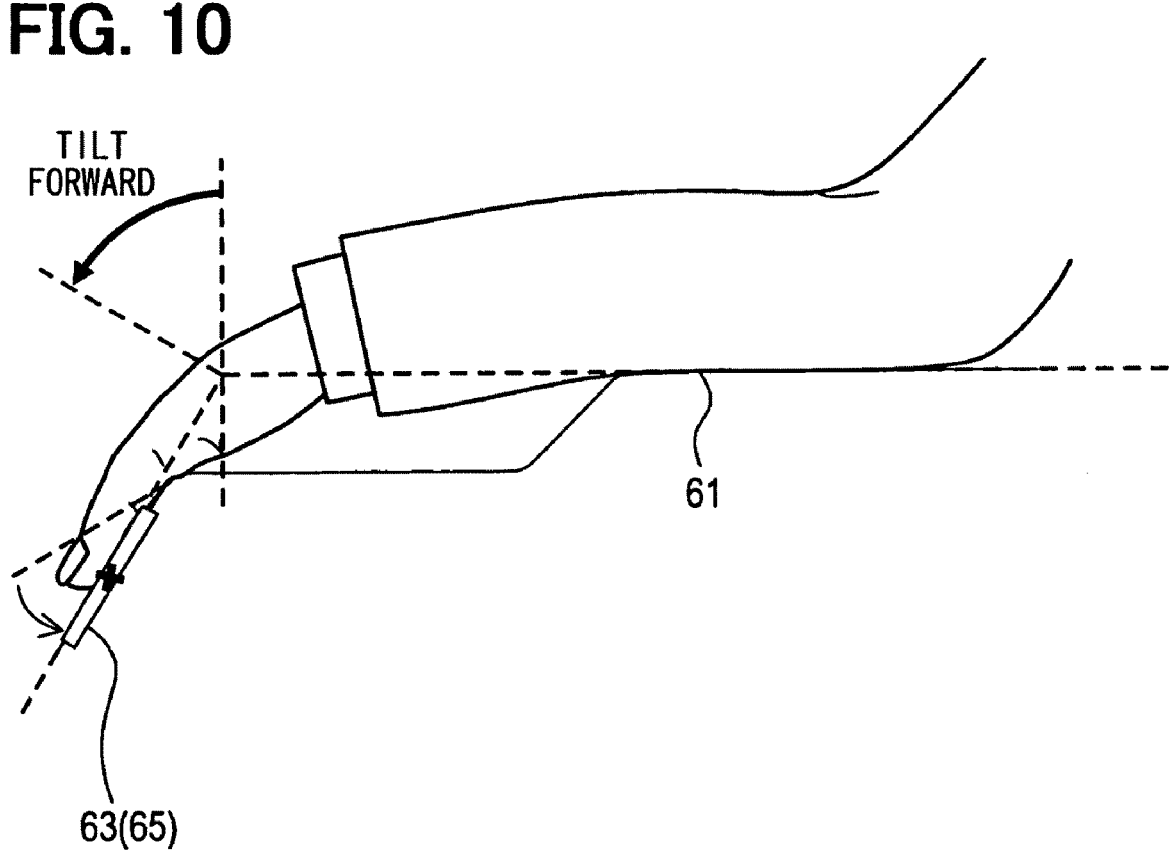
FIG. 10 is an explanatory diagram showing the input apparatus according to a fifth example of the first embodiment.

As shown in FIG. 10, an input apparatus according to the example includes an input section 63 provided for the front (the left of the drawing) of a horizontally extending armrest 61.

The input section 63 according to the example has no palm rest and is provided with only a touch panel 65. The touch panel 65 tilts forward 60 degrees, for example, with reference to the top surface of the armrest 61.

The armrest 61 supports the driver's arm and naturally determines the palm position and the tilt angle. For this reason, only the touch panel 65 is provided for a position where the fingertip touches.

The fifth example also provides the same effect as the third example.

Sixth Example

The following describes the sixth example. The same description as the first example will be omitted for simplicity.

Figure 11A:
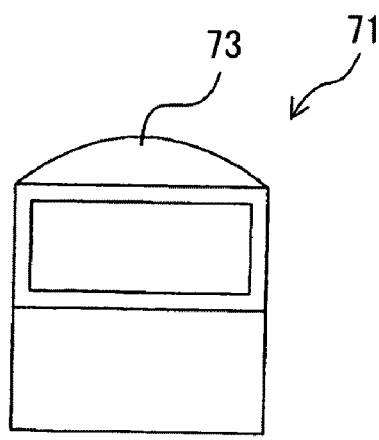
FIG. 11A is an explanatory diagram showing the input apparatus according to a sixth example of the first embodiment.
Figure 11B:
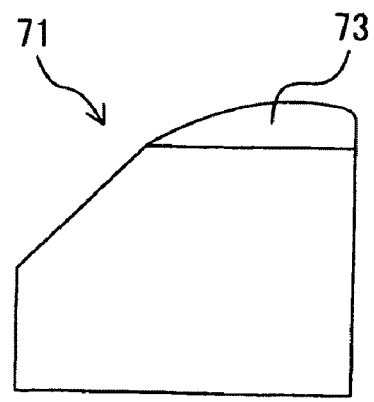
FIG. 11B is an explanatory diagram showing the input apparatus according to the sixth example.

As shown in FIGS. 11A and 11B, an input apparatus according to the example includes an input section 71 and a palm rest 73. The top surface of the input section 71, namely, that of the palm rest 73, is curved like that of a mouse device, for example.

In addition to the same effect as the first example, the sixth example stabilizes the position of a palm or fingertip when the palm is placed on the palm rest 73.

The top surface of the palm rest 73 may be curved only along the front-back or left-right direction of the vehicle. The top surface of the palm rest 73 may be shaped into not only a curved surface but also a polyhedron or a combination of the curved surface and the flat surface.

Seventh Example

The following describes the seventh example. The same description as the first example will be omitted for simplicity.

The seventh example does not use the touch panel as described in the above-mentioned examples. The touch panel is replaced by an operation panel (not shown) capable of transmitting infrared light. The operation panel is configured as a single switch. Except the operation panel, the description uses the reference numerals in FIG. 2.

A finger image is processed as described in the first example. Further, pressing the operation panel is assumed to be an operation at a specified finger position.

The control process according to the example is described below.

Figure 12:
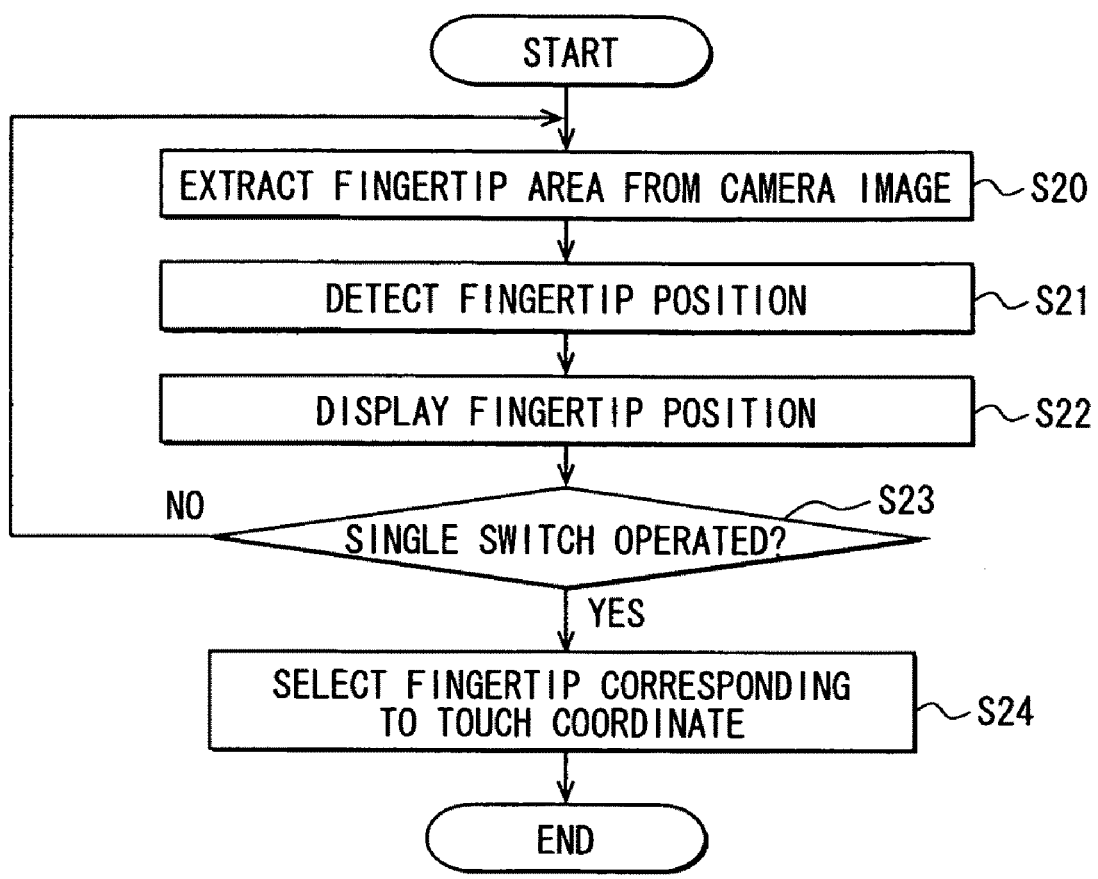
FIG. 12 is a flow chart showing a process of the input apparatus according to a seventh example of the first embodiment.

At S20 of the flow chart in FIG. 12, the control section uses camera images (lit image and unlit image) acquired by driving the lighting section 7 and the imaging section 9. The control section then extracts a fingertip area indicating the fingertip according to the above-mentioned technique of using a difference image.

At S21, the control section 11 detects a fingertip position from the extracted finger area.

At S22, the control section displays the fingertip position on a menu image. In addition, the control section superimposes a semi-transparent fingertip image on the menu image.

At S23, the control section determines whether or not the operation panel as a single switch is operated. When the determination is affirmative, the control section proceeds to S24. When the determination is negative, the control section returns to S20.

At S24, the control section selects the fingertip position acquired from the image process as an operation position of the display apparatus 3 and then terminates the process.

The control section assumes that the selected fingertip position is touched like the touch panel, i.e., the operation button 25 is operated. The control section performs a process corresponding to the operation button 25.

The example can provided the same effect as the first example but also omit the touch panel.

While there have been described the examples of the first embodiment of the present invention, the first embodiment is not limited thereto and may be embodied in various modifications.

(1) For example, the input section may be provided for the steering wheel. In this case, the palm rest and the touch panel are provided along the circumferential direction of the steering wheel. The touch panel is positioned toward the end.

(2) The input section may be provided for the left and right sides of a seat In this case, the palm rest and the touch panel are provided vertically. The touch panel is placed toward the bottom.

The following describes aspects of the disclosure according to the first embodiment.

(1) As an aspect, an input apparatus includes: a finger input section for detecting a finger-input position; and a palm rest section for placing a palm when the finger input section is operated. The finger input section and the palm rest section are provided adjacently to each other. A surface of the finger input section tilts downward with reference to a forward extension of a surface of the palm rest section.

The input apparatus has the palm rest section for placing a palm. The hand is stably positioned, allowing a fingertip to easily touch an intended position on the finger input section.

The surface of the finger input section tilts downward from the surface of the palm rest section. When the palm is placed on the palm rest section, the finger input section is positioned so as to naturally bend the fingertip. The fingertip cushion naturally touches the surface of the finger input section. It is possible to always ensure a constant contact area of the driver's fingertip in contact with the finger input section, causing little variation in a force the driver feels when activating the finger input section. There is little chance of causing variations in the distance between the fingertip and a touch position to be touched for input.

Little variation in touch inputs provides a remarkable effect of minimizing an unintended or inadvertent input operation such as an input error.

(2) As an optional aspect, an angle between the surface of the finger input section and the extension of the palm rest section may range from 10 to 90 degrees or more preferably from 15 to 60 degrees.

As a result of ergonomic experiments, a palm placed on a flat surface causes the fingertip to naturally tilt downward 20 to 30 degrees as an average despite individual differences. We concluded that the range of angles between 20 and 60 degrees facilitates operations in consideration for onboard installation because a center console has a tilt angle of 10 to 30 degrees.

This is an example of preferable angles between the surface of the finger input section and the extension of the palm rest section.

(3) As an optional aspect, the surface of the palm rest section may include a flat surface, a curved surface, or a combination thereof.

This is an example of preferable shapes of the palm rest section. It is preferable to swell the surface of the palm rest section in accordance with the palm curvature.

(4) As an optional aspect, an intermediate section may be provided between the palm rest section and the finger input section and have a flat surface, a curved surface, or a combination thereof.

This is an example of preferred shapes between the palm rest section and the finger input section.

(5) As another aspect of the disclosure, an input apparatus includes: a finger input section for detecting a finger-input position; and an armrest section for placing an arm when operating the finger input section. A surface of the finger input section tilts downward with reference to a forward extension of a surface of the armrest section.

In this input apparatus, the surface of the finger input section tilts downward from the surface of the armrest section. When the arm is placed on the armrest section, the finger input section is provided so as to naturally position a fingertip. The fingertip cushion naturally touches the surface of the finger input section. It is possible to always ensure a constant contact area of the driver's fingertip in contact with the finger input section, causing little variation in a force the driver feels when activating the finger input section. There is little chance of causing variations in the distance between the fingertip and a touch position to be touched for input.

Little variation in touch inputs provides a remarkable effect of minimizing an unintended or inadvertent input operation such as an input error.

(6) As an optional aspect, an angle of 10 to 90 degrees may be provided between the surface of the finger input section and the extension of the armrest section.

This is an example of preferred angles between the surface of the finger input section and the extension of the armrest section.

(7) As an optional aspect, the surface of the finger input section may include a flat surface, a curved surface, or a combination thereof.

This is an example of preferred shapes of the finger input section.

(8) As an optional aspect, the input apparatus may include an imaging section for capturing (an image of) a finger on the finger input section. The input apparatus may perform an input process corresponding to the finger-input operation based on a signal from the finger input section and a signal from the imaging section.

The input apparatus uses a signal indicating an input position from the finger input section such as a signal indicating a position touched on the touch panel and a signal indicating a finger image from the imaging section. Using these signals, the input apparatus can make correspondence between the input position on the finger input section and the position of the finger image displayed on the display apparatus, for example. Accordingly, it is possible to easily determine which finger is used to operate which position on the display apparatus.

(9) As an optional aspect of the input apparatus, the finger input section may be arranged separately from a display apparatus that displays information about an image acquired from the finger input section and the imaging section.

The finger input section and the display apparatus may be arranged separately. The finger input section can be arranged so as to naturally position fingers. The display apparatus can be arranged so as to optimize visibility. Various devices can be easily operated.

(10) As an optional aspect, the input apparatus may extract a finger image indicating a finger on the input surface from an image captured by the imaging section.

Since the captured image contains the finger, it is possible to extract a finger image representing a finger shape and the like from that image. The finger image contains not only the captured finger image but also processed versions of the image such as a semi-transparent finger image and a mere outline of the finger image.

(11) As an optional aspect, the display apparatus may display an operation menu and superimpose the finger image.

This makes clear the relation between the finger position and the operation menu position. The operation menu can be easily operated. For example, it is possible to easily recognize which operation button is used on the display apparatus.

(12) As an optional aspect, the input apparatus may detect a fingertip position as an operation position on the display apparatus from the finger image.

When a specified distance from the fingertip is defined as a fingertip position for operations, for example, the fingertip position can be found from the finger shape.

(13) As an optional aspect, the input apparatus may perform a selection process for the operation menu based on a fingertip position detected from the finger image and a signal (e.g., touch signal from the touch panel) indicating a finger operation from the finger input section.

The input apparatus uses the finger position acquired from the finger image and the signal indicating an operation acquired from the finger input section. For example, let us consider that the display screen displays multiple fingers and that multiple fingertip positions are acquired from the finger images. In such case, the input apparatus can use a coordinate acquired from the touch signal to select an actually operated finger. The input apparatus can then determine the operation of an input button corresponding to the fingertip position of the finger, for example.

(14) As an optional aspect, an input surface of the finger input section for placing a finger may use a material capable of transmitting light the imaging section can capture. Herein, the input surface for placing fingers transmits light such as near-infrared light. The input apparatus can acquire a clear image of the finger by capturing the light passing through the input surface at the top or bottom thereof.

(15) As an optional aspect, the input apparatus may include: a light radiation section at a bottom of the input surface for radiating light to a bottom surface of the input surface; and the imaging section for capturing a bottom side of the input surface.

This is an example of arrangement of the light radiation section and the imaging section for capturing fingers.

(16) As an optional aspect, the input apparatus may include: a light radiation section at a bottom of the input surface for radiating light to a top surface of the input surface; and the imaging section at a top of the input surface for capturing a top side of the input surface.

The first embodiment shows an example of arrangement of the light radiation section and the imaging section for capturing fingers.

(17) As an optional aspect, the finger input section may be provided as a touch panel.

The first embodiment shows an example of the finger input section. When the touch panel is compatible with an analog resistive touch technology, a finger can be positioned by keeping slight contact with the finger input section. It is possible to effectively prevent an unintended input.

(18) As an optional aspect, the finger input section may be used as a simple switch for turning on or off an operation depending on a finger press state instead of detecting an input position activated by the finger.

This is an example of the finger input section. When the imaging section captures a finger, for example, operating the finger input section enables an input process on the assumption that the operation is performed at the position of the captured finger. A complex mechanism such as the touch panel can be omitted.

(19) As an optional aspect, the input apparatus may be used for at least one of a car navigation operation, an audio operation, an air conditioner operation, and a vein authentication.

The first embodiment shows an example of the use of the input apparatus. Various devices can be easily operated by naturally positioning fingers. The input apparatus captures fingers on the finger input section and therefore is capable of capturing a vein by adjusting the illumination and capturing directions. The input apparatus can be used for vein authentication.

(20) As an optional aspect, the input apparatus may be used inside a vehicle. Using the input apparatus inside a vehicle, a driver can efficiently operate various devices mounted on the vehicle.

(21) As an optional aspect, the input apparatus may be provided for at least one of a center console, a door, a seat, and a steering wheel. This is an example of preferred arrangement of the input apparatus. The height or direction of a driver's arm or hand depends on the position of the input apparatus or, more specifically, the finger input section or the palm rest section for placing the hand. It may be preferable to determine an inclination of the input apparatus or, more specifically, the finger input section or the palm rest section in accordance with the position.

Second Embodiment

Figure 14:
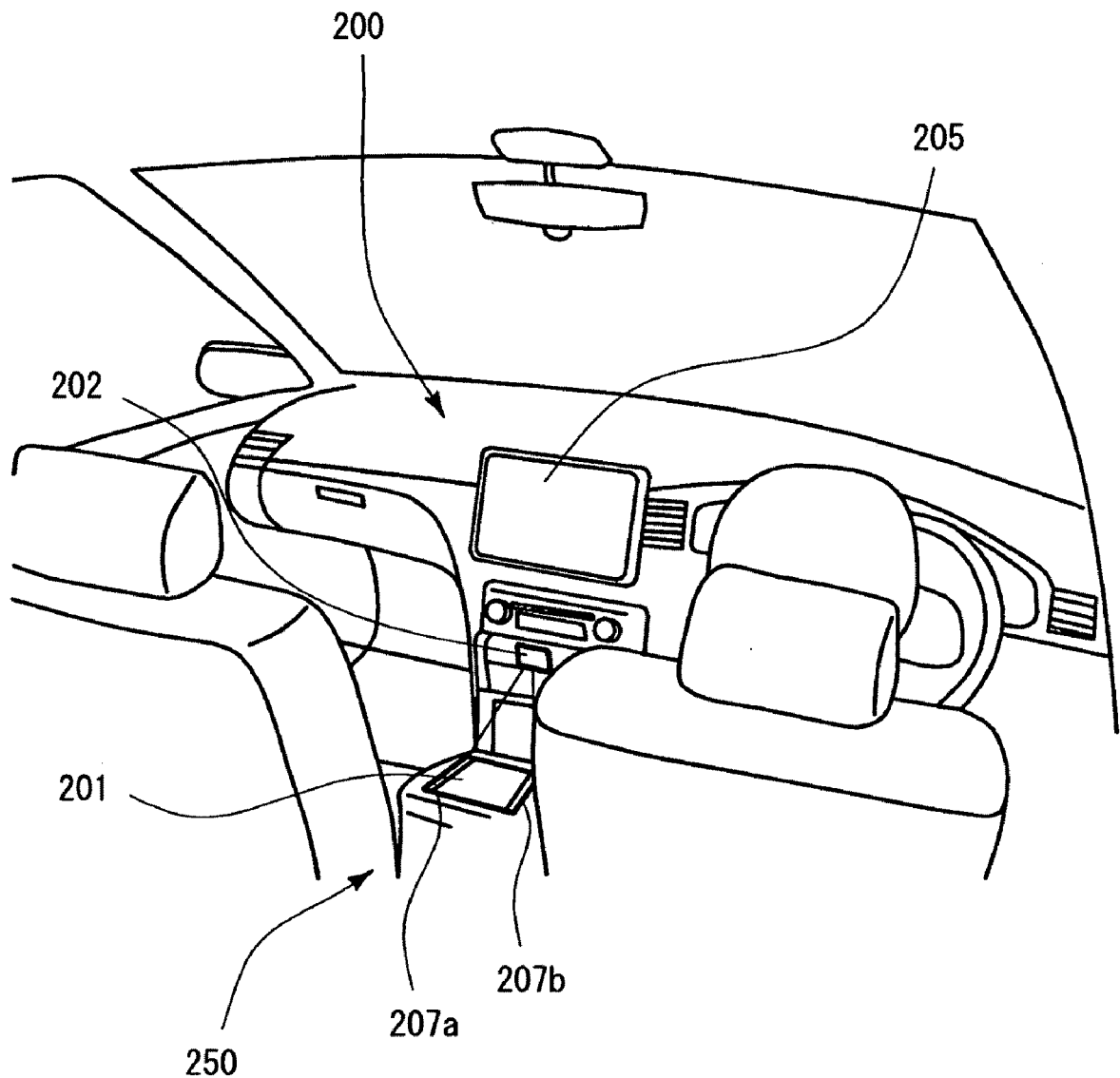
FIG. 14 is a schematic diagram showing an input apparatus according to a second embodiment of the present invention.
Figure 15:
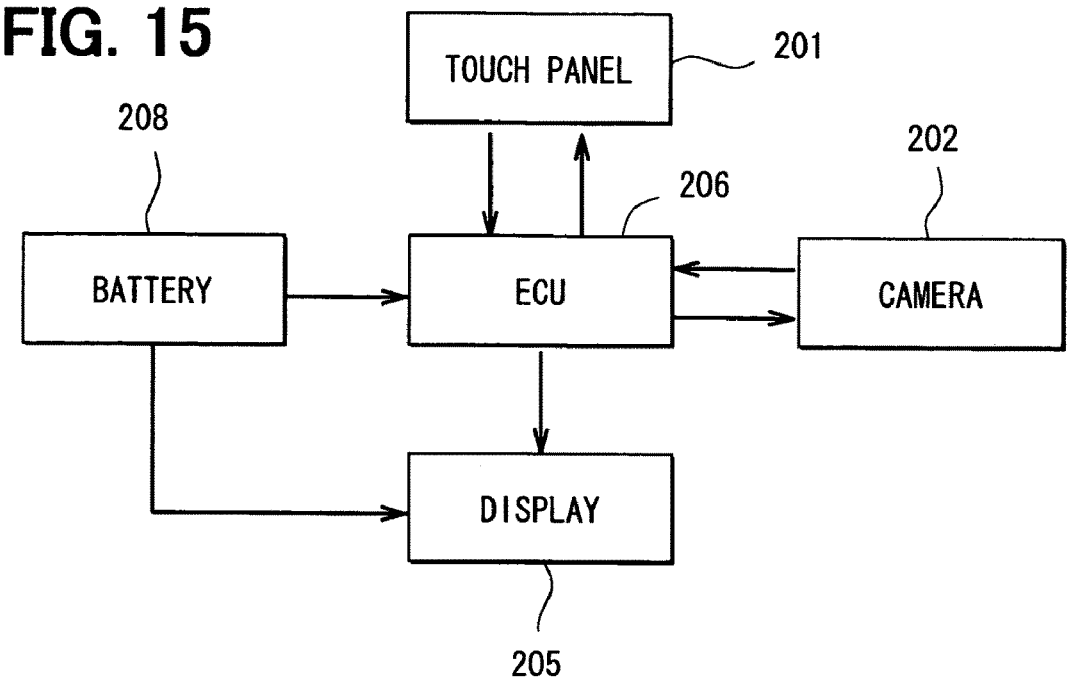
FIG. 15 is a block diagram of the input apparatus.
Figure 16:
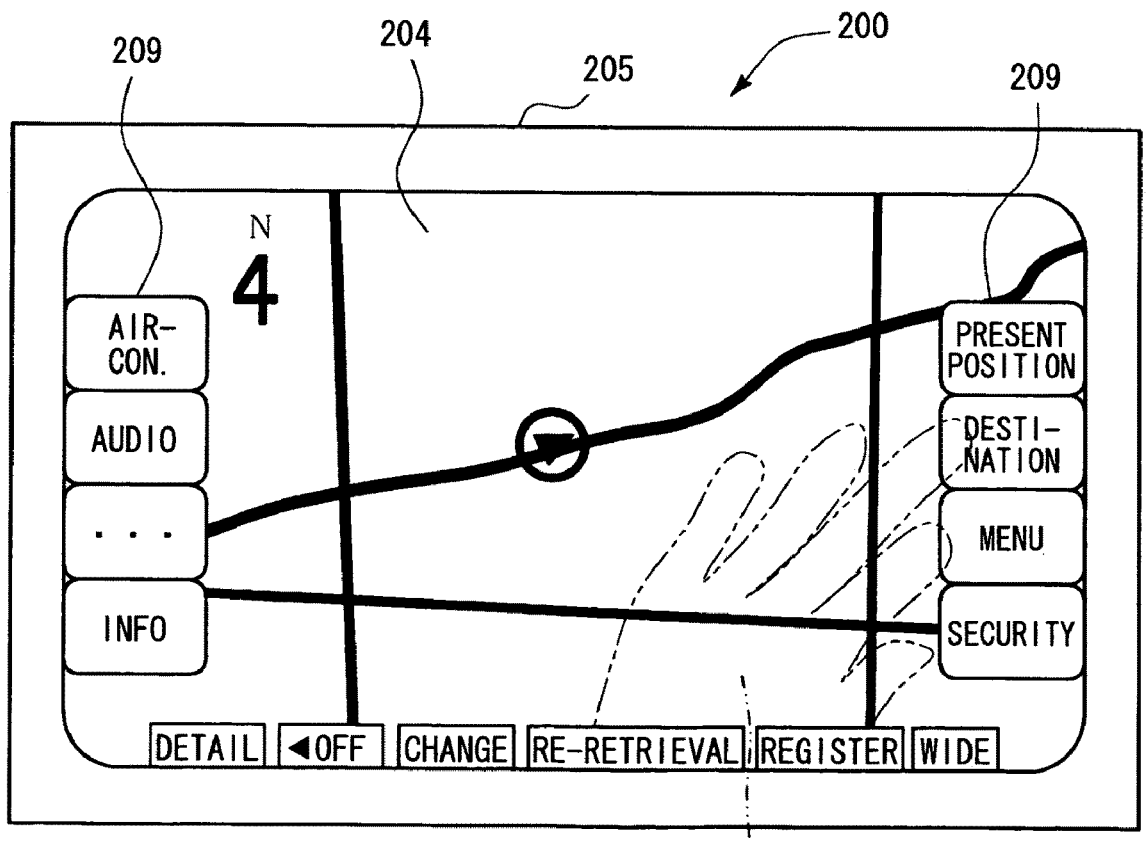
FIG. 16 shows a display screen of a display according to a second embodiment.
Figure 17:
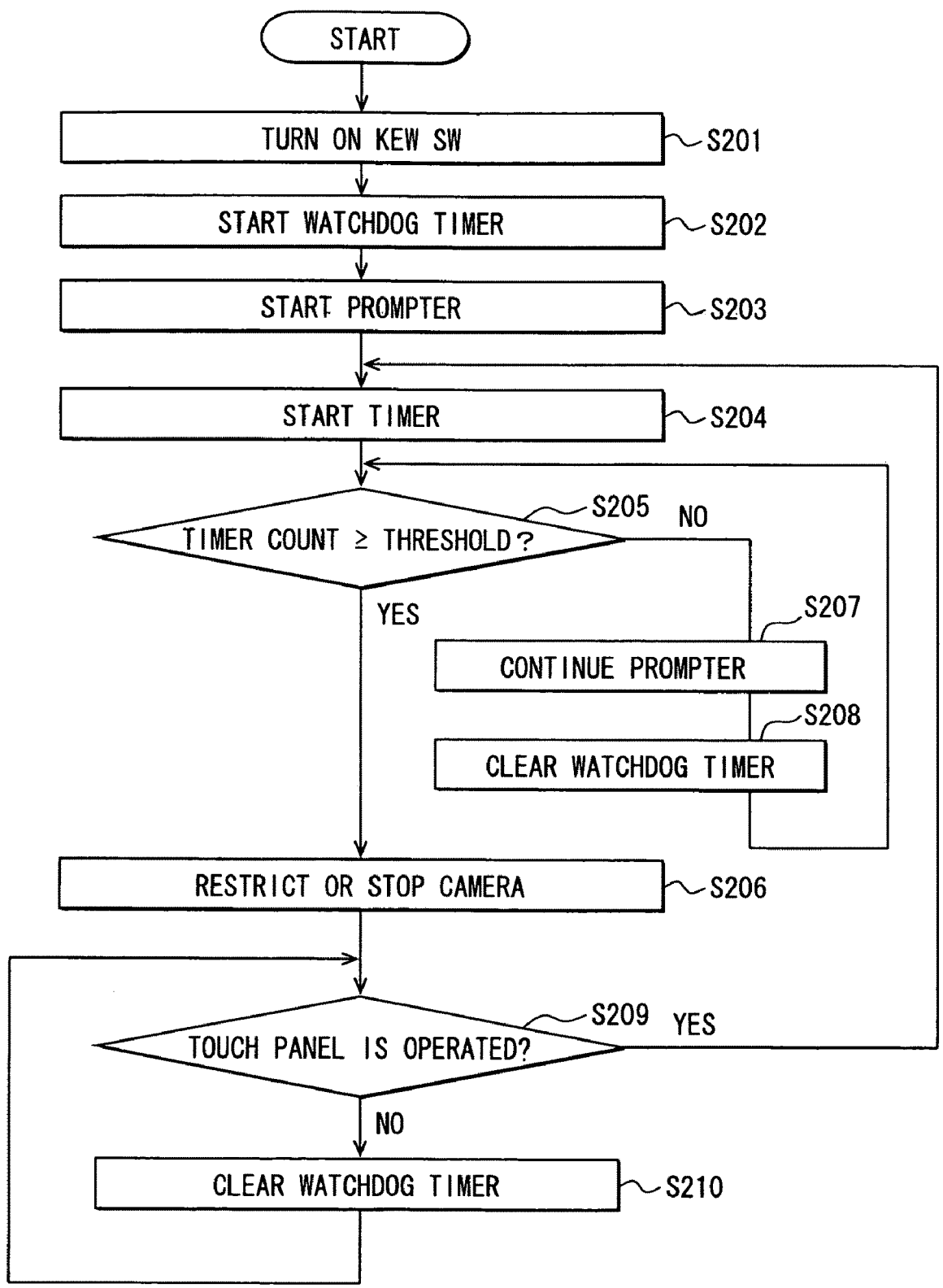
FIG. 17 is a flow chart showing an effect of the input apparatus.

A second embodiment will be described. FIG. 14 is a schematic diagram showing an input apparatus 250 according to the second embodiment. FIG. 15 is a block diagram of the input apparatus 250. FIG. 16 shows a display screen of a display 205. FIG. 17 is a flow chart showing an operation of the input apparatus 250.

Example 1

The following describes a prompter-based input apparatus 250 as an example of the input apparatus according to the second embodiment. As shown in FIGS. 14 and 15, the input apparatus 250 according to the example may be built in a vehicular navigation system 200 or may be mounted on a vehicle as a stand-alone ECU. The input apparatus 250 is installed near a driver's seat of the vehicle or at the center console in this example. The input apparatus 250 includes a touch panel 201 (operation section), a video camera 202 (shape acquisition means or unit), a finger shape recognition means or unit, a superimposed image generation means or unit, a display 205 (display means or unit), and an ECU 206 (control means or unit). The touch panel 201 is operated by a finger of an occupant such as a driver or another occupant on the passenger seat or the rear seat. The video camera 202 captures an occupant's finger placed on the touch panel 201 and acquires a finger shape as information (finger shape information). The finger shape recognition unit recognizes the finger shape based on the finger shape information acquired by the video camera 202. The superimposed image generation unit generates a finger image 203 (see FIG. 16) superimposed on a map image 204 (see FIG. 16). The finger image 203 corresponds to the finger shape recognized by the finger shape recognition unit. The map image 204 works as a background image corresponding to an operation screen of each device mounted on the vehicle. The display 205 displays a superimposed image generated by the superimposed image generation unit. The ECU 206 manages the operation section, the shape acquisition unit, the finger shape recognition unit, the superimposed image generation unit, and the display unit. The video camera 202 is mounted slantwise at the bottom of the display 205 in the instrument panel so as to be able to capture the occupant's finger shape placed on the touch panel 201. The input apparatus 250 according to the example houses the finger shape recognition unit and the superimposed image generation unit in the ECU 206. The touch panel 201 is provided with a light emitting section 207a and a light receiving section 207b for a sensor such as an infrared ray sensor. When an occupant places his or her finger on the touch panel 201, the finger interferes with an infrared ray radiated from the light emitting section 207a. The interference varies the amount of infrared ray incident on the light receiving section 207b, making it possible to detect placement of the finger on the touch panel 201. The input apparatus 250 according to the example is integrally provided with the touch panel 201, the video camera 202, the display 205, and the light emitting section 207a and the light receiving section 207b of the sensor.

As shown in FIG. 15, a battery 208 of the vehicle supplies electric current that operates the touch panel 201, the video camera 202, and the display 205 via the ECU 206. When the display 205 is built into the navigation system, the battery 208 directly supplies current to the display 205.

A timer (not shown) is built into the input apparatus 250 according to the example. The timer may be an external device or may be provided as software using a microcomputer. The timer measures the time during which no occupant finger is placed on the touch panel 201 after a vehicle key switch is turned on.

With reference to a flow chart in FIG. 17, the following describes operation of the input apparatus 250 according to the example. When the vehicle key switch is turned on (S201), a watchdog timer starts a process to monitor the ECU 206 (S202). The input apparatus 250 starts a prompter process (S203). The process operates the touch panel 201, the sensor, and the display 205. The display 205 displays the map image 204 of the navigation system 200. At the same time, the timer starts the measurement (S204).

When an occupant places his or her finger on the touch panel 201, the video camera 202 captures the occupant's finger on the touch panel 201. The display 205 displays the finger image 203 superimposed on the map image and a switch image 209. The finger image 203 may be preferably transmissive so that the finger image 203 does not hide the map image 204 and the switch image on the display 205.

When the timer count value is greater than or equal to a threshold value (Yes at S205), the main process restricts or stops operations of the touch panel 201 and the video camera 202. This decreases the current supplied to the touch panel 201 and the video camera 202. When the timer count value is smaller than the threshold value (No at S205), the main process inherits the prompter process of the input apparatus 250 (S207) and clears the watchdog process (S208).

The sensor of the touch panel 201 is active even though the operation of the touch panel 201 or the video camera 202 is restricted or stopped. When the occupant places his or her finger on the touch panel 201 (Yes at S209), the touch panel 201 and the video camera 202 restart and the input apparatus 250 restarts the prompter process (S203). The current for operating the touch panel 201 is much smaller than the current for operating the video camera 202.

When the occupant's finger is not placed on the touch panel 201 and no input occurs on the touch panel 201 (No at S209), the main process clears the watchdog timer (S210). The state remains until a finger is placed on the touch panel 201.

The above-mentioned example measures the time during which the occupant does not place his or her finger on the touch panel 201. Further, it may be preferable to allow the timer to measure the time elapsed after the occupant operates the touch panel 201 and then lifts his or her finger off the touch panel 201. Also in this case, it is possible to restrict or stop the operation of the touch panel 201 or the video camera 202 and therefore decrease the current supplied to them.

In the above-mentioned example, the video camera 202 captures the occupant's finger to acquire the finger image 203. Further, the touch panel 201 may be pressure-sensitive. The finger image 203 of the occupant may be acquired by detecting the pressure of the finger placed on the touch panel 201. In this case, the touch panel 201 functions as the operation section and the shape acquisition unit.

The video camera 202 may be installed elsewhere than immediately below the display 205 on the instrument panel. For example, the video camera 202 may be attached to a ceiling panel immediately above the touch panel 201 or may be placed in a console box immediately below the touch panel 201.

The video camera 202 may be used as a means or unit for detecting placement of the occupant's hand on the touch panel 201. In this case, the video camera 202 may detect the time elapsed during the absence of the occupant's hand to be placed and restrict or disable functions other than the detection function. This makes it possible to decrease the consumption current for the entire input apparatus.

Figure 18:
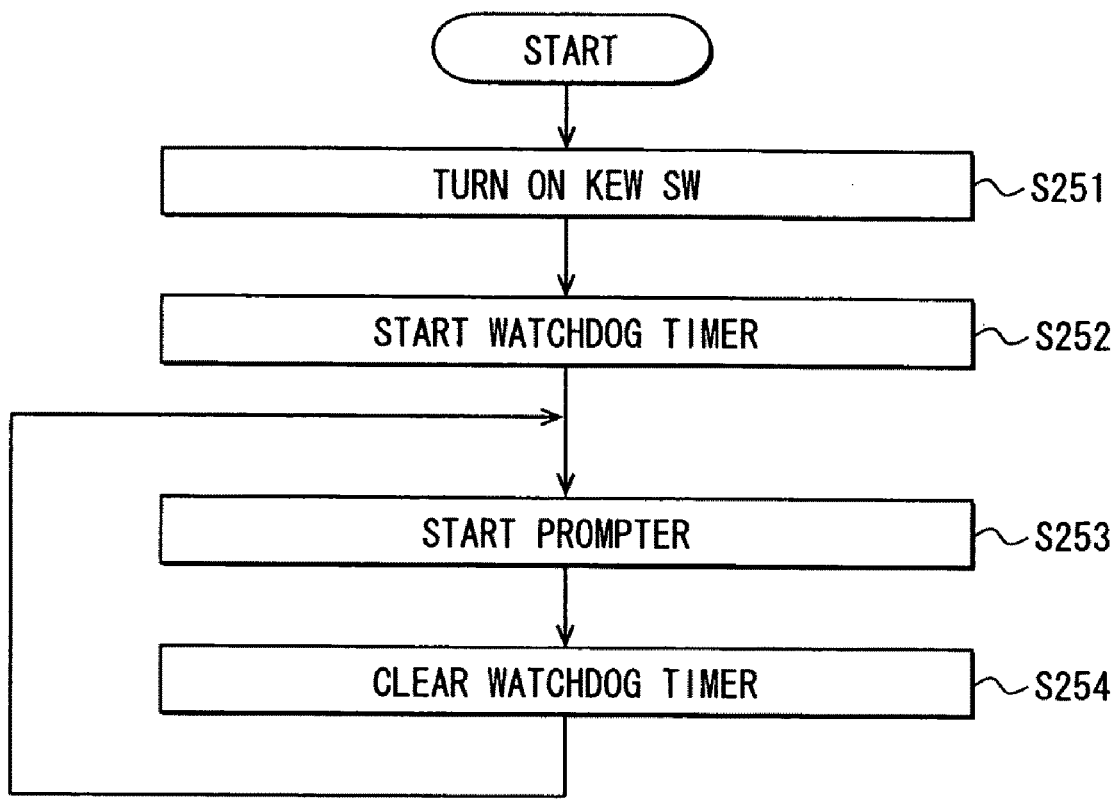
FIG. 18 is a flow chart showing an effect of a conventional input apparatus.

An effect of the above-mentioned embodiment will be described in comparison with comparative examples. FIG. 18 shows a flow of a effect in a conventional prompter-based input apparatus as a comparative example. When a vehicle key switch is turned on (S251), the conventional prompter-based input apparatus allows a watchdog timer built in the ECU to start a process to monitor a computer (S252). The input apparatus starts a prompter process (S253). The prompter process clears the watchdog timer (S254). The prompter process of the input apparatus continues until the vehicle key switch is turned off.

This type of input apparatus features a small number of operations (or operation frequency) in comparison with steering wheel or accelerator pedal operations. However, the conventional input apparatus consumes much electric current because the video camera is always powered or the touch panel is always ready for operation. The current is supplied from a battery or an alternator of the vehicle. This may increase electricity generated or degrade the regeneration efficiency for hybrid cars.

The structure according to the embodiment may alleviate these problems.

Aspects of the disclosure of the second embodiment is summarized below.

As an aspect of the disclosure, the input apparatus includes: an operation section mounted on a vehicle; a shape acquisition unit for acquiring finger shape information about an occupant operating the operation section; a finger shape recognition unit for recognizing a finger shape based on finger shape information acquired by the shape acquisition unit; a superimposed image generation unit for generating a superimposed image corresponding to a finger shape that is recognized by the finger shape recognition unit and is superimposed on a background image corresponding to an operation screen of a device mounted on a vehicle; a display unit for displaying a superimposed image generated by the superimposed image generation unit; and a control unit for managing the operation section, the shape acquisition unit, the finger shape recognition unit, the superimposed image generation unit, and the display unit. The control unit includes a timer unit for measuring a time elapsed during absence of a finger of the occupant to be touched on the operation section and, when a time value measured by the timer unit becomes greater than or equal to a predetermined threshold value, restricts or stops an operation of at least one of the operation section, the shape acquisition unit, the finger shape recognition unit, and the superimposed image generation unit.

The input apparatus uses the above-mentioned method of decreasing a consumption current. The method restricts or stops an operation of the operation section or the shape acquisition unit when the time value measured by the timer unit becomes greater than or equal to a predetermined threshold value. The shape acquisition unit represents a video camera that captures the occupant's finger shape, for example. The operation section may be used as a touch panel that may function as the touch panel and the shape acquisition unit. It is possible to decrease the amount of current consumed by the operation section and the shape acquisition unit.

A sensor may be attached so as to detect placement of the occupant's finger on the operation section. The operation section or the shape acquisition unit may operate when the sensor detects the occupant's finger.

In this manner, the operation section or the shape acquisition unit restarts the temporarily restricted or stopped operation. The occupant of the vehicle can seamlessly use the operation section.

Third Embodiment

With reference to drawings, the following describes a third embodiment of the input apparatus according to the present invention.

Figure 19:
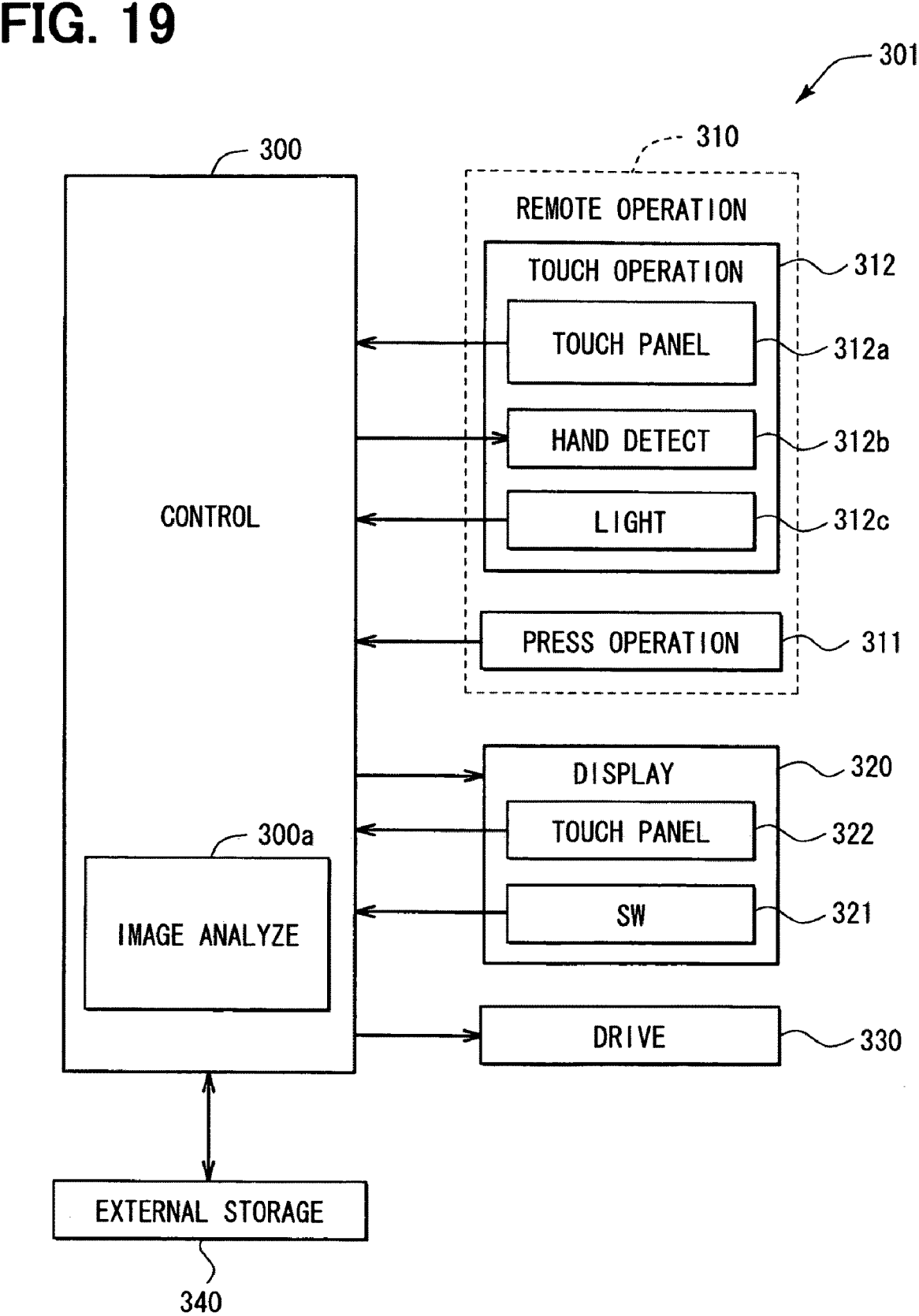
FIG. 19 is a block diagram showing a configuration of the input apparatus according to a third embodiment of the present invention.

FIG. 19 is a block diagram showing a configuration of the input apparatus according to the third embodiment. The embodiment provides a configuration that connects a remote operation section 310 and a display apparatus 320 with a control section 300.

The display apparatus 320 can display operation images such as a switch image or an operation icon for touch operation on a display screen. The display apparatus 320 according to the embodiment is a color display apparatus. The display apparatus 320 is provided at the front of the vehicle away from a driver's seat 302D and a passenger seat 302P so that occupants sitting on the seats 302D and 302P can view the display apparatus 320. A liquid crystal panel, a plasma display, or an organic EL display may be used for the display apparatus 320.

Figure 20:
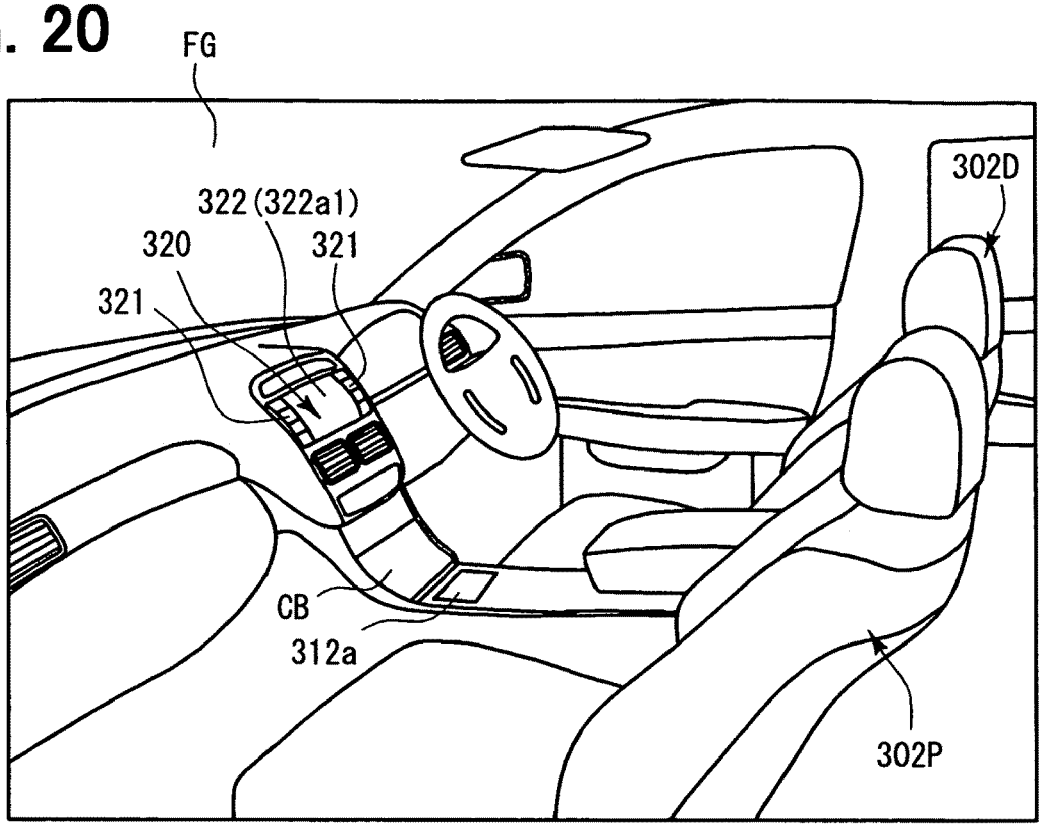
FIG. 20 schematically shows a vehicle compartment where the input apparatus in FIG. 19 is installed.
Figure 21:
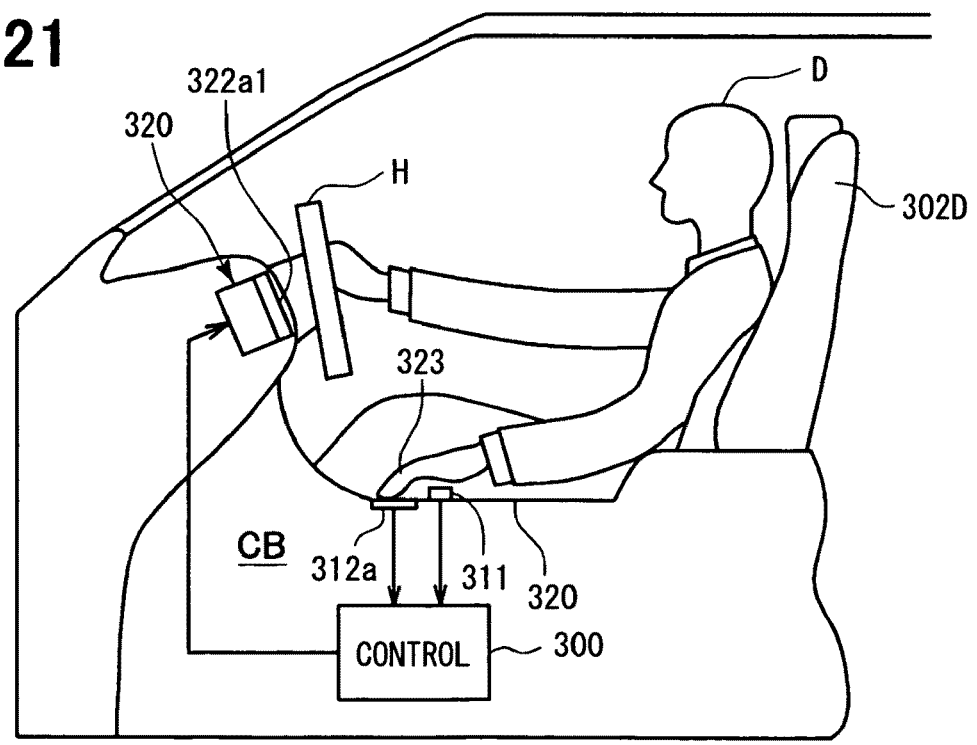
FIG. 21 is a schematic diagram showing an operation example of the input apparatus in FIG. 19.

The remote operation section 310 is an auxiliary operation section that remotely controls input operation on an operation image displayed on the screen of the display apparatus. The remote operation section 310 includes a touch operation section 312 and a press operation section 311. As shown in FIGS. 20 and 21, the remote operation section 310 is provided for a center console CB at the middle between the bottom of the driver's seat 302D and that of the passenger seat 302P in the vehicle. The position of the remote operation section 310 is selected so that users sitting on the driver's seat 302D and the passenger seat 302P can operate the remote operation section 310 while sitting. More specifically, the remote operation section 310 is fixed to a position that is nearer to a passenger on the seat than the display apparatus 320. In other words, the remote operation section 310 is provided at a position that belongs to an area, which is arranged between the bottom of the driver's seat 302D and that of the passenger seat 302P and nearer to the front of the vehicle.

Figure 22:
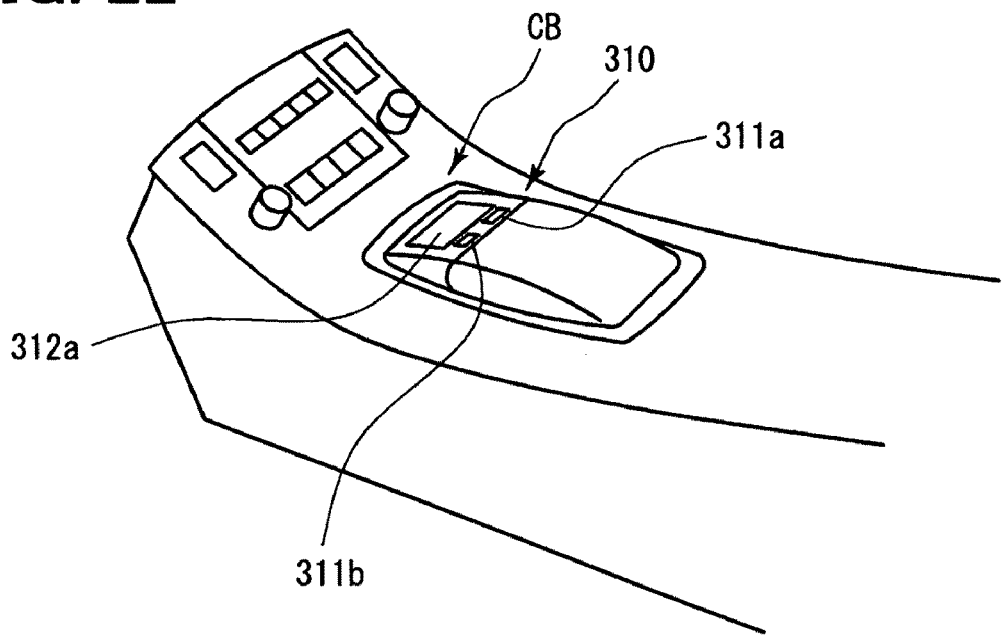
FIG. 22 is a schematic perspective view showing a remote operation section in the input apparatus in FIG. 19.
Figure 23:
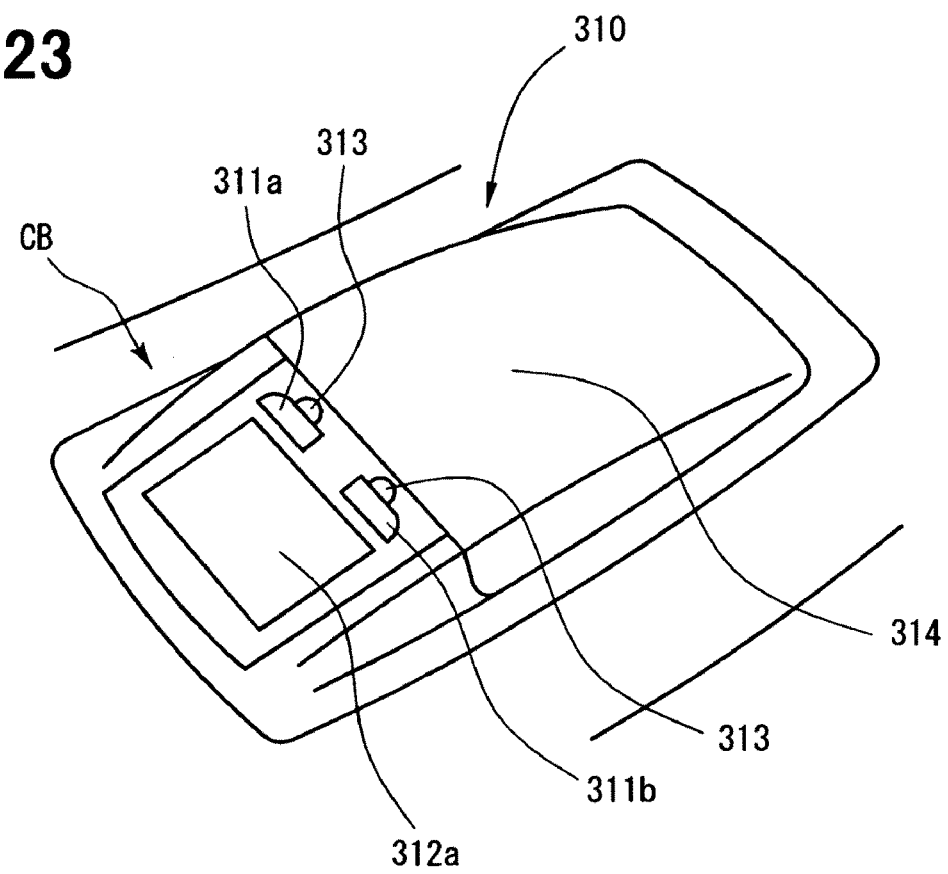
FIG. 23 is an enlarged view of the remote operation section in FIG. 22.

As shown in FIGS. 22 and 23, the remote operation section 310 according to the embodiment is provided with a curved seating section 314 for placing a hand for ease of operations. The placed hand can fit the curved surface. The touch operation section 312 (touch operation surface 312a1) and the press operation section 311 are provided at positions that are expected to correspond to fingers of the hand placed on the seating section 314. The press operation section 311 is provided nearer to the rear of the vehicle than the touch operation section 312. The touch operation section 312 (touch operation surface 312a1) is farther from shoulder positions of operators such as the driver and the passenger beside the driver than the press operation section 311. The press operation section 311 is positioned so as to be more easily operable. As shown in FIG. 23, a depressed section 313 is formed adjacently to the press operation section 311 toward the rear of the vehicle. The depressed section 313 is provided to facilitate operations on the press operation section 311.

The touch operation section 312 includes an operation panel 312a whose main surface 312a1 functions as the touch operation surface and is positioned opposite to the top of the vehicle compartment. The touch operation section 312 detects an operation position corresponding to the touch operation on the operation panel 312a and outputs a touch input signal reflecting the operation position. The control section 300 receives the touch input signal. Based on the received touch input signal, the control section 300 functions as a control means or unit for providing corresponding control. The touch operation section 312 according to the embodiment can be configured as a resistive touch switch (touch sensor), for example.

The press operation section 311 is provided near the operation panel 312a. The press operation section 311 represents a switch such as a push switch or a seesaw switch. The press operation section 311 outputs a press input signal when detecting specified deflection of an operation knob due to the press operation. The control section 300 receives the press input signal. Based on the received press input signal, the control section 300 functions as a control means or unit for providing corresponding control. In this example, the two press operation sections (push switches) 311 are provided.

A drive section 330 is controlled based on operations on the touch operation section 312 and the press operation section 311. The drive section 330 can be a target of functions including a navigation function of onboard electronic devices. There may be various types of drive sections capable of air conditioner, power window, and audio functions as well as the navigation function.

The control section 300 is mainly configured as a known microcomputer including an unshown but known CPU, ROM, RAM, an input/output device, and a bus line connecting these components. The control section 300 provides various controls based on programs stored in a storage section such as the ROM and the external storage 340. The control section 300 can also use a LAN interface and an onboard LAN to acquire data from the outside such as another ECU.

Figure 24:
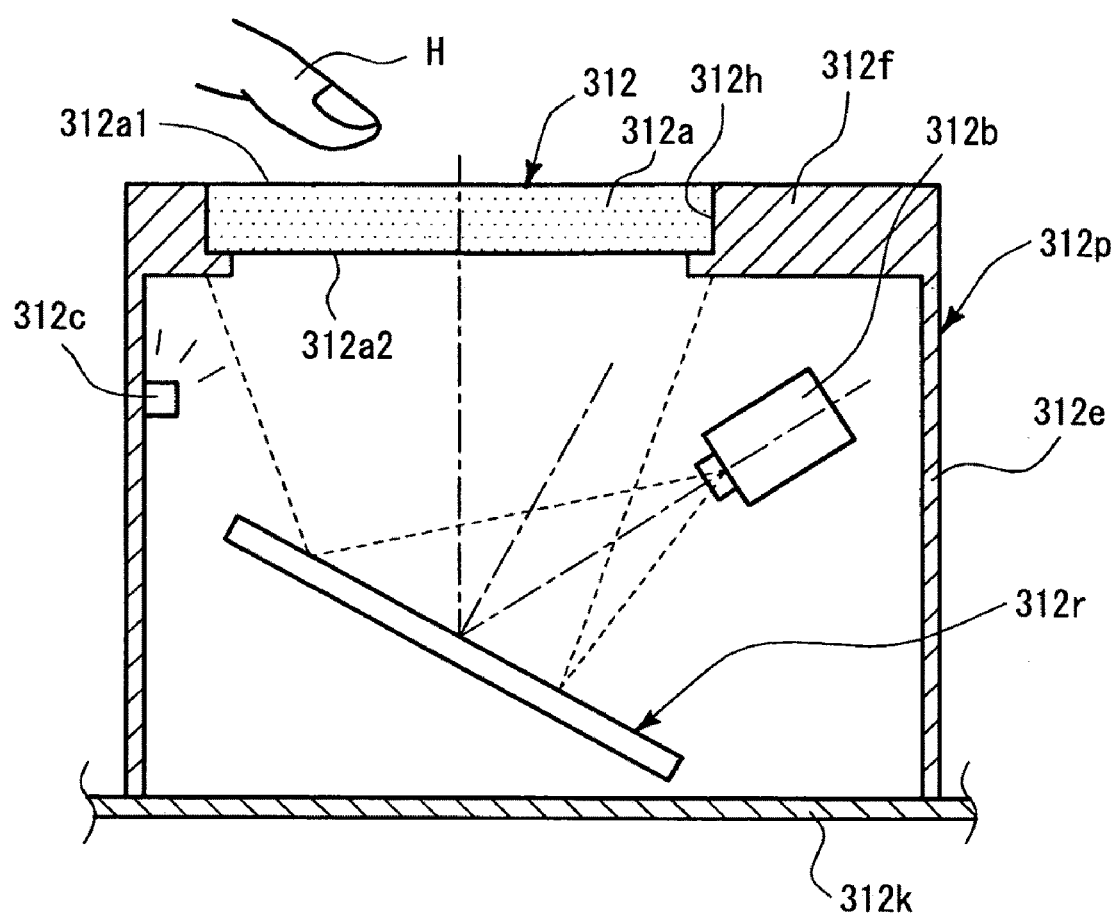
FIG. 24 is a schematic sectional view showing a touch operation section in the remote operation section in FIG. 22.

A hand detection section (touching hand detection means or unit) 312m is provided to detect a hand that operates the touch operation section 312. The hand detection section 312m detects the hand adjacent to the touch operation surface 312a1. As shown in FIG. 24, the hand detection section 312m includes a light source 312c and a camera (near object capturing means or unit) 312b. The light source 312c radiates light with a predetermined wavelength band. The camera 312b captures the surface 312a1 from a reverse side 312a2 of the operation panel 312a. The operation panel 312a is transmissive so that the camera 312b is capable of capturing. The operation panel 312a transmits the light radiated from the light source 312c from the reverse side 312a2 to the surface 312a1. Image data captured by the camera 312b is supplied to the control section 300. The control section 300 recognizes the presence of the hand based on an analysis process of an image analysis section (or image processing section) 300a.

Figure 25:
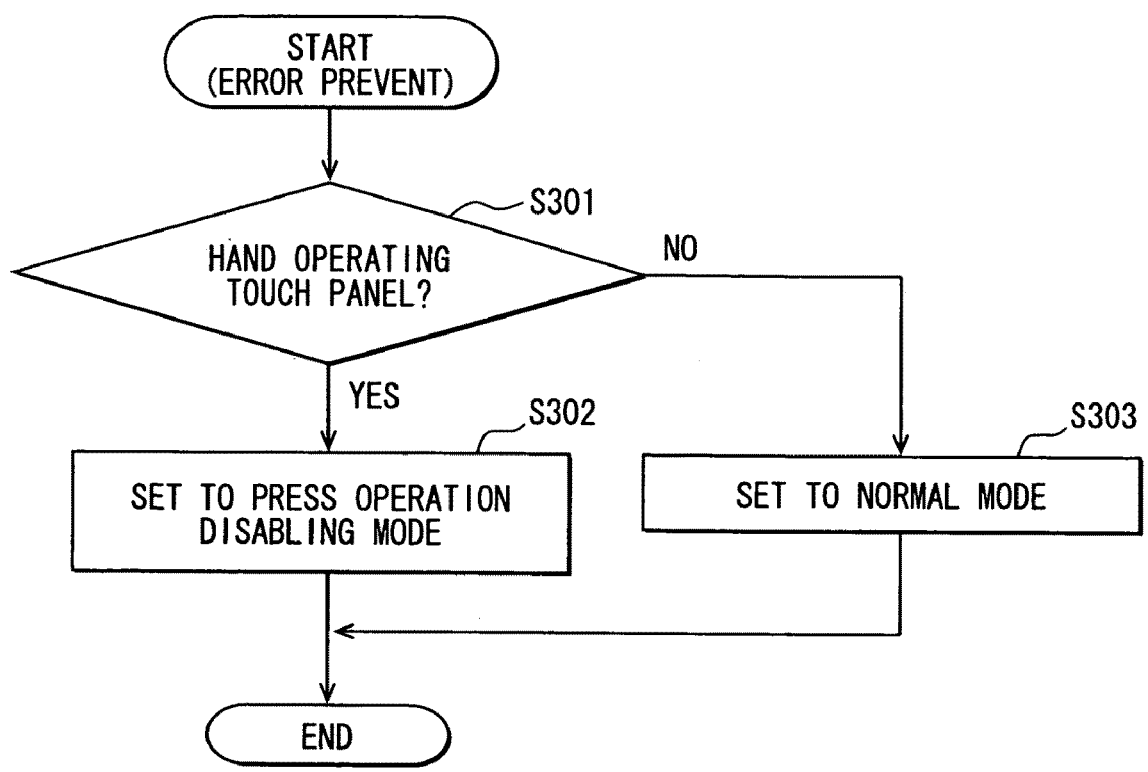
FIG. 25 is a flow chart showing an operational error prevention process.

The control section 300 protects the press operation section against an operational error based on a result of the determination concerning the presence of the hand on the touch operation surface 312a1. FIG. 25 is a flow chart exemplifying an operational error prevention process. The operational error prevention process is performed when the CPU executes an associated program stored in the ROM of the control section 300 or in an external storage 340. The control section 300 functions as a press disabling means or unit by displaying a positioning image.

At S301, the control section 300 determines the presence of the hand for operating the touch operation section 312. More specifically, the image analysis section 300a of the control section 300 receives image data captured by the camera 312b, analyzes the data, and determines whether or not the captured image contains a hand image. The camera 312b always captures an approaching object H through the operation panel 312a from the reverse side 312a2 thereof. The approaching object includes the hand of an operator such as a driver and approaches the touch operation surface (first surface) 312a1. The captured image is always supplied to the image analysis section 300a of the control section 300. When the approaching object H approaches the touch operation surface 312a1, the image processing section 318a is supplied with a captured image (or video) 350 including the approaching object H. The image processing section 318a analyzes the supplied captured image 350 using a known image analysis technique and extracts an approaching object image 350H based on color or brightness differences. According to the embodiment, the image processing section 318a digitizes the captured image based on its brightness and extracts the approaching object image 350H corresponding to an image area that exceeds a specified level. The image processing section 318a compares the shape of the extracted approaching object image 350H with a hand shape pattern and determines whether or not the image 350H is equivalent to an image of the human hand. For example, the image processing section 318a recognizes a hand image when the shape of the approaching object image 350H contains an approximately linear rod-like finger image pattern with an axial line having a specified length or more. The determination result is output to the control section 300.

The main process proceeds to S302 when it is determined at S301 that a hand for operating the touch operation section 312 is detected. The control section 300 turns on mode (press operation section disabling mode) that disables a press operation on the press operation section 311. Even when the press operation section 311 is pressed, the mode inhibits and disables at least the control corresponding to the press operation. The main process proceeds to S303 when it is determined that a hand for operating the touch operation section 312 is not detected. The control section 300 turns off the press operation section disabling mode and turns on another mode (normal mode) that allows a press operation on the press operation section 311. When the press operation section 311 is pressed, the mode allows the control corresponding to the press operation.

There are methods of disabling the press operation. As an easy method, a switch circuit may be used to prevent a press input signal from being input to the control section 300 or prevent an associated control signal from being output even when a press input signal is input to the control section 300. Another method may provide an operation lock mechanism to prevent the press operation section 311 from causing a specified deflection. At S302, the main process performs the switching operation or the lock operation to turn on the press operation section disabling mode. At S303, the main process performs a switching operation or an unlock operation to release or turn off the press operation section disabling mode to thereby resume the normal mode.

The following describes the other features of the third embodiment.

The display apparatus 320 according to the embodiment will be described. The display apparatus 320 includes a touch panel 322 and a switch set 321. The touch panel 322 is provided on the display screen and is equivalent to a touch-type operation section. The switch set 321 is provided around the display screen.

The touch panel 322 is attached on the screen of the display apparatus 320. The touch panel 322 includes a transparent operation panel so that a main surface 322a1 is exposed in the vehicle compartment and works as a touch operation surface. The touch panel 322 functions as a touch operation section. The touch panel 322 detects a position touched on the touch operation surface 322a1 and outputs a touch input signal reflecting the operation position to the control section 300. The control section 300 receives the touch input signal and functions as a control means or unit for providing corresponding control based on the received touch input signal. The operation sections 322 and 321 are provided as main operation sections. The remote operation section 310 is provided as an auxiliary operation section capable of performing equivalent operations on the main operation sections. The remote operation section 310 is positioned near the user so as to provide easier access than the operation sections 322 and 321.

A two-dimensional display coordinate system is defined on the display screen of the display apparatus 320. A two-dimensional operation coordinate system is defined on the touch operation surface 322a1 of the touch panel 322. A unique correspondence relation is predetermined between the two-dimensional display coordinate system and the two-dimensional operation coordinate system. It is possible to uniquely specify an in-plane position in one coordinate system correspondingly to the other. When the touch operation surface 322a1 is touched, the control section 300 accepts the input operation at the position coordinate on the display screen of the display apparatus 320 correspondingly to the touched position coordinate based on the correspondence relation. Similarly, a two-dimensional display coordinate system is defined on the display screen of the display apparatus 320. A two-dimensional operation coordinate system is defined on the touch operation surface 312a1 of the remote operation section 310. A unique correspondence relation is predetermined between the two-dimensional display coordinate system and the two-dimensional operation coordinate system. It is possible to uniquely specify an in-plane position in one coordinate system correspondingly to the other. A touch operation is available on the touch operation surface 312a1 of the remote operation section 310 as well as the touch operation surface 322a1 of the touch panel 322.

When the touch operation surface 312a1 or 322a1 is touched, the control section 300 specifies a position coordinate on the touched touch operation surface 312a1 or 322a1. Further, the control section 300 specifies the position coordinate on the display screen of the display apparatus 320 corresponding to the specified position coordinate. The control section 300 then outputs a control signal for performing a control content corresponding to the specified position coordinate. Let us suppose that the display screen of the display apparatus 320 displays an operation image 360I such as an operation icon. When a user touches a position corresponding to the operation image 360I on the touch operation surface 322a1, the control section 300 accepts the input operation corresponding to the operation image 360I. The control section 300 receives a touch input signal corresponding to the touch operation on the touch operation surface 312a1 or 322a1. The touch input signal contains operation position information reflecting the touch position on the touch operation surface 312a1 or 322a1. When receiving the touch input signal, the control section 300 recognizes the touch position based on the operation position information and performs the control content corresponding to the touch position.

The storage section such as the ROM in the control section 300 or the external storage 340 stores operation image data for displaying the operation image 360I. The operation image data is used to superimpose or combine the operation image 360I for display. The storage section of the control section 300 also stores a control content performed by the input operation associated with each operation image 360I, that is, touch input to a position on the corresponding touch operation surface 312a1 or 322a1. The control section 300 displays an image 360 on the display screen. The image 360 includes the operation image 360I superimposed on the a main image (background image) 360B. In this case, an acceptable input range (input position) is assigned to an area of the touch operation surface 312a1 or 322a1 correspondingly to the display position of the operation image 360I (input position setup means or unit).

The following describes the positioning image displayed on the screen of the display apparatus 320 according to the embodiment.

Figure 26:
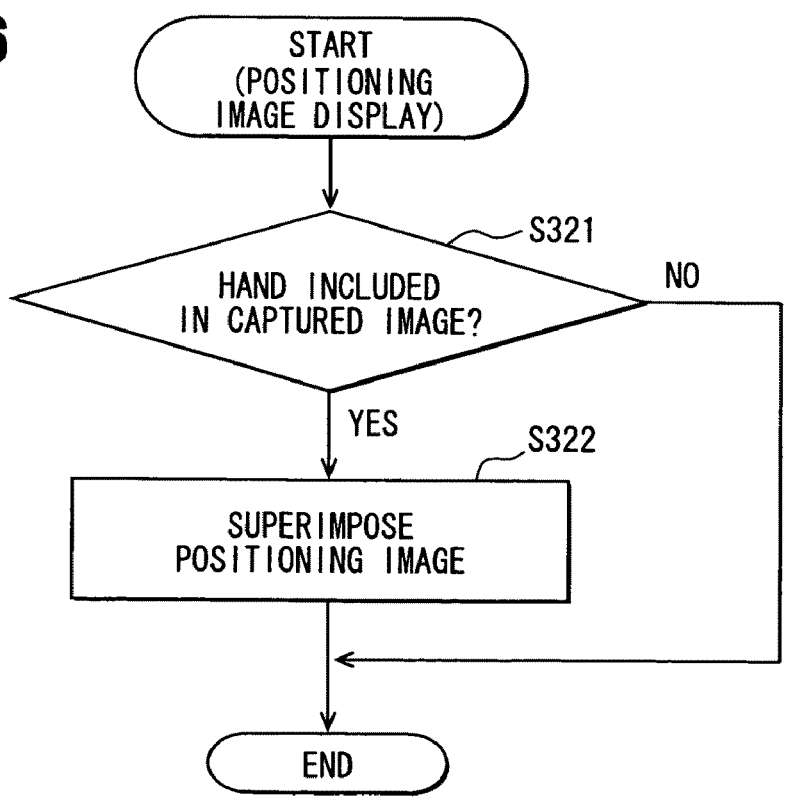
FIG. 26 is a flow chart showing a positioning image display process.

According to the embodiment, the remote operation section 310 includes the touch operation section 312. When the touch operation section 312 is operated, the positioning image is displayed on the screen of the display apparatus 320 at the position corresponding to the hand. FIG. 26 is a flow chart exemplifying a process of displaying the positioning image. The process is performed when the CPU executes an associated program stored in the ROM of the control section 300 or in an external storage 340. The control section 300 functions as a positioning image display means or unit by performing the positioning image display process.

At S321, the control section 300 determines whether or not the image captured by the camera 312b contains an image of the operator's hand and thus determines whether or not there is available a hand for operating the touch operation section 312. This process is the same as that at S301 in FIG. 25. The main process proceeds to S322 when it is determined that a hand image is available. Otherwise, the main process terminates.

The display apparatus 320 displays a background image 360B (360B1 or 360B2). At S322, the control section 300 superimposes a positioning image 360H on the background image 360B or combines both images based on the hand image that is determined to be available. The positioning image is contained in the hand image 350H extracted from the image 350 captured by the camera 312b and is displayed at a screen position at least corresponding to the position indicated by the finger. As shown in FIGS. 27B and 28B, the hand image 350H is digitized and extracted. Based on the hand image 350H, the control section 300 displays the positioning image 360H as an outline (external shape) of the hand image 350H as shown in FIGS. 27C and 28C. The positioning image 360H is displayed so that the background image 360B can be viewed semi-transmissively. Termination of S322 terminates the main process. After termination, the main process is repeated periodically. Moving the hand or finger on the operation panel 312a accordingly moves the display position of the positioning image (processed image) 360H displayed on the display screen of the display apparatus 320.

The positioning image 360H does not necessarily reflect the outline of the captured hand or finger shape. The positioning image 360H may indicate at least the position pointed by the captured finger. For example, the positioning image 360H may be a symbolic image such as a pointer image. It may be possible to display the positioning image 360H for superimposition or combination without processing the hand or finger image 350H captured by the camera 312b. However, the unprocessed positioning image 360H may overlap with and may partially hide the main image 360B. In consideration for this, it is more preferable to process the image 350H for improved operability using semi-transmissive combination, for example.

The remote operation section 310 according to the embodiment will be described.

The touch operation section 312 of the remote operation section 310 is provided so that the operation panel 312a covers an aperture 312h of the depressed section provided in the vehicle compartment. The camera 312b is provided in a depressed space toward the reverse side 312a2 of the operation panel 312a. The camera 312b can capture the surface 312a1 of the operation panel 312a only through the operation panel 312a. Increasing the capture range for the camera 312b makes it easier to capture or detect the operator's hand approaching the operation panel. In this case, however, the hand may be captured or detected even when the operator has no intention to operate the operation panel. The capture range can be effectively restricted by installing the camera 312b inside the depressed section as mentioned above. According to this configuration, the capture range of the camera 312b includes wall sections 312f and 312e belonging to the depressed section. As a result, the main capture area for the camera 312b can be equivalent to an area visible through the operation panel, that is, an area opposite to the main surface 312a1 of the operation panel 312a.

In the remote operation section 310 according to the embodiment, the touch operation section 312 (touch operation surface 312a1) is farther from shoulder positions of operators such as the driver and the passenger beside the driver than the press operation section 311. While the operator manipulates the press operation section 311, the camera 312b is configured not to capture the manipulating hand.

FIG. 24 shows the touch operation section 312 of the remote operation section 310 according to the embodiment. A hollow housing 312P has the aperture 312h facing the vehicle top in the vehicle compartment. The operation panel 312a is embedded in the aperture 312h. The surface 312a1 is used as the touch operation surface (remote touch operation surface). A housing aperture periphery 312f forms the aperture 312h. A cylindrical surrounding wall section 312e is provided from an outer edge of the housing aperture periphery 312f toward the rear. The rear end of the surrounding wall section 312e is fixed to a circuit board 312k. The housing 312P is fixed to a specified position of the center console CB in the vehicle compartment. The housing 312P contains the camera 312b and the light source 312c.

As shown in FIG. 24, the light source 312c radiates light so that the operation panel 312a transmits the light from the reverse side 312a2 to the surface 312a1. The light radiated from the light source 312c passes through the touch operation surface 312a1 to the outside when the touch operation surface 312a1 is not covered by an approaching object such as a hand. When the approaching object H faces the touch operation surface 312a1, the light reflects on the approaching object H. The reflected light partially returns to the reverse side 312a2 and is captured by the camera 312b.

The camera 312b captures the light that is radiated from the light source 312c and is reflected on the approaching object H to image the approaching object H from the reverse side 312a2 of the operation panel 312a. The camera 312b is fixed to the vehicle so as to capture a predetermined capture range. The camera 312b captures a reflecting surface of a reflecting member 312r. The components are arranged so that the capture range is included in the image reflected on the reflecting surface. When the reflecting member 312r is not used, the camera 312b directly captures the capture range. The captured image needs to be reversed horizontally.

The light source 312c according to the embodiment uses infrared light. Specifically, the light source 312c is an LED positioned backward to the reverse side of the operation panel 312a. The camera 312b according to the embodiment is an infrared ray camera suitable for shooting at a dark place. The camera 312b uses an unshown infrared ray filter that eliminates visible light for photographing. During photographing, the camera 312b captures the light (infrared ray) that is radiated from the infrared light source 312c and is reflected on the approaching object H. The camera 312b is fixed to a substrate that is fixed to the vehicle. The operation panel 312a according to the embodiment uses a translucent material that transmits only the light from the light source 312c. The inside of the housing 312P is invisible from the outside.

The camera 312b is provided as a capturing means or unit according to the embodiment and functions as a near object capturing means or unit for capturing an approaching object that approaches the surface 312a1 of the operation panel 312a. The camera 312b may be assumed to function as a hand image capturing means or unit considering that the approaching object includes a hand.

Figure 27A:
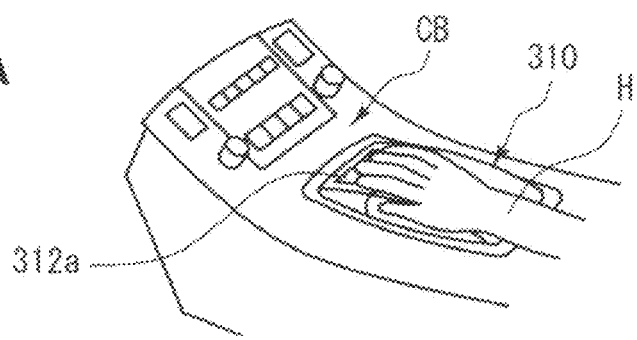
FIG. 27A shows an aspect of a first diagram illustrating capture of a hand against the operation panel.
Figure 27B:
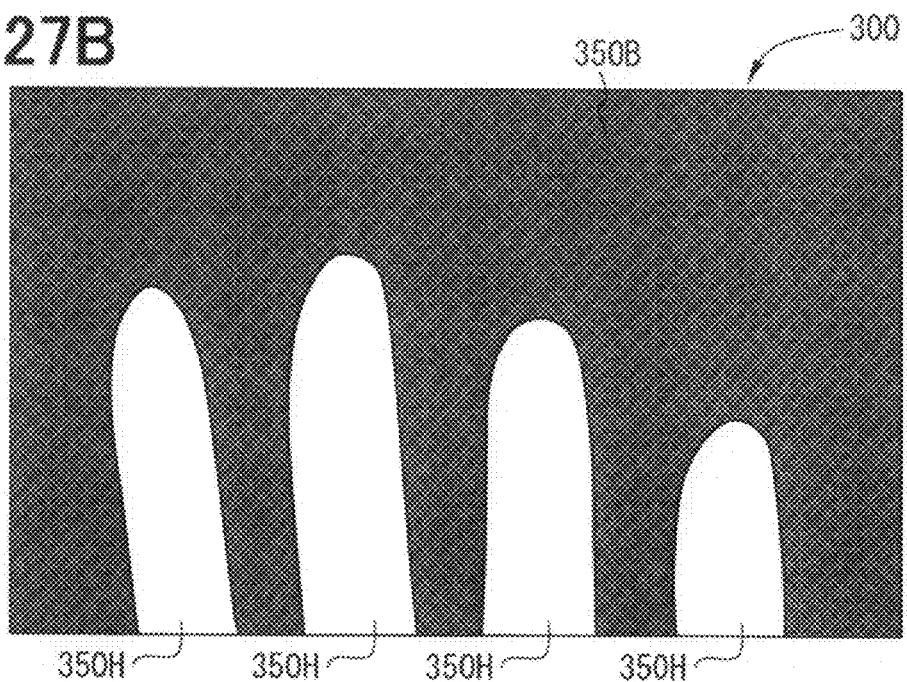
FIG. 27B shows another aspect of the first diagram illustrating capture of a hand against the operation panel.
Figure 27C:
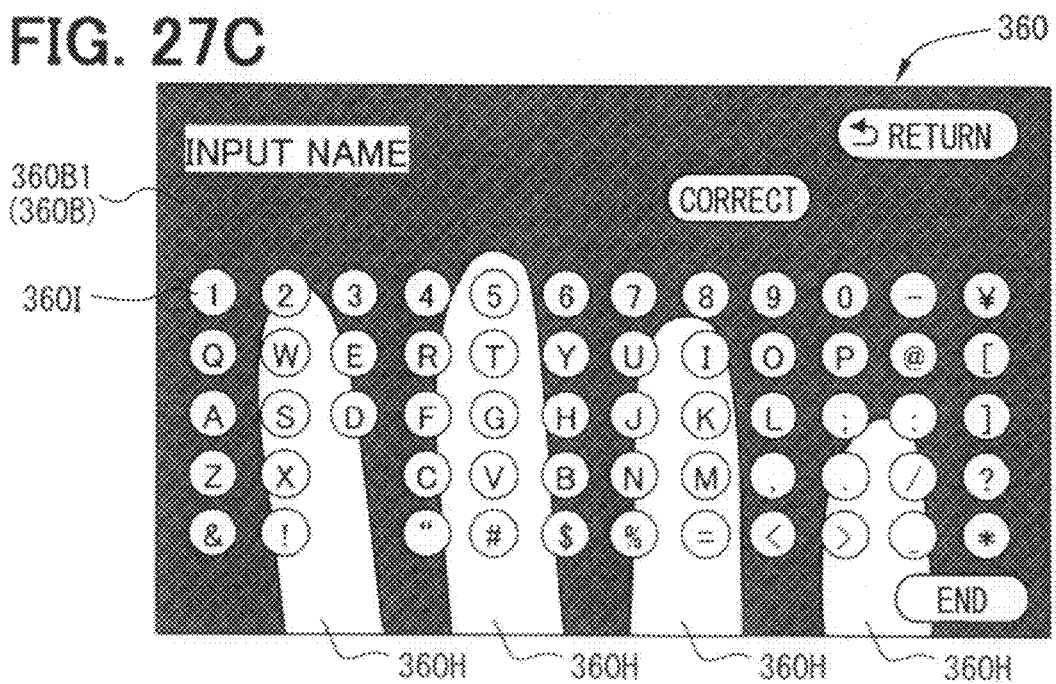
FIG. 27C shows still another aspect of the first diagram illustrating capture of a hand against the operation panel.
Figure 28A:
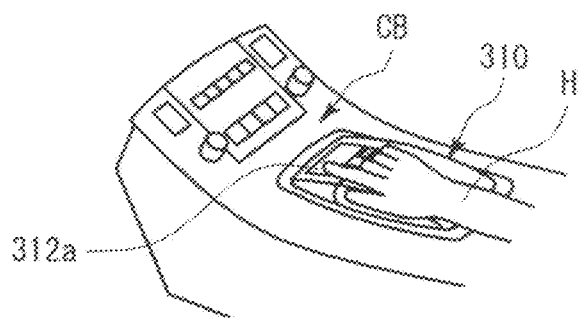
FIG. 28A shows an aspect of a second diagram illustrating capture of a hand against the operation panel.
Figure 28B:
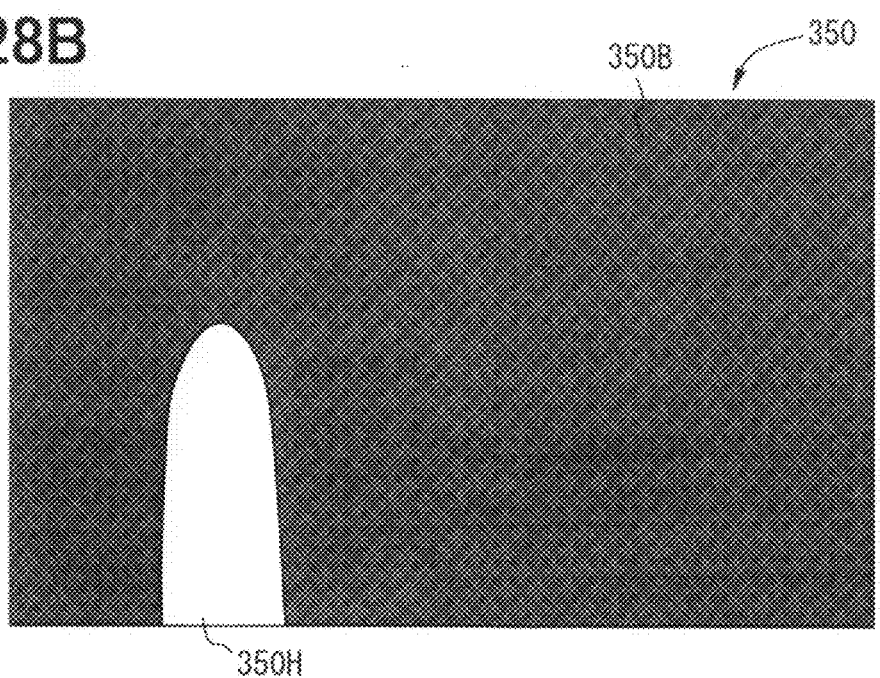
FIG. 28B shows another aspect of the second diagram illustrating capture of a hand against the operation panel.
Figure 28C:
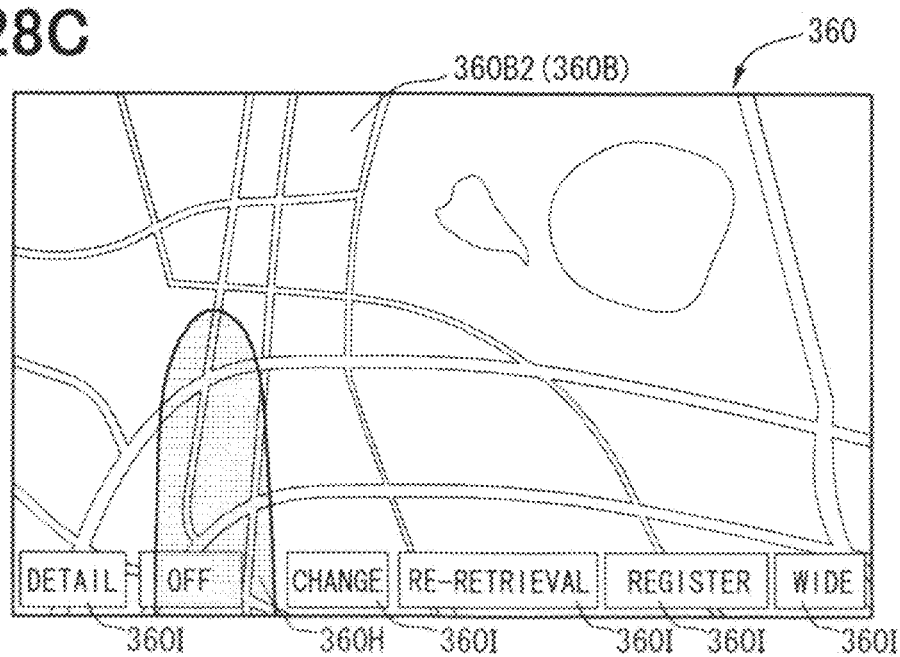
FIG. 28C shows still another aspect of the second diagram illustrating capture of a hand against the operation panel.

FIGS. 27A, 27B, 27C, 28A, 28B, and 28C illustrate methods of capturing a hand H against the surface 312a1 of the operation panel 312a. FIGS. 27A and 28A show states of a hand and a finger against the operation panel 312a and its surface 312a1. FIGS. 27B and 28B show videos 350 of the hand and the finger in FIGS. 27A and 28A captured by the camera 312b. The video is captured using the whole of the operation panel 312a as the capture area. The videos 350 in FIGS. 27B and 28B according to the embodiment are digitized after captured. In FIGS. 27B and 28B, reference numeral 350H denotes an area that shows the approaching object H. Reference numeral 350B shows an area that shows nothing. The area 350B originally corresponds to the operation panel 312a. However, the operation panel 312a is not shown because it transmits the light from the light source 312c. It might be possible to show the background such as the vehicle ceiling or the like according to the embodiment through the operation panel 312a. The reflected infrared light may not be captured sufficiently and no video may be produced. Alternatively, some amount of reflected infrared light may be captured but may be digitized to assimilate into the background.

FIGS. 27C and 28C exemplify screen displays on the display apparatus 320 when the videos 350 in FIGS. 27B and 28B are captured. FIG. 27C shows an input screen according to the Japanese syllabary as the main image 360B1. FIG. 28C shows a map screen (map operation image) displayed as the main image 360B2 on the navigation system.

While there have been described the specific preferred embodiments of the present invention, it is to be distinctly understood that the present invention is not limited thereto but may be otherwise variously embodied based on the knowledge of those skilled in the art within the spirit and scope of the invention. The following describes embodiments different from those mentioned above. The mutually corresponding parts in the embodiments are designated by the same reference numerals and a description is omitted for simplicity.

In the above-mentioned embodiments, the touch panel 322 and the other switch set 321 provided for the display apparatus 320 are not required for the invention. The display apparatus 320 according to the invention may be provided not only in the center console CB as shown in FIGS. 20 and 21 but also above the bottom edge of a windshield FG. The other examples may include a head up display for displaying the above-mentioned images and data on the vehicle windshield FG and a meter display apparatus positioned away from a steering wheel 306 toward the vehicle front.

Figure 29:
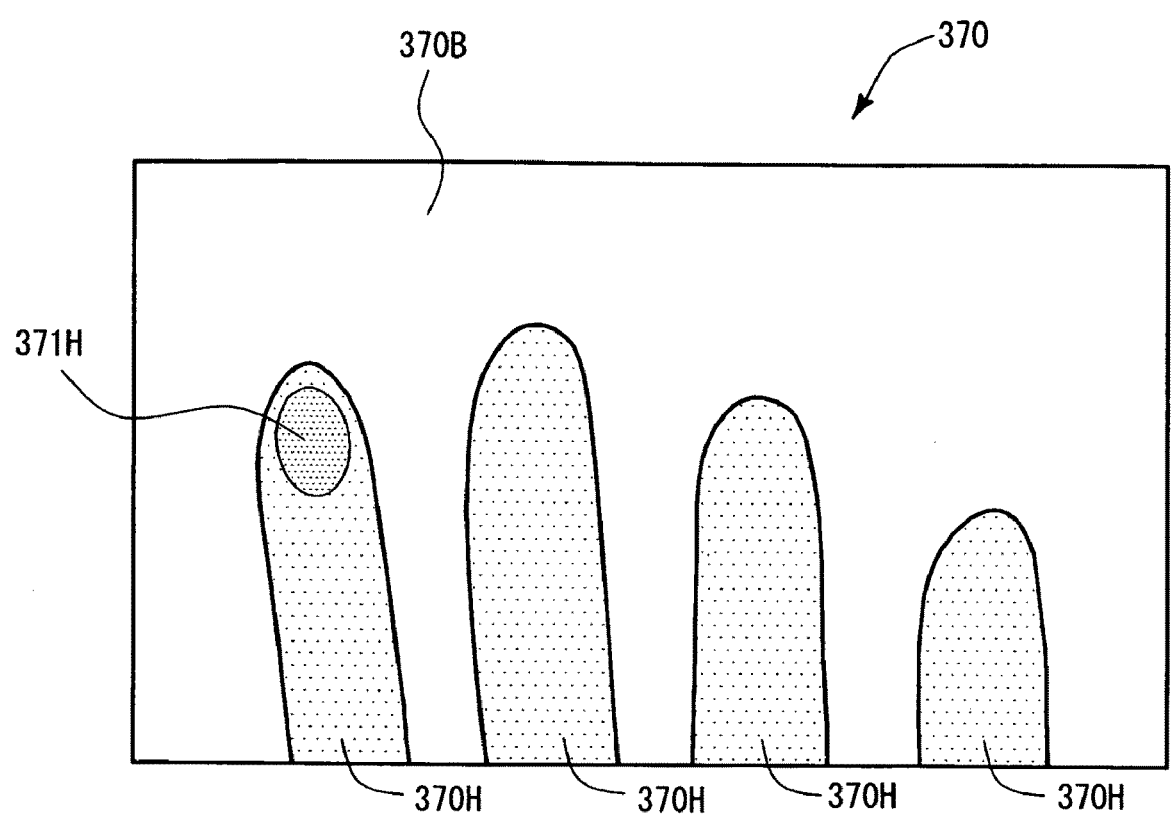
FIG. 29 shows an example of a captured image capable of specifying a position touched on the operation panel.

According to the above-mentioned embodiments, the remote operation section 310 is provided with the resistive operation panel 312a as the touch operation section and may be provided with a touch panel based on the other techniques. For example, the operation panel 312a as the touch panel may be replaced with a technique of detecting a touch operation position by processing an image captured by the capturing unit such as the camera 312b. Specifically, the operation panel 312a is configured to be translucent and uses its surface 312a1 as the touch operation surface. The operation panel 312a is provided with the light source 312c. The light source 312c radiates light with a predetermined wavelength band to an object approaching from the touch operation surface 312a1 through the operation panel 312a. The camera 312b as the capturing unit captures the approaching object from the reverse side 312a2 of the operation panel 312a1 in such a manner as to capture the light that is radiated from the light source 312c and is reflected on the approaching object. As shown in FIG. 29, the control section 300 functions as a light reflecting area specification means or unit for specifying a light reflecting area 371H on an image 370H captured by the camera 312b. The light reflecting area 371H causes the intensity of reflected light to exceed a predetermined threshold value. The control section 300 also functions as an input acceptance means or unit that specifies a position of the specified light reflecting area 371H and accepts a touch input corresponding to the position. The image 370H is captured as is, not digitized like the above-mentioned image 350, and contains various levels of brightness all over the area. Compared to the other areas, an area of the operation panel 312a in contact with the hand remarkably increases the reflected light intensity. This makes it possible to identify the presence or absence of operation on the operation panel 312a the operated position.

According to this configuration, a touch input operation is accepted when it is assumed to occur at the light reflecting area 371H that is contained in the image captured by the camera 312b and is determined to exceed the predetermined threshold value. Like the above-mentioned embodiments, the captured image from the camera 312b is used to detect the operating hand or the positioning image. The captured image is also used to determine the presence or absence of the light reflecting area 371H and specify the operational position thereof. It may be possible to accept the touch input operation on the light reflecting area 371H only when the size of the specified light reflecting area 371H exceeds a predetermined threshold value.

According to the above-mentioned embodiments, the press operation section 311 is operable from the driver's seat and the passenger seat. Further, the press operation section 311 may be operable from the other seats or from only one of the driver's seat and the passenger seat.

Figure 30:
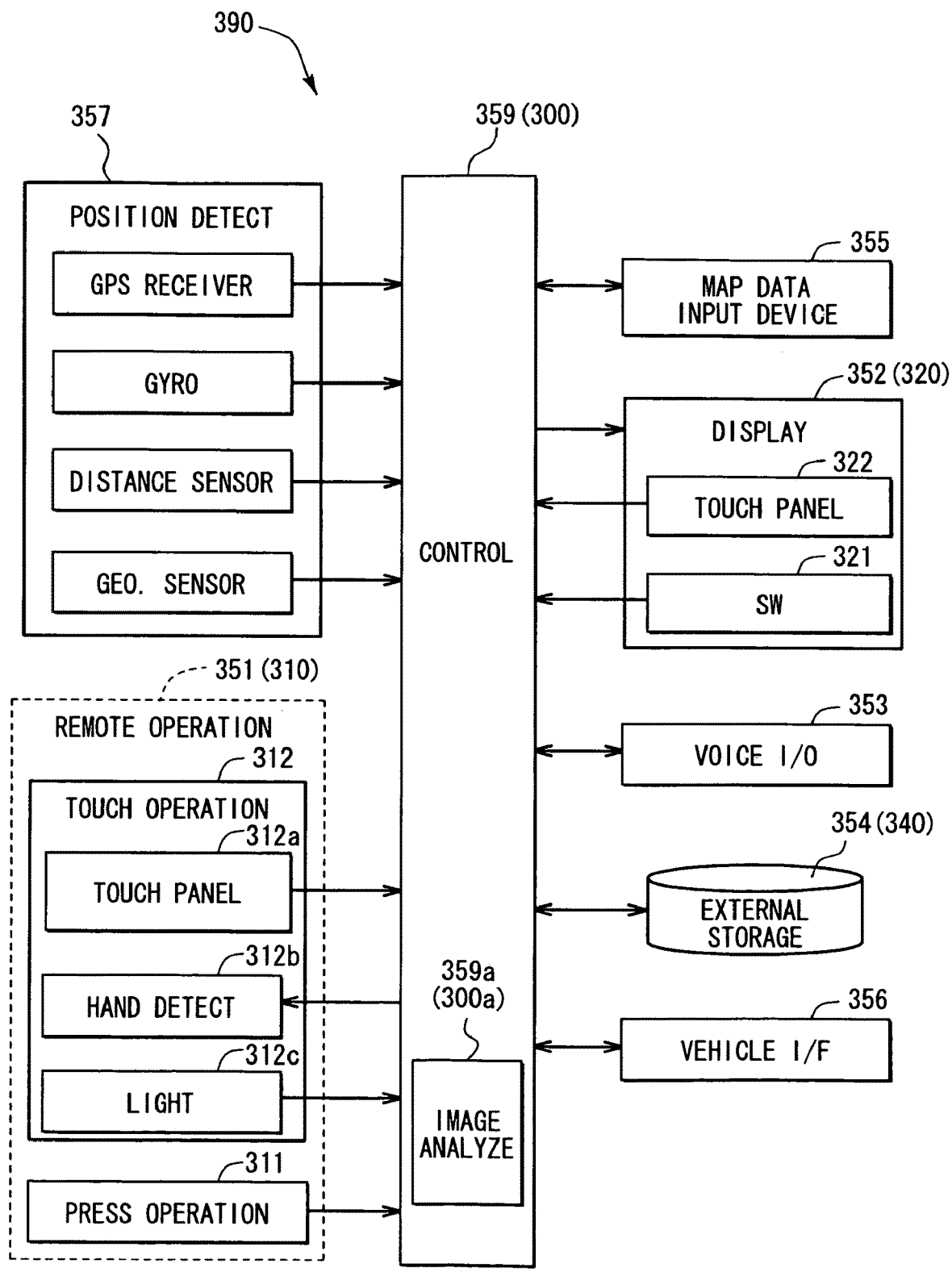
FIG. 30 is a block diagram showing a configuration of using the input apparatus according to the third embodiment for an onboard navigation system.

The control section 300 according to the embodiments may be also used as a control circuit for the onboard navigation system. FIG. 30 is a block diagram exemplifying a configuration of the onboard navigation system. As shown in FIG. 30, a navigation system 390 includes a position detector 357, an operation input section 351 (311, 312, 321, 322), a map data input device 355, a display apparatus 352, a voice input/output device 353, a hard disk storage 354, a vehicle interface section 356, and a control circuit 359. The position detector 357 detects the current vehicle position. The operation input section 351 supplies various instructions from an operator such as a driver. The map data input device 355 supplies map data from an external recording medium that stores map data and various information. The display apparatus 352 provides various displays such as a map display screen and a television screen. The voice input/output device 353 outputs various guide voices and inputs voice of an operator such as a driver. The hard disk storage 354 stores various data such as vehicle information. The vehicle interface section 356 exchanges vehicle information. The control circuit 359 connects the components 351 through 357 with each other.

As known conventionally, the position detector 357 includes a GPS receiver, a gyroscope, a distance sensor, and a geomagnetic sensor. The map data input device 355 supplies various data such as road data as network data, map data including map matching data for improving the positioning accuracy, mark data indicative of facilities, and audiovisual data for guidance.

The voice input/output device 353 can audibly output facility information and various types of guidance supplied from the map data input device 355 and information acquired from another onboard device via the interface section 356. The voice input/output device 353 includes an unshown microphone and a known speech recognition unit and is capable of supplying the control circuit 359 with the voice of an operator like a driver as a command.

The control circuit 359 is mainly configured as a known microcomputer including an unshown but known CPU, ROM, RAM, an input/output device, and a bus line connecting these components. The control circuit 359 performs a map display process and a route guidance process, for example, based on programs stored in a storage section such as the ROM and the external storage 340. During the map display process, the control circuit 359 calculates the current vehicle position as a set of coordinate and travel direction based on detection signals from the position detector 357. The control circuit 359 displays a main image 395B including motion and still pictures on a display section 315. The main image 395B includes a map near the current position that is read via the map data input device 355 and a range of map indicated by input operations on various input sections 351 including the voice input/output device 353. During the route guidance process, the control circuit 359 selects a facility as a destination based on point data stored in the map data input device 355 in accordance with input operations on the input section 351 including the voice input/output device 353. The control circuit 359 provides route guidance by performing the route calculation that automatically finds an optimum route from the current position to the destination. For example, the Dijkstra algorithm is known as a technique that automatically configures an optimum route.

The control circuit 359 can perform the process in FIG. 26 by allowing the CPU to execute a specified program stored in the storage section such as ROM. The control circuit 359 uses the operation image 360I (operation icon) and the positioning image 360H as sub images. The positioning image 360H is based on the approaching object image 350H captured by the camera 312b. The control circuit 359 can display the sub images superimposed on the main image 395B (e.g., map operation image) as a background.

The input section 351 includes the touch operation section 312 and the press operation section 311 belonging to the remote operation section 310 according to the embodiment as shown in FIG. 19. The control circuit 359 can function similarly to the control section 300 according to the embodiment as shown in FIG. 19. The control circuit 359 performs the same process as that shown in FIG. 25 to provide the press operation section 311 with the same operational restriction. The display apparatus 352 is similar to the display apparatus 320 according to the embodiment as shown in FIG. 19. The input section 351 also includes the touch panel 322 and a peripheral switch 321. That is, the input apparatus is applicable to the navigation system 390. An input apparatus 301 in FIG. 19 is also applicable to the navigation system.

Pressing the press operation section 311 can provide a control content that can be accepted in any screen state of the display apparatus 320. For example, any screen state can be forcibly changed to a predetermined display screen. When the input apparatus 301 is used for the navigation system 390, the display screen of the display apparatus 320 can be used as the operation section in the form of a current position button or a menu button. The current position button displays a map screen where the current vehicle position is fixed to a specified position. The menu button displays a menu screen.

The following summarizes aspects of the disclosure of the third embodiment.

As an aspect of the disclosure, an input apparatus includes: a touch operation section including an operation panel whose main surface is a touch operation surface exposed in a vehicle compartment; a touching hand detection unit for detecting a hand approaching the operation panel so as to touch the touch operation surface; a press operation section provided near the touch operation surface; and a press disabling unit for disabling a press operation on the press operation section when a hand approaching the touch operation surface is detected.

When a hand approaching the touch operation surface is detected, the above-mentioned configuration disables an operation on the press operation section provided near the touch operation surface. An operation on the press operation section is disabled when an operator in the vehicle compartment is most likely to intend to touch the touch operation surface. It is possible to reliably prevent an operational error on the press operation section.

A positional relation can be satisfied between the press operation section and the operation panel so that an operator hand for pressing the press operation section is not detected by the touching hand detection unit as a hand approaching the touch operation surface. An operator in the vehicle compartment may use his or her hand to operate the press operation section. The hand is detected to be used for the touch operation. An operation on the press operation section may be disabled incorrectly. The above-mentioned configuration solves such problem.

In this case, the press operation section and the touch operation surface are preferably provided in a vehicle compartment at such a position accessible to a seated user. The press operation section is preferably provided at a position more easily accessible to the user than the touch operation surface. When the press operation section is positioned so as to be less easily accessible than the touch operation surface, the press operation section may be operated unnaturally only in such a manner as not detected to be an operation on the touch operation surface. When the press operation section is more easily accessible than the touch operation surface, the operator's hand to press the press operation section is less likely to be detected as a hand approaching the touch operation surface. More specifically, this advantage is more easily available when the press operation section is positioned nearer to the user's shoulder than the touch operation surface or nearer to a backrest of the seat where the user sits.

The press operation section and the touch operation surface can be positioned so as to be operable by a user at least sitting on a driver's seat in a vehicle compartment. A driver sitting on the driver's seat concentrates on driving while the vehicle is running. The driver is more likely to inadvertently press the press operation section around the touch operation surface. The effect of the operational error prevention works effectively.

The touching hand detection unit can be used as a capturing unit for capturing a hand approaching the touch operation surface. Since the approaching hand is determined based on a captured image, it is possible to prevent an object simply approaching the touch operation surface from being detected incorrectly. For example, detection of a finger may be used as a condition for detection of a hand. This makes it possible to recognize the hand independently of the other approaching objects. Detection of a finger is particularly effective because the detection explicitly indicates an operator's intention to use the touch operation surface.

The operation panel can be provided so as to cover an aperture of a depressed section provided for a vehicle. In this case, the capturing unit is provided in the depressed section at a reverse side of the operation panel and is capable of capturing a surface of the operation panel only through the operation panel. Increasing the capture range for the camera 312b makes it easier to capture or detect the operator's hand approaching the operation panel. However, the hand may be captured or detected even when the operator has no intention to operate the operation panel. When the capturing unit is provided in the depressed section according to the above-mentioned configuration, the capture range includes an internal surrounding wall section forming the depressed section. The capture area on the operation panel surface belonging to the capture range is limited to an area viewable through the operation panel that is provided for the depressed section aperture and is made of a transparent member. The other area is not captured, making it appropriate to capture only the hand for manipulating the operation panel.

It is possible to provide a display apparatus whose display screen is provided in a vehicle compartment at a position different from the operation panel and the press operation section so as to be viewable from a user sitting on a seat capable of using the operation panel and the press operation section and is capable of displaying an operation image. The touch operation section is capable of remote input to an operation image displayed on the display apparatus based on the touch operation on the operation panel. The press operation-section is capable of an input operation associated with a display content displayed on the display apparatus based on the press operation. According to this configuration, the operation section at hand can be used as a remote operation section so as to be able to manipulate an operation image such as an operation icon displayed on the display apparatus provided at an easily viewable position. When the operator is a driver, for example, his or her visibility increases when the display screen of the display apparatus is positioned at the front of the vehicle. The driver can smoothly perform a remote touch operation by viewing the display screen.

In this case, a hand image display unit can be provided for more improved operability. The hand image display unit locates a specified position of a hand approaching the touch operation surface on the touch operation surface based on an image captured by the capturing unit and displays a positioning image at a screen position on the display apparatus corresponding to the specified position. The display screen displays the hand for manipulating the touch operation surface of the touch operation section belonging to the remote operation section, making the remote operation easy.

The press operation section and the operation panel can belong to the remote operation section fixed to a position accessible to a vehicle occupant who leans back into a vehicle seat. The press operation section and the operation panel can be fixed to a position nearer to a predetermined seat than a separately provided main operation section.

The display apparatus can be positioned to the vehicle front away from the vehicle occupant so as to be visible at least from the vehicle occupant sitting on the driver's seat of the vehicle. The main operation section, when provided, may be equivalent to the touch panel (touch-type operation section) provided on the screen of the display apparatus. The press operation section and the operation panel belonging to the remote operation section may be provided between the bottom of the driver's seat and the bottom of the passenger seat.

The press operation section and the operation panel may be replaced with an operation section for an onboard electronic device. The press operation section and the operation panel may be equivalent to one or more of operation sections for an air conditioner, audio system, navigation system, power window, and seat positioning mechanism.

Fourth Embodiment

Figure 31A:
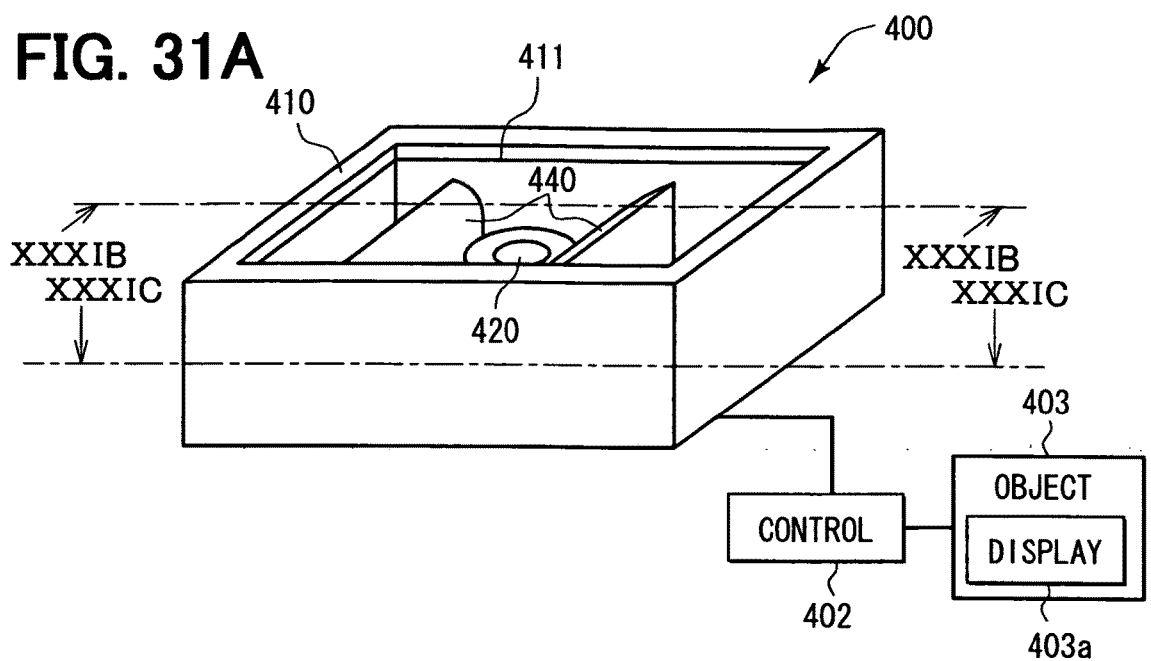
FIG. 31A is a schematic configuration diagram of an input apparatus according to a fourth embodiment of the present invention.
Figure 31B:
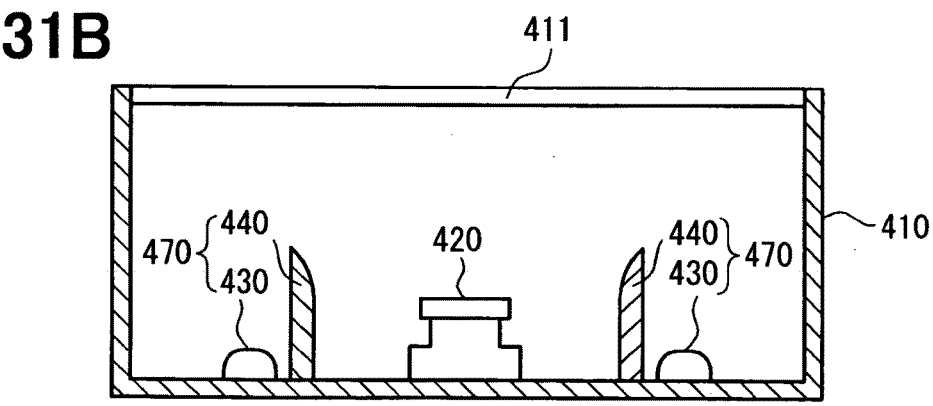
FIG. 31B is another schematic configuration diagram of the input apparatus according to the fourth embodiment.
Figure 31C:
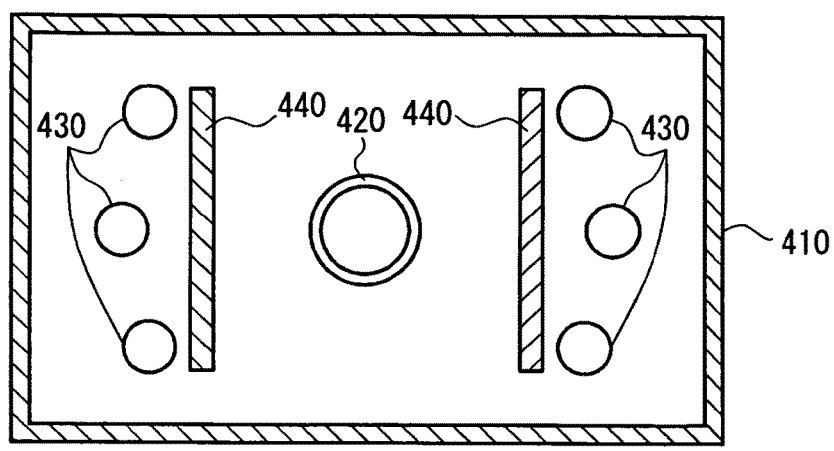
FIG. 31C is still another schematic configuration diagram of the input apparatus according to the fourth embodiment.

A fourth embodiment of the present invention will be described with reference to the accompanying drawings. FIGS. 31A through 31C are schematic configuration diagrams showing an input apparatus 400 according to the fourth embodiment.

The input apparatus 400 is so-called prompter-based and is equivalent to an input apparatus and a remote input apparatus. FIGS. 31A through 31C show a perspective view of the input apparatus 400 and cross sectional views taken along lines XXXIB-XXXIB and XXXIC-XXXIC.

The input apparatus 400 includes an imaging apparatus, which captures an image of an object and includes camera 420 (imaging section) and a lighting section 470 in a housing 410. The rectangular housing 410 includes a surface 411 (top surface in FIG. 31A) that functions as an operation surface for accepting input from the operator. The lighting section 470 includes an infrared ray LED 430 (LED or light source) and a refractive body 440 and illuminates the operation surface 411 so that the light source is not included in a captured image as mentioned above. A transparent sheet may be used for the operation surface 411. The operation surface 411 may use not only a transparent and colorless sheet but also a transparent and colored member (sometimes opaque for humans) transparent to light of a specific wavelength or a resin filter that transmits only infrared light, for example.

Hiding the apparatus inside is considered comfortable for an operator and preferable from a cosmetic viewpoint of the apparatus. It may be preferable to make the operation surface 411 transparent and colored so that the inside of the input apparatus 400 such as the camera 420 is hardly viewed or hidden from the operator. The camera 420 is provided with a lens positioned upward in FIG. 31A.

As depicted by the cross sectional view in FIG. 31B, the six LEDs 430 are provided around the camera 420. The LED 430 radiates an infrared ray such as near-infrared light. As mentioned above, it is preferable from a cosmetic viewpoint of the input apparatus 400 that the operation surface 411 may function to transmit only infrared ray but not visible ray. As shown in FIG. 31B, the approximately cylindrical camera 420 and the LED 430 are coaxially arranged along the same axial direction. An infrared ray is efficiently radiated to the operation surface 411 from the LED 430.

The input apparatus 400 is connected with a control section 402 (analysis section). The control section 402 is also connected with an operation object 403. The control section 402 may be structured as an ordinary computer including a CPU for information processing and RAM as a work area or may be implemented as an equivalent function provided for a circuit substrate including a microcomputer. The operation object 403 includes a display section 403a such as a liquid crystal panel. The display section 403a displays various operation buttons for the operation object 403.

Figure 42A:
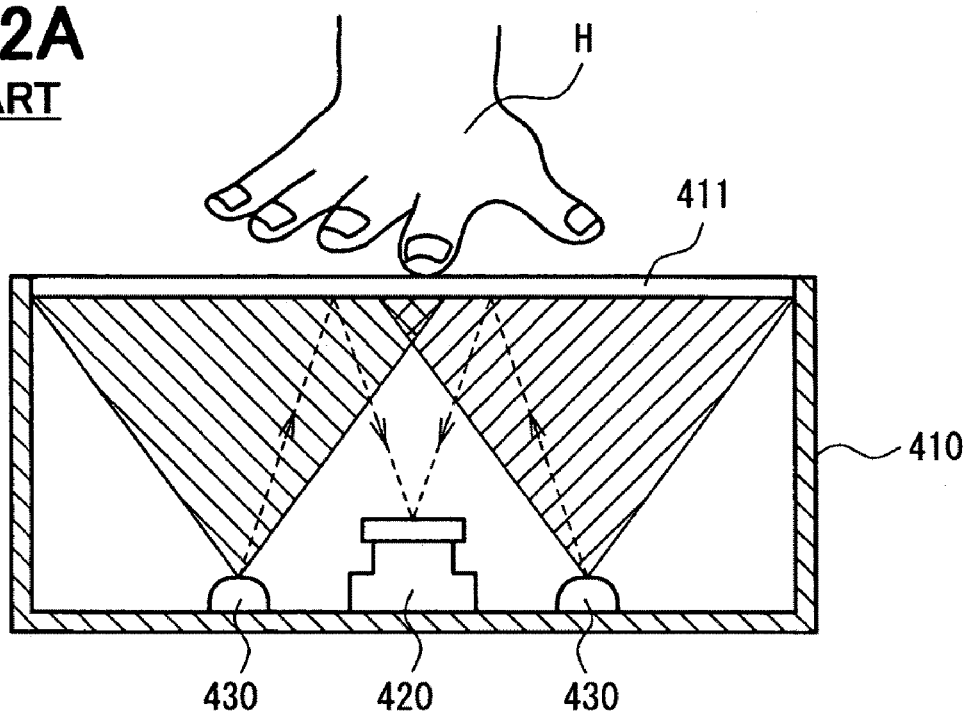
FIG. 42A shows a conventional input apparatus.

Like FIG. 42A showing a conventional technology, an operator operates the operation object 403 by touching the operation surface 411 from outside the housing 410. The detailed description follows. An infrared ray radiated from the infrared ray LED 430 passes through the operation surface 411 and is applied to a hand H (or finger) of the operator who touches the operation surface 411. The camera 420 captures an infrared ray image of the operator's hand where the infrared ray is applied. The camera 420 is preferably equipped with a lens having a filter that transmits only infrared ray. A hand image is captured normally even when a surrounding area is bright.

The image captured by the camera 420 is transmitted to the control section 402. The control section analyzes the captured image using a previously stored analysis program. The control circuit 359 assumes that the operation surface 411 corresponds to the display section 403a. That is, a position on the operation surface 411 corresponds to an operation button displayed on the display section 403. When the operator's hand H touches that position, the control section 402 determines that the operation button is pressed. In this manner, the operator's input operation is recognized. The operation object 403 is operated in accordance with the input operation content.

According to the present embodiment, a car may be equipped with the operation object 403 as an onboard apparatus such as a vehicular navigation system, air conditioner, audio apparatus, and video apparatus. In this case, the display section 403a of the operation object 403 may be provided for an instrument panel, for example. The operation surface 411 may be provided for a vehicular center console, for example. The input apparatus 400 can be compactly sized because the camera 420 and the LED 430 are coaxially arranged as mentioned above. This is advantageous to an onboard apparatus whose installation space is limited.

According to the conventional technology as mentioned above, an infrared ray radiated from the LED 430 reflects on the operation surface 411, enters the camera 420, and is included in an infrared ray image of the hand. The input apparatus 400 uses the refractive body 440 to solve this problem. The refractive body 440 has a function of refracting the transmitted light (electromagnetic wave). Specifically, the refractive body 440 may represent a prism, for example. The prism may be made of glass, crystal, or acrylic resin, for example. In the input apparatus 400 as shown in FIG. 31A, a pair of refractive bodies 440 are linearly arranged parallel to each other on the left and right sides in the drawing so as to sandwich the camera 420.

Figure 32:
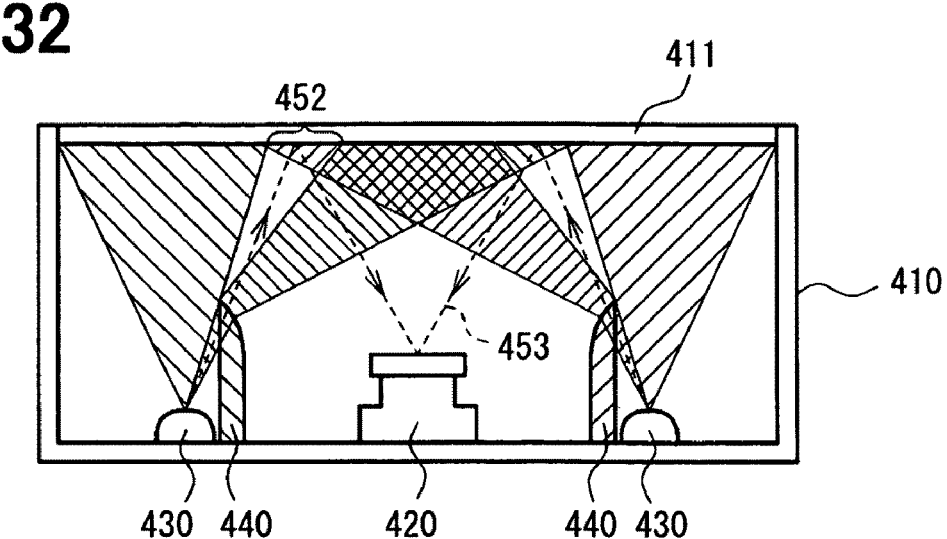
FIG. 32 shows an optical path of infrared ray.

FIG. 32 shows an optical path of the infrared ray in FIG. 31B. FIG. 32 shows an optical path or an aggregate of optical paths of the infrared ray radiated from the LED 430. A dotted line 453 in FIG. 32 depicts the optical path of an infrared ray that is radiated from the LED 430 without the use of the refractive body 440, reflects on the operation surface 411, and enters the camera 420.

As shown in FIG. 32, the optical path passes through the refractive body 440 and is refracted to deviate from the optical path depicted by the dotted line 453. The infrared ray, when reflected on the operation surface 411, does not enter the camera 420. The captured hand image does not contain the light source. The hand image can be precisely analyzed. As shown in FIG. 31A, the refractive body 440 has a curved surface opposite to the camera 420. The curved surface of the refractive body 440 may be designed so as to refract an optical path satisfying the above-mentioned objective.

The refractive body 440 refracts only one of the two optical paths to cause a blank area 452 where no infrared ray is radiated from the left LED 430 in the drawing. As shown in FIG. 32, however, the infrared ray from the right LED 430 in the drawing is radiated to the blank area 452. Accordingly, the infrared ray is radiated to all over the operation surface 411. The operator's hand image can be captured without blank areas.

Figure 33A:
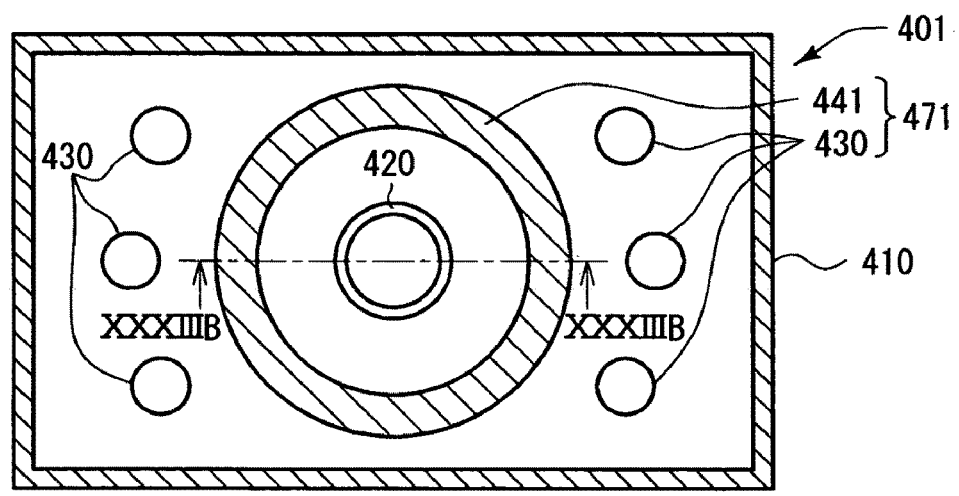
FIG. 33A shows arrangement of a refractive body.
Figure 33B:
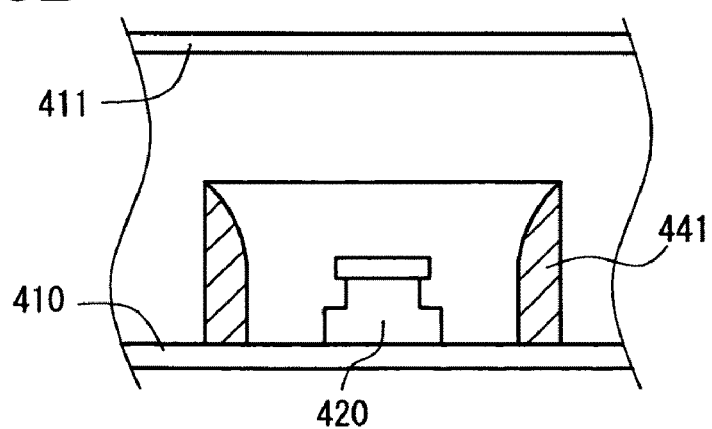
FIG. 33B shows arrangement of the refractive body.
Figure 34A:
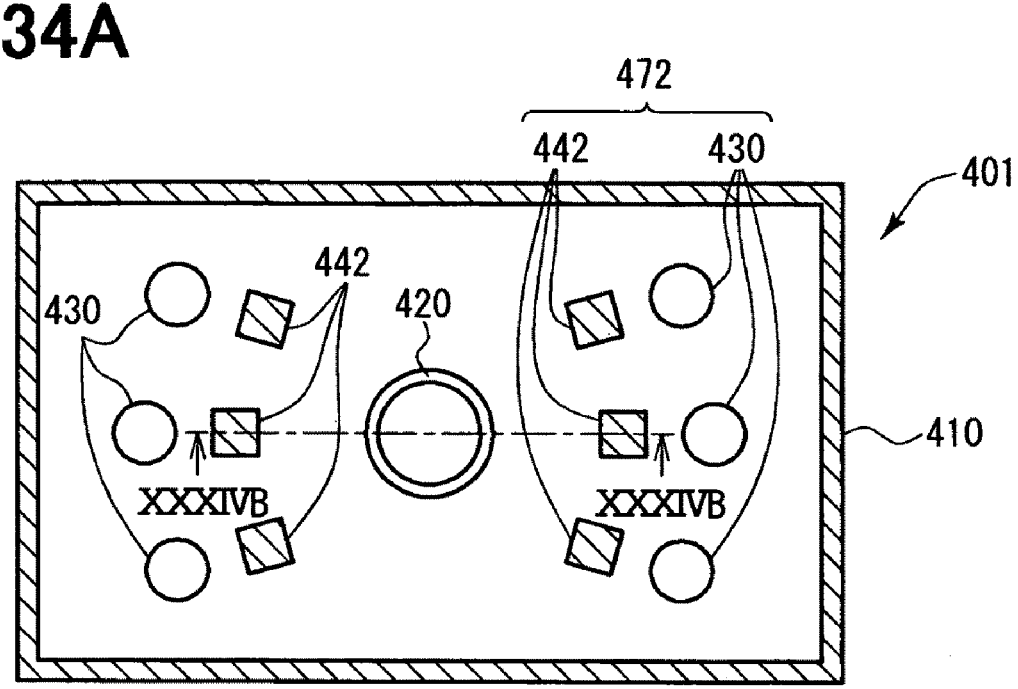
FIG. 34A shows arrangement of the refractive body.
Figure 34B:
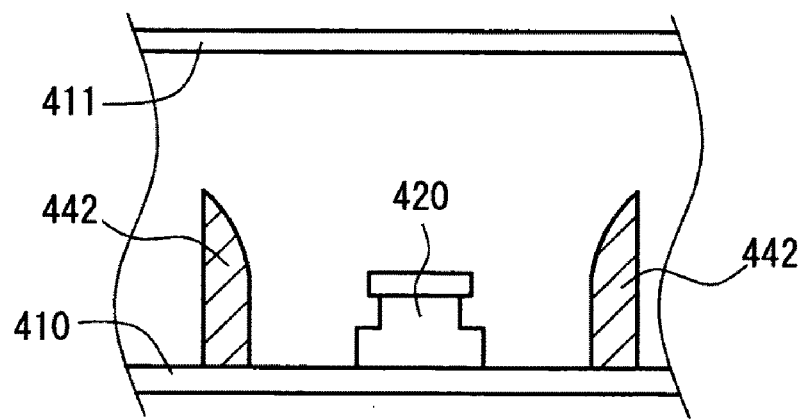
FIG. 34B shows arrangement of the refractive body.

The example in FIG. 31A does not limit the number of refractive bodies 440 and LEDs 430 and the arrangement thereof under the condition that the camera 420 does not capture the light source image. FIGS. 33A, 33B, 34A, and 34B show the other examples. FIGS. 33A and 34A correspond to the cross sectional view taken along the line XXXIC-XXXIC in FIG. 31A. As shown in FIG. 33A, a refractive body 441 is cylindrically arranged around the camera 420. A lighting section 471 includes an LED 430 and the refractive body 441.

In FIG. 34A, multiple refractive bodies 442 are arranged around the camera 420 at some interval between the camera 420 and the LED 430. A lighting section 472 includes the LED 430 and the refractive body 442. Each refractive body 442 is columnar. Like FIG. 32, the refractive body arranged as shown in FIGS. 33A and 34A can refract the optical path of the infrared ray radiated from the LED 430 and prevent a light source image from being included in the image captured by the camera 420. Like the refractive body 440, the refractive bodies 441 and 442 have curved surfaces opposite to the camera 420. The curved surface may be designed so as to form an optical path that can prevent a light source image from being included in the image captured by the camera 420.

While FIGS. 31A through 34B have shown the examples using the refractive body, the present embodiment is not limited thereto but may be otherwise embodied through the use of a shield against light or a light reflector. FIGS. 35A through 39 show such examples.

Figure 35A:
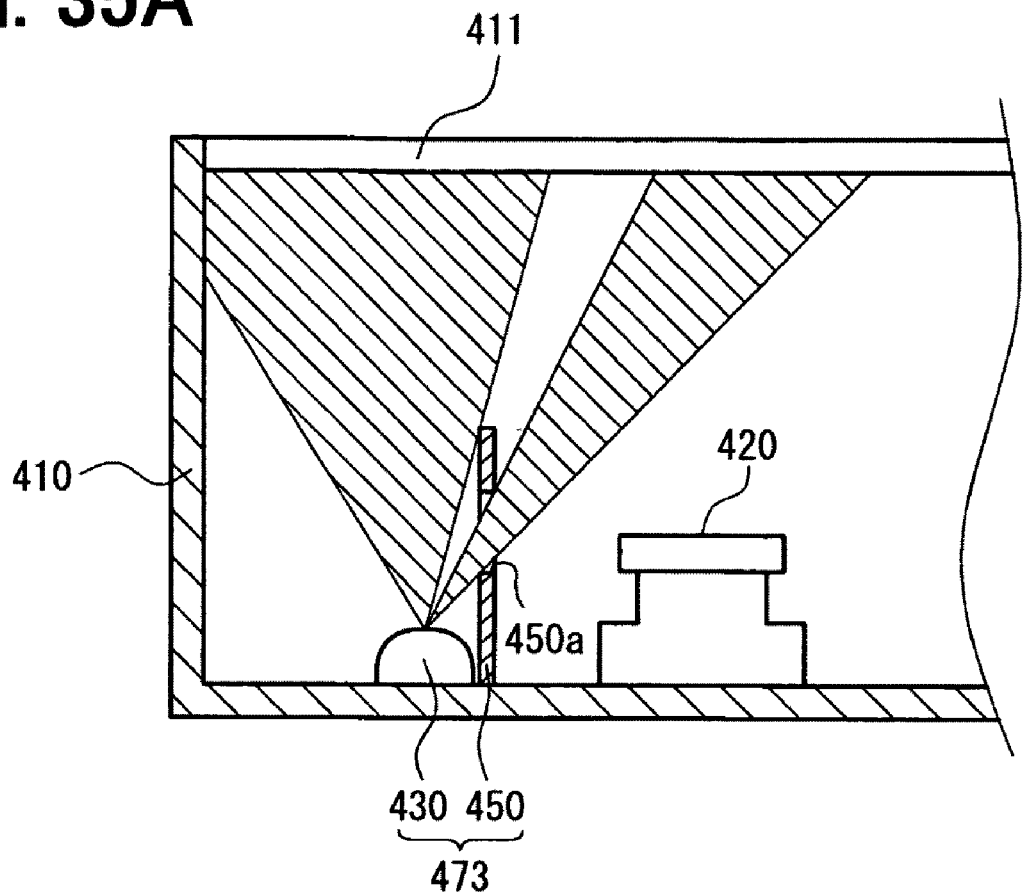
FIG. 35A shows another example.
Figure 35B:
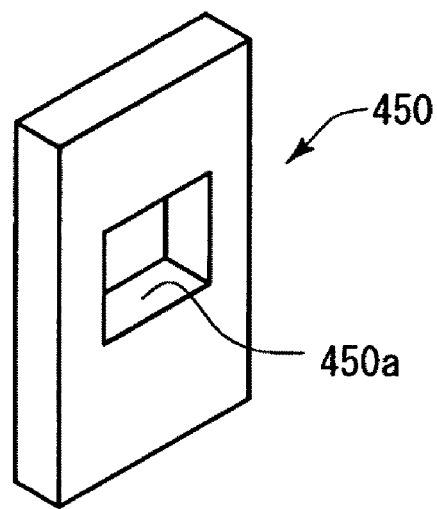
FIG. 35B shows still another example.

FIG. 35A shows an example of using a shield 450. FIG. 35A shows a cross sectional view of the input apparatus 400 using the shield 450. FIG. 35B shows a perspective view of the shield 450. In FIG. 35A and FIGS. 36 through 39 to be described, the right part is omitted and may be considered symmetric to the left part. In FIG. 35A, a lighting section 473 includes the LED 430 and the shield 450. The shield 450 has a hole 450a. The shield 450 allows an infrared ray from the LED 430 to pass through the hole 450a and shields the infrared ray on the other part.

Figure 36:
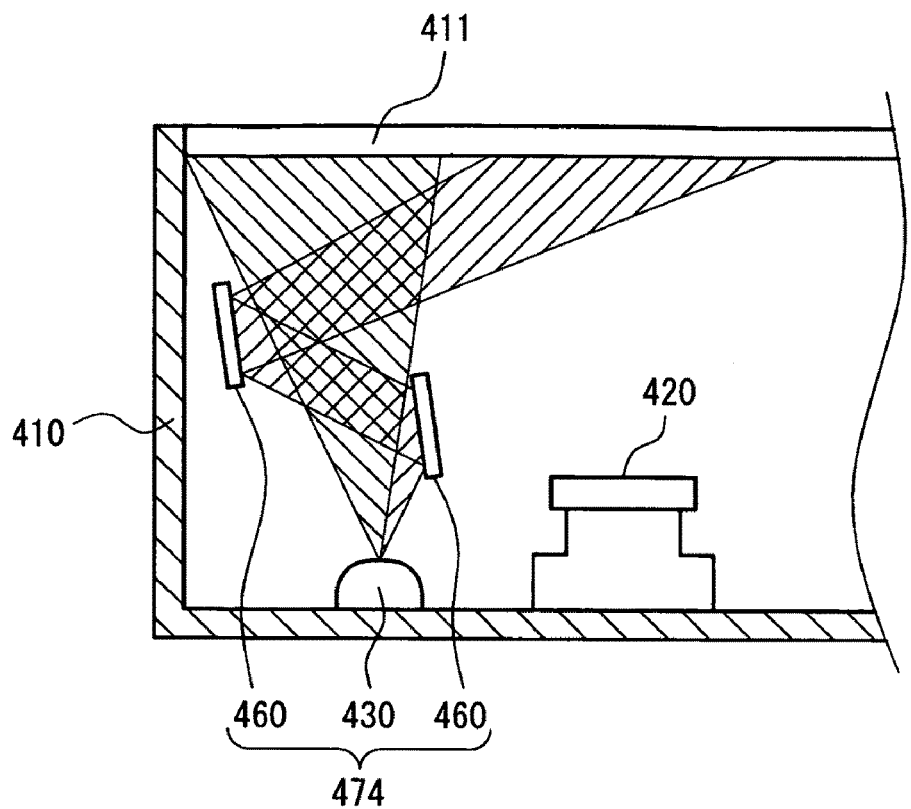
FIG. 36 shows yet another example.

FIG. 36 shows an example of using a reflector 460. A lighting section 474 includes the LED 430 and a reflector 460. The two reflectors 460 divide the optical path into two. The infrared ray is reflected twice along one optical path.

Figure 37:
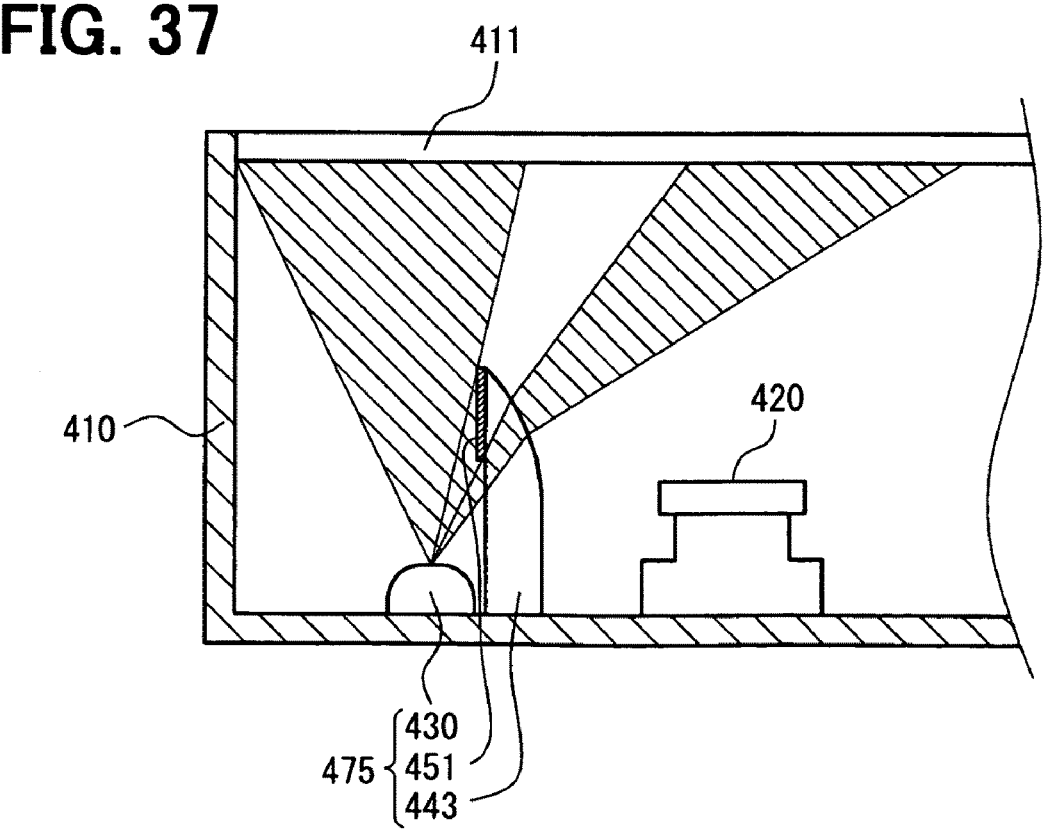
FIG. 37 shows still yet another example.

FIG. 37 shows an example of using a refractive body 443 and a shield 451. A lighting section 475 includes the LED 430, the refractive body 443, and the shield 451. As shown in FIG. 37, the shield 451 is fixed near the top of the refractive body 443. The infrared ray radiated from the LED 430 is partly refracted by the refractive body 443 and is partly shielded by the shield 451 to divide the optical path into two.

Figure 38:
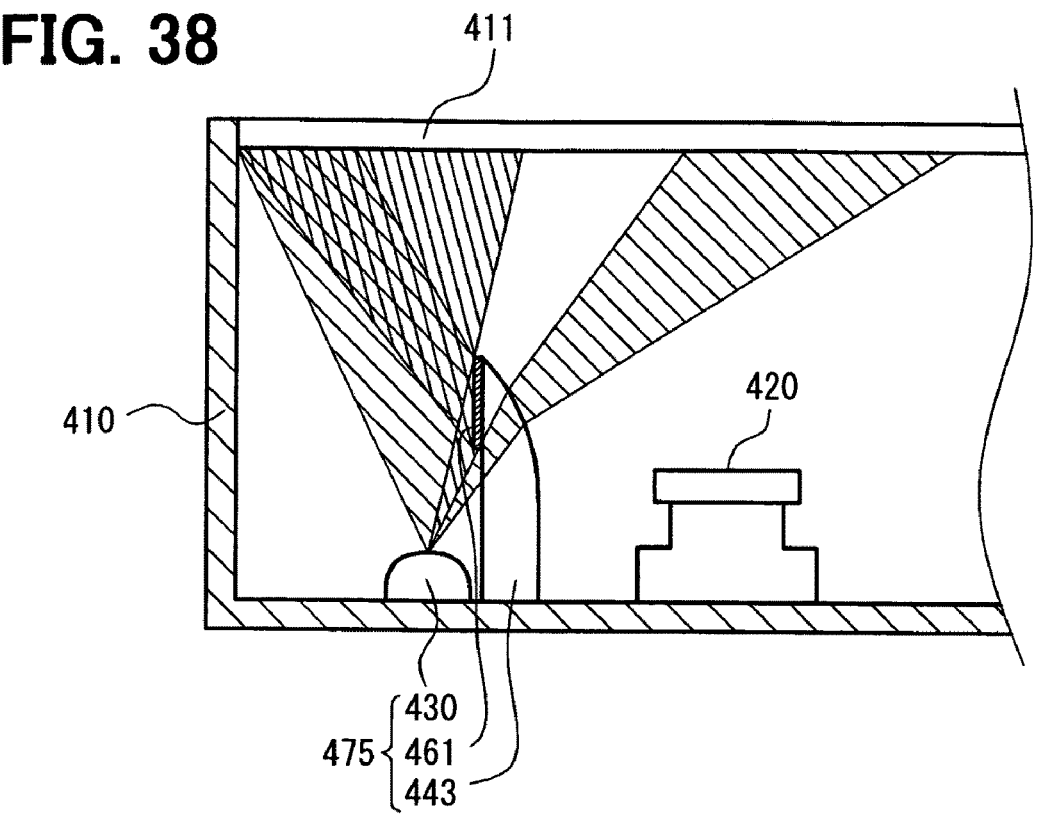
FIG. 38 shows yet still another example.

FIG. 38 shows an example of using a refractive body 444 and a reflector 461. A lighting section 476 includes the LED 430, the refractive body 444, and the reflector 461. As shown in FIG. 38, the reflector 461 is fixed near the top of the refractive body 444. The infrared ray radiated from the LED 430 is partly refracted by the refractive body 444 and is partly shielded by the reflector 461 to divide the optical path into two.

Figure 39:
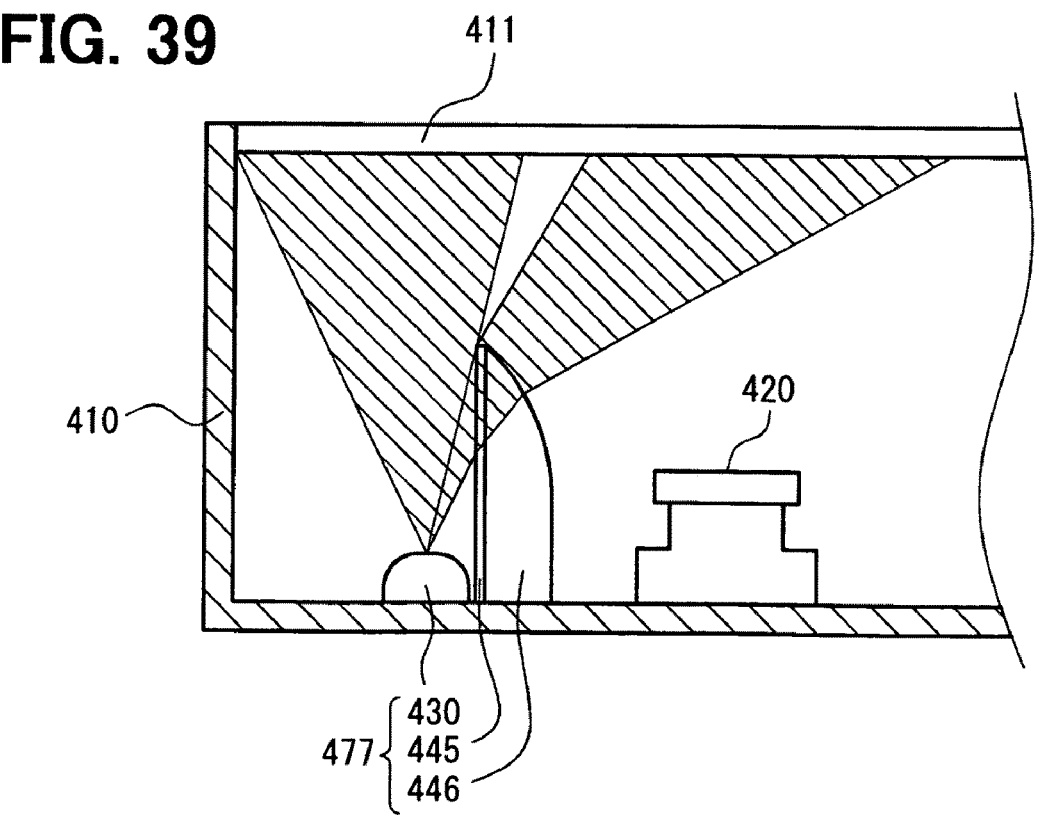
FIG. 39 shows still yet another example.

FIG. 39 shows an example of using two refractive bodies 445 and 446. A lighting section 477 includes the LED 430 and the refractive bodies 445 and the 446. As shown in FIG. 37, the refractive bodies 445 and 446 are provided in contact with each other. The refractive bodies 445 and 446 are made of materials with different refractive indexes. The infrared ray radiated from the LED 430 is partly refracted by the two refractive bodies 445 and 446 to divide the optical path into two.

The configurations in FIGS. 35A through 39 can form an optical path like the one in FIG. 32 capable of preventing an imaging section 420 from capturing an image of the LED 430. So as to satisfy this objective, it may be preferable to configure positions, sizes, refractive indexes of the refractive bodies, the shields, and the reflectors in FIGS. 35A through 39. The corresponding top view may be equivalent to any of the cross sectional view of FIG. 31C for FIG. 31A, and FIGS. 33A and 34A.

The LED 430 may represent not only an infrared ray LED but also the other LEDs including an LED radiating visible light or the other lighting devices than LEDs. The camera 420 may represent an imaging section capable of capturing light radiated from the lighting section 430. The refractive bodies 440, 441, and 442 may have the function of refracting light radiated from the lighting section 430.

The refractive bodies 440, 441, and 442 just need to refract the light radiated from the lighting section 430 and are not limited to prisms. For example, it may be preferable to use a sheet that is finely processed in microelectromechanical systems (MEMS) and functions to refract the light.

Figure 40A:
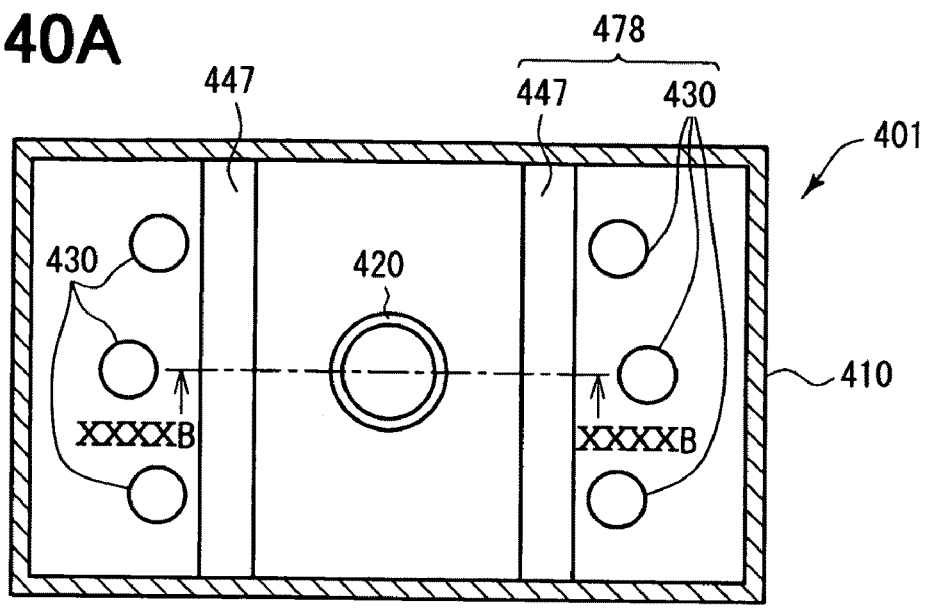
FIG. 40A shows another example of the refractive body.
Figure 40B:
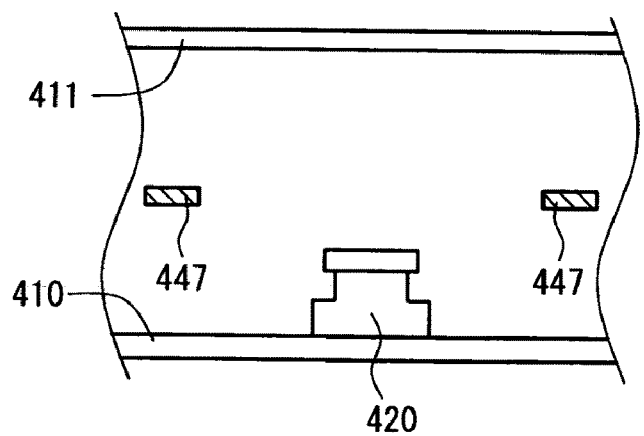
FIG. 40B shows another example of the refractive body.

FIG. 40A shows an example of using a sheet created in accordance with MEMS. The upper part of FIG. 37 corresponds to the cross sectional view of FIG. 31C. In the example of FIG. 40A, two MEMS-created sheets 447 are provided parallel to the bottom of the housing 410. Similarly to FIG. 32A, the sheets 447 refract an infrared ray. This makes it possible to prevent the infrared ray from the light source from being reflected on the operation surface 411 and entering the camera 420. An MEMS-created sheet may be circularly arranged so as to surround the camera 420.

Figure 41:
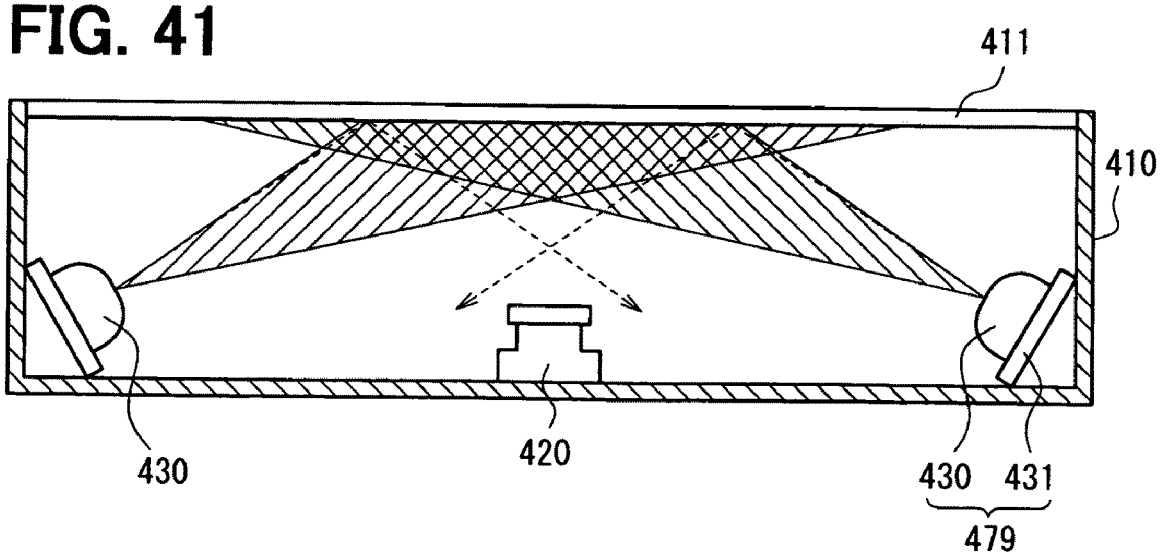
FIG. 41A shows still another example.

FIG. 41 shows another example of the present embodiment. While the above-mentioned examples show coaxial arrangement of the LED 430 and the camera 420, the example of FIG. 41 shows noncoaxial arrangement thereof. A lighting section 479 includes the LED 430 and a base 431. As shown in FIG. 41, the base 431 is fixed to the bottom of the housing 410 so as to lean against a wall. The LED 430 is fixed to the base 431 and slantwise radiates an infrared ray.

As shown in FIG. 41, the infrared ray radiated from the LED 430 reflects on the operation surface 411 but does not enter the camera 420. It is possible to prevent a light source image from being included in a captured image. Instead of using the base 431, the bottom of the housing 410 may be shaped so that the LED 430 is positioned noncoaxially with the camera 420 to exclude a light source image from a captured image.

The control section 402 may combine or superimpose a hand or finger video captured by the camera 420 with various operation buttons on the display section 403a. In this case, the operator can view the display section 403a to confirm the position of his or her own hand or finger. The convenience improves. Possibilities of an operational error decrease. There may be techniques of combining or superimposing a hand image on operation button images on the display section 403a. For example, the control section 402 may analyze the image, extract only the outline of the hand or finger, and combine or superimpose the outline on the images on the display section 403a. When the display section 403a displays a hand image as combined or superimposed, the control section 402 may convert the hand portion into a transparent and colored image and the other portion into a transparent and colorless image. When the hand image is combined or superimposed for display, the optical path refraction according to the present embodiment contributes to clearly displaying the hand image.

According to the above-mentioned embodiments, the control section 402 analyzes an image to determine the operator's input operation. The operation surface 411 may represent a touch panel equipped with a touch sensor. When the operator presses the operation surface 411 (touch panel), the touch sensor detects the pressed coordinate to specify the input operation. Accordingly, the system can be composite owing to its capability of combining or superimposing the hand image on various operation buttons to be displayed on the display section 403a. The system can recognize the current position of the operator's hand using the combined or superimposed display and specify the input position using the touch sensor.

Figure 42B:
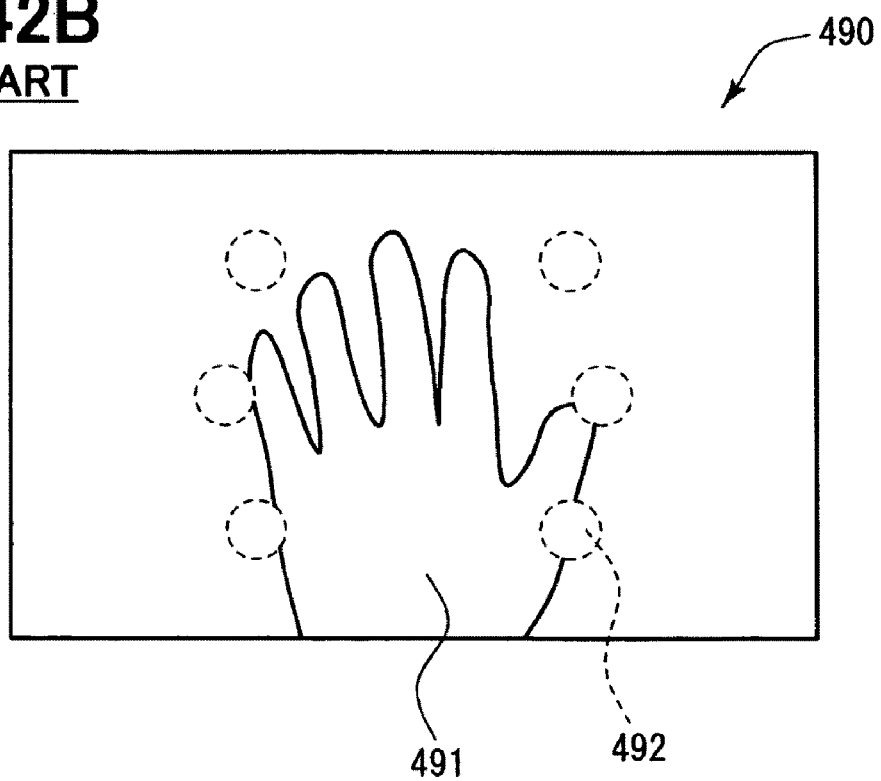
FIG. 42B shows another view of the conventional input apparatus.

The effect of the fourth embodiment will be compared to a conventional technology with reference to FIGS. 42A and 42B. When the camera and the LED are coaxially arranged as has been practiced so far, the captured image may contain an image of the light source in the lighting section. According to the conventional technology, the housing 410 includes the operation surface 411, the camera 420, and the lighting section 430 such as an infrared ray LED. The lighting section 430 illuminates the operation surface 411. The camera 420 captures an image of the operator's hand H that touches the operation surface 411 from above in the drawing. As depicted by a dotted line in FIG. 42A, light or infrared ray radiated from the lighting section 431 reflects on the operation surface 411 and enters the camera 420.

As shown in FIG. 42B, a captured image 490 contains a light source image 492 as well as a hand image 491. When the image is analyzed to determine an operation content, the image analysis accuracy may decrease.

The structure according to the fourth embodiment helps prevent such problem.

The following describes aspects of the disclosure according to the fourth embodiment.

As an aspect of the disclosure, an imaging apparatus includes: a housing having at least one transmissive surface that transmits at least light of a specific wavelength; a lighting section that is contained in the housing and radiates light to a capture object outside the housing; and an imaging section that is provided inside the housing and captures an image of the capture object illuminated by the lighting section. The lighting section configures an optical path of light radiated from the lighting section so that light radiated from the lighting section reflects on the transmissive surface and does not enter the imaging section.

In the imaging apparatus, the lighting section radiates light to a capture object outside the housing through the transmissive surface. The imaging section captures the capture object. At this time, the lighting section configures an optical path for the light so that the light radiated from the lighting section reflects on the transmissive surface and does not enter the imaging section. It is possible to prevent the light source from being captured in the capture object image and capture an excellent image.

The lighting section may include a light source for radiating the light of a specific wavelength and an optical path changer for changing an optical path. The optical path changer may be provided along an optical path for light that is radiated from the light source, reflects on the transmissive surface, and enters the imaging section.

In the lighting section, the optical path changer changes an optical path. The optical path changer is provided along an optical path for light that is radiated from the light source, reflects on the transmissive surface, and enters the imaging section. The lighting section can reliably change the optical path of light so that the light radiated from the lighting section reflects on the transmissive surface and does not enter the imaging section. It is possible to capture an excellent image of the capture object by changing the optical path of the light so as to prevent the light source from being captured.

The optical path changer may be a refractive body that changes an optical path by refracting light. The optical path changer may be provided along an optical path for light that is radiated from the light source, reflects on the transmissive surface, and enters the imaging section.

The refractive body for refracting light is provided along an optical path for light that is radiated from the lighting section, reflects on the transmissive surface, and enters the imaging section. The lighting section can reliably change the optical path of light so that the light radiated from the lighting section reflects on the transmissive surface and does not enter the imaging section. It is possible to capture an excellent image of the capture object by changing the optical path of the light using the refractive body so as to prevent the light source from being captured.

The optical path changer may be a reflector that changes an optical path by reflecting light. The optical path changer may be provided along an optical path for light that is radiated from the light source, reflects on the transmissive surface, and enters the imaging section.

The reflector for reflecting light is provided along an optical path for light that is radiated from the lighting section, reflects on the transmissive surface, and enters the imaging section. The lighting section can reliably change the optical path of light so that the light radiated from the lighting section reflects on the transmissive surface and does not enter the imaging section. It is possible to capture an excellent image of the capture object by changing the optical path of the light using the reflector so as to prevent the light source from being captured.

The optical path changer may be a shield that changes an optical path by shielding light. The optical path changer may be provided along an optical path for light that is radiated from the light source, reflects on the transmissive surface, and enters the imaging section.

The shield for shielding light is provided along an optical path for light that is radiated from the lighting section, reflects on the transmissive surface, and enters the imaging section. The lighting section can reliably change the optical path of light so that the light radiated from the lighting section reflects on the transmissive surface and does not enter the imaging section. It is possible to capture an excellent image of the capture object by changing the optical path of the light using the shield so as to prevent the light source from being captured.

The optical path changer may change an optical path by a combination of two or more of refracting, reflecting, and shielding light. The optical path changer may be provided along an optical path for light that is radiated from the light source, reflects on the transmissive surface, and enters the imaging section.

The optical path changer performs a combination of two or more of refracting, reflecting, and shielding light. The optical path changer is provided along an optical path for light that is radiated from the lighting section, reflects on the transmissive surface, and enters the imaging section. The optical path changer can reliably change the optical path of light so that the light radiated from the lighting section reflects on the transmissive surface and does not enter the imaging section. It is possible to capture an excellent image of the capture object by changing the optical path of the light using the optical path changer so as to prevent the light source from being captured.

The optical path changer may be a transparent structure having partially different thicknesses and shapes and features at least a certain optical path change function.

The optical path changer has partially different thicknesses and shapes and features at least a certain optical path change function. For example, a prism may be used for the optical path changer to refract an optical path of light radiated from the light source. It is possible to capture an excellent image of the capture object by changing the optical path according to a simple structure using a prism so as to prevent the light source from being captured.

The optical path changer may change a degree of changing an optical path based on a curvature of a curved surface shape of the optical path changer.

The optical path changer changes a degree of changing an optical path based on a curvature of the curved surface shape. The degree of changing an optical path can be adjusted by designing a curved surface shape of the prism, for example. It is possible to capture an excellent image of the capture object according to a simple structure using a prism by adjusting the degree of changing the optical path based on a prism shape so as to prevent the light source from being captured.

The optical path changer may change a degree of changing an optical path by a combination of members with different refractive indexes.

The optical path changer changes a degree of changing an optical path by a combination of members with different refractive indexes. For example, multiple prisms may be used to adjust the degree of changing the optical path in accordance with a combination of refractive indexes. It is possible to capture an excellent image of the capture object so as to prevent the light source from being captured.

The lighting section may include multiple light sources. Light radiated from one light source may not be applied to part of the capture object due to a configured optical path. The lighting section may apply light radiated from a light source other than the one light source to the part of the capture object.

The lighting section uses multiple light sources. Even when one light source cannot illuminate an area due to the changed optical path, the lighting section illuminates that area using the other light source. A capture object can be captured without creating a blank area where no light is applied. It is possible to eliminate the blank area and prevent the light source from being captured in the capture object image.

The lighting section may be provided with a light source that radiates the light of a specific wavelength. The lighting section may arrange the light source in the housing so as to tilt an axis of the light source at an angle that prevents light from entering the imaging section when the light is radiated from the light source and reflects on the transmissive surface.

The light source is arranged so as to tilt an axis of the light source at an angle that prevents light from entering the imaging section when the light is radiated from the light source and reflects on the transmissive surface. The simple method of tilting the light source axis can be used to capture an excellent image of the capture object so as to prevent the light source from being captured.

As another aspect of the disclosure, an input apparatus includes the above-mentioned imaging apparatus. The transmissive surface is used as an input surface for accepting an input operation from an operator. The capture object is equivalent to an operator hand for input operation. An analysis section is provided to analyze an image captured by the imaging section and to analyze an operation content.

In the input apparatus, the lighting section in the housing radiates light to an operator's hand to capture a hand image through the transparent input surface that accepts an input operation from the operator. The input apparatus changes the optical path to prevent the light source from being included in the captured image. The input apparatus can accurately specify the content of the operator's operation. It is possible to embody the input apparatus that can be accurately operated in accordance with an operator's intention.

It will be obvious to those skilled in the art that various changes may be made in the above-described embodiments of the present invention. However, the scope of the present invention should be determined by the following claims.

What is claimed is:

1. An imaging apparatus comprising:
    a housing having at least one transmissive surface that transmits at least light of a specific wavelength;
    a lighting section that is contained in the housing and radiates light of the specific wavelength, via the transmissive surface, to a capture object outside the housing; and
    an imaging section that is provided inside the housing and captures an image of the capture object illuminated by the lighting section,
    wherein:
    the lighting section configures an optical path of light radiated from the lighting section so that light, which is radiated from the lighting section and reflected on the transmissive surface, is prevented from entering the imaging section;
    the lighting section includes a plurality of light sources containing at least a first light source and a second light source;
    the lighting section configures an optical path of first light radiated from the first light source to prevent the first light from entering the imaging section after being reflected on the transmissive surface,
        the first light radiated from the first light source being disabled to reach and illuminate a part of the transmissive surface because of the optical path configured by the lighting section, the part of the transmissive surface not illuminated by the first light being defined as a blank area relative to the first light radiated from the first light source, and
        the blank area relative to the first light radiated from the first light source being enabled to be illuminated by a second light radiated from the second light source;
    the lighting section configures an optical path of the second light radiated from the second light source by changing an optical path for the second light to enter the imaging section after being reflected on the transmissive surface,
the second light after the optical path is changed being thereby prevented from entering the imaging section and disabled to reach and illuminate a part of the transmissive surface, the part of the transmissive surface not illuminated by the second light being defined as a blank area relative to the second light radiated from the second light source, and
the second light after the optical path is changed being simultaneously enabled to reach and illuminate the blank area relative to the first light radiated from the first light source;
the first light source and the second light source are arranged to surround the imaging section;
the lighting section includes an optical path changer for changing an optical path, the optical path changer being arranged to be in between the first light source and the imaging section and in between the second light source and the imaging section, the optical path changer having a top portion facing the transmissive surface, the top portion provided with a refractive portion; and
an arrangement of the first light source, the second light source, and the optical path changer is provided such that:
(i) each of the first light radiated from the first light source and the second light radiated from the second light source has two optical paths due to a division by the optical path changer, one of the two optical paths being a refractive path that reaches the transmissive surface after being refracted by the refractive portion, another of the two optical paths being a non-refractive path that reaches the transmissive surface without being refracted by the refractive portion;
(ii) the division by the optical path changer causes in the transmissive surface the blank area relative to the first light radiated from the first light source and the blank area relative to the second light radiated from the second light source; and
(iii) the blank area relative to the first light radiated from the first light source is enabled to be illuminated by light on the refractive path of the second light radiated from the second light source, whereas the blank area relative to the second light radiated from the second light source is enabled to be illuminated by light on the refractive path of the first light radiated from the first light source.

2. The imaging apparatus according to claim 1, wherein: the optical path changer is provided to be shaped of a cylinder surrounding the imaging section.

3. The imaging apparatus according to claim 1, wherein: the plurality of light sources including the first light source and the second light source are arranged to surround the imaging section;
the optical path changer is provided as a plurality of bodies that are associated with the plurality of light sources, respectively, each of the bodies being arranged to be in between the imaging section and light source with which the each of the bodies is associated.

4. An imaging apparatus comprising:
a housing having at least one transmissive surface that transmits at least light of a specific wavelength;
a lighting section that is contained in the housing and radiates light of the specific wavelength, via the transmissive surface, to a capture object outside the housing; and
an imaging section that is provided inside the housing and captures an image of the capture object illuminated by the lighting section,
wherein:
the lighting section configures an optical path of light radiated from the lighting section so that light, which is radiated from the lighting section and reflected on the transmissive surface, is prevented from entering the imaging section;
the lighting section includes a plurality of light sources containing at least a first light source and a second light source;
the lighting section configures an optical path of first light radiated from the first light source to prevent the first light from entering the imaging section after being reflected on the transmissive surface,
the first light radiated from the first light source being disabled to reach and illuminate a part of the transmissive surface because of the optical path configured by the lighting section, the part of the transmissive surface not illuminated by the first light being defined as a blank area relative to the first light radiated from the first light source, and
the blank area relative to the first light radiated from the first light source being enabled to be illuminated by a second light radiated from the second light source;
the lighting section configures an optical path of the second light radiated from the second light source by changing an optical path for the second light to enter the imaging section after being reflected on the transmissive surface,
the second light after the optical path is changed being thereby prevented from entering the imaging section and disabled to reach and illuminate a part of the transmissive surface, the part of the transmissive surface not illuminated by the second light being defined as a blank area relative to the second light radiated from the second light source, and
the second light after the optical path is changed being simultaneously enabled to reach and illuminate the blank area relative to the first light radiated from the first light source;
the first light source and the second light source are arranged to surround the imaging section;
the lighting section includes an optical path changer for changing an optical path, the optical path changer being arranged to be in between the first light source and the imaging section and in between the second light source and the imaging section, the optical path changer extending towards the transmissive surface, the optical path changer having a hole member; and
an arrangement of the first light source, the second light source, the optical path changer, and the hole member in the optical path changer is provided such that:
(i) each of the first light radiated from the first light source and the second light radiated from the second light source has two optical paths due to a division by the optical path changer, one of the two optical paths being a hole-passing path that reaches the transmissive surface after passing through the hole member, another of the two optical paths being a non-hole-passing path that reaches the transmissive surface without passing through the hole member;
(ii) the division by the optical path changer causes in the transmissive surface the blank area relative to the first light radiated from the first light source and the blank area relative to the second light radiated from the second light source; and (iii) the blank area relative to the first light radiated from the first light source is enabled to be illuminated by light on the hole-passing path of the second light radiated from the second light source, whereas the blank area relative to the second light radiated from the second light source is enabled to be illuminated by light on the hole-passing path of the first light radiated from the first light source.

* * * * *